(12) United States Patent
Ludwig

(10) Patent No.: US 8,305,480 B2
(45) Date of Patent: *Nov. 6, 2012

(54) SYNTHETIC IMAGE FORMATION VIA SIGNAL PROCESSING FOR VIGNETTED OPTOELECTRONIC ARRAYS, LENSLESS CAMERAS, AND INTEGRATED CAMERA-DISPLAYS

(75) Inventor: Lester F. Ludwig, Redwood Shores, CA (US)

(73) Assignee: Avistar Communications Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/828,207

(22) Filed: Jun. 30, 2010

(65) Prior Publication Data

US 2011/0025864 A1 Feb. 3, 2011

Related U.S. Application Data

(63) Continuation of application No. 12/471,275, filed on May 22, 2009, now Pat. No. 8,125,559.

(60) Provisional application No. 61/128,968, filed on May 25, 2008.

(51) Int. Cl.
*H04N 5/225* (2006.01)
*H04N 5/217* (2006.01)

(52) U.S. Cl. ............... 348/340; 348/241; 348/335
(58) Field of Classification Search ............... 348/340, 348/241, 335, 342–344; 359/619
See application file for complete search history.

(56) References Cited

U.S. PATENT DOCUMENTS

| 6,489,992 | B2 * | 12/2002 | Savoye | 348/340 |
| 7,265,784 | B1 * | 9/2007 | Frank | 348/241 |

\* cited by examiner

*Primary Examiner* — Mohammed Hasan
(74) *Attorney, Agent, or Firm* — Sughrue Mion, PLLC

(57) ABSTRACT

Algorithms and methods for performing electronic image formation and refinement from overlapping measurement vignettes captured by an array of image sensors and associated micro-optics are presented. The invention is directed to a new type of image formation system that combines readily-fabricated micro-optical structures, a two-dimensional image sensor array with electronic or digital image processing to actually construct the image. Image formation is performed without a conventional large shared lens and associated separation distance between lens and image sensor, resulting in a "lensless camera." In an application, a readily fabricatable LED array is used as a light-field sensor. In an application, the LED array further serves as a color "lensless camera." In an application, the LED array also serves as an image display. In an application, the LED array further serves as a color image display. In an embodiment, one or more synergistic features of an integrated camera/display surface are realized.

20 Claims, 41 Drawing Sheets

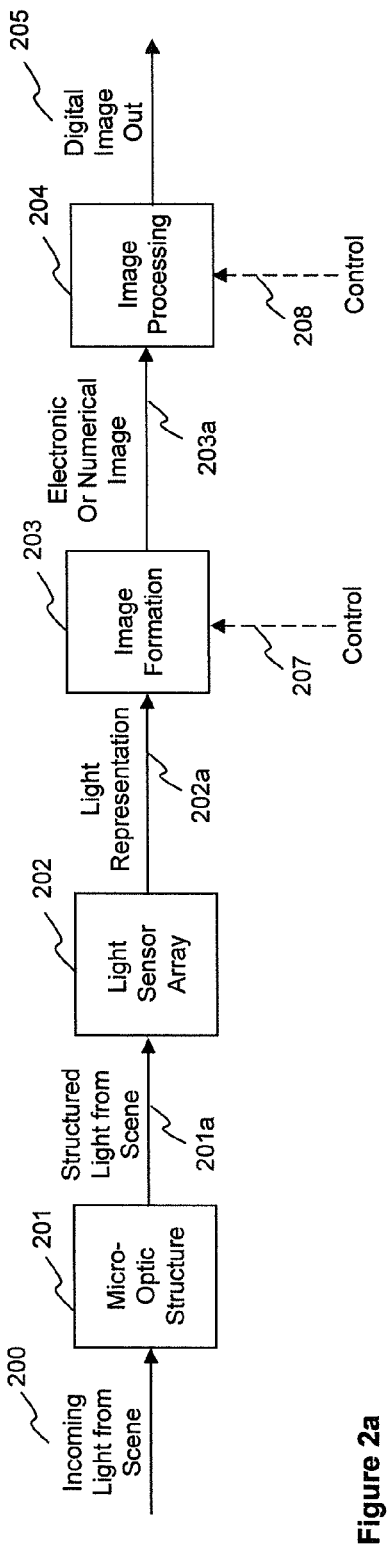
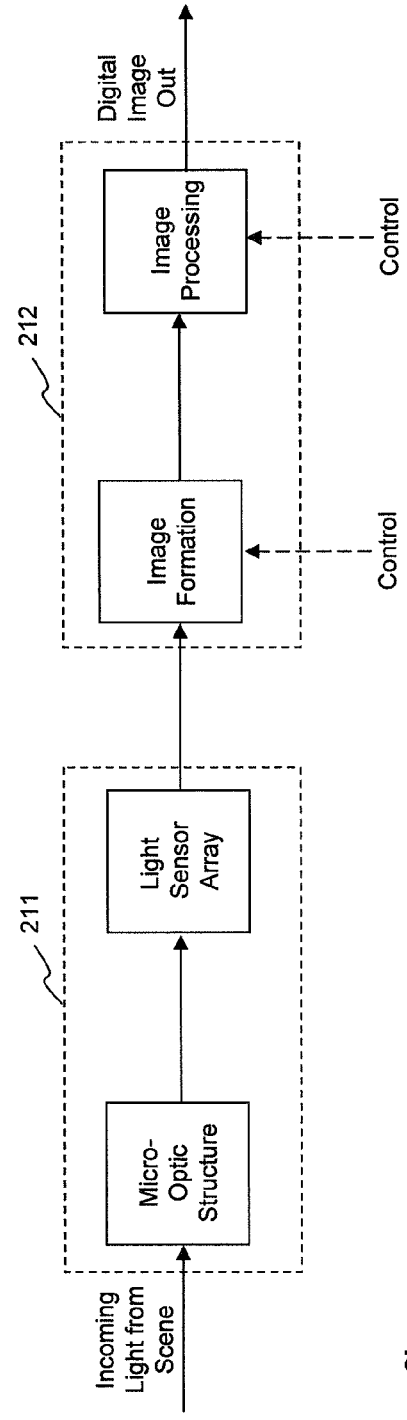
Figure 2a
Figure 2b

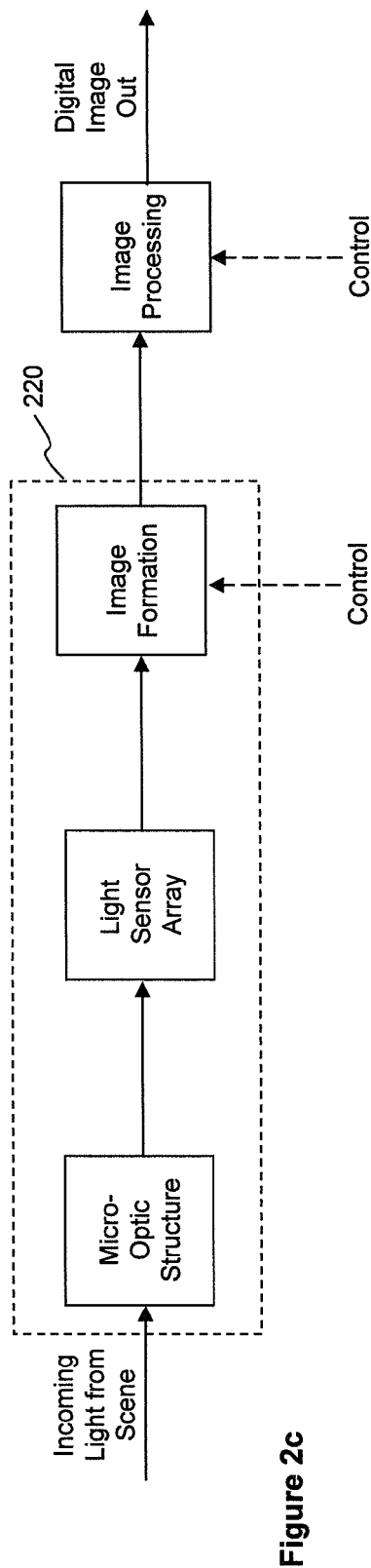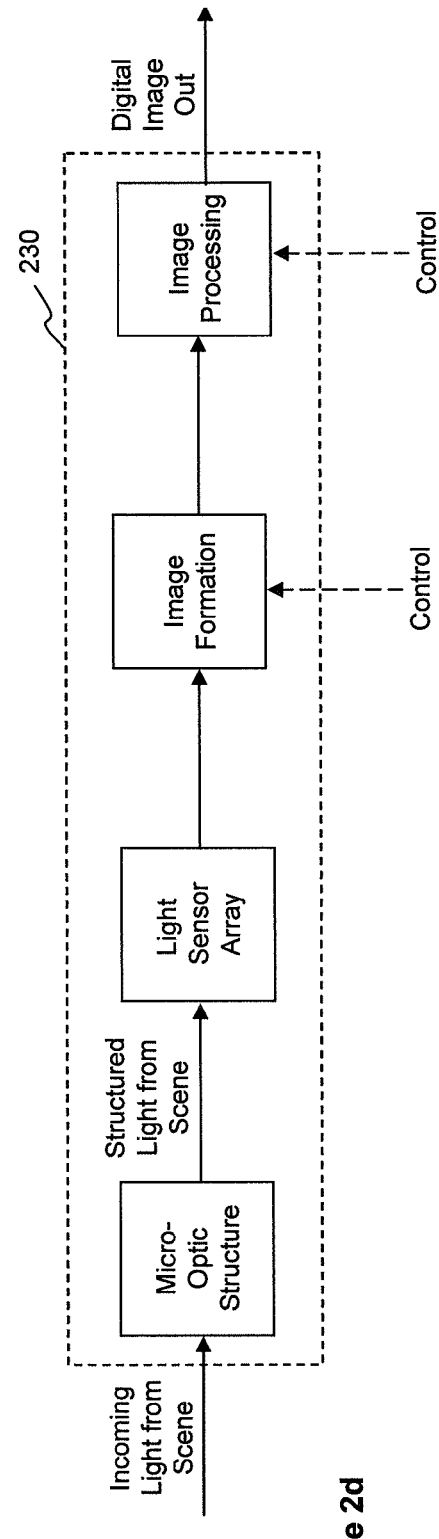
Figure 2c
Figure 2d

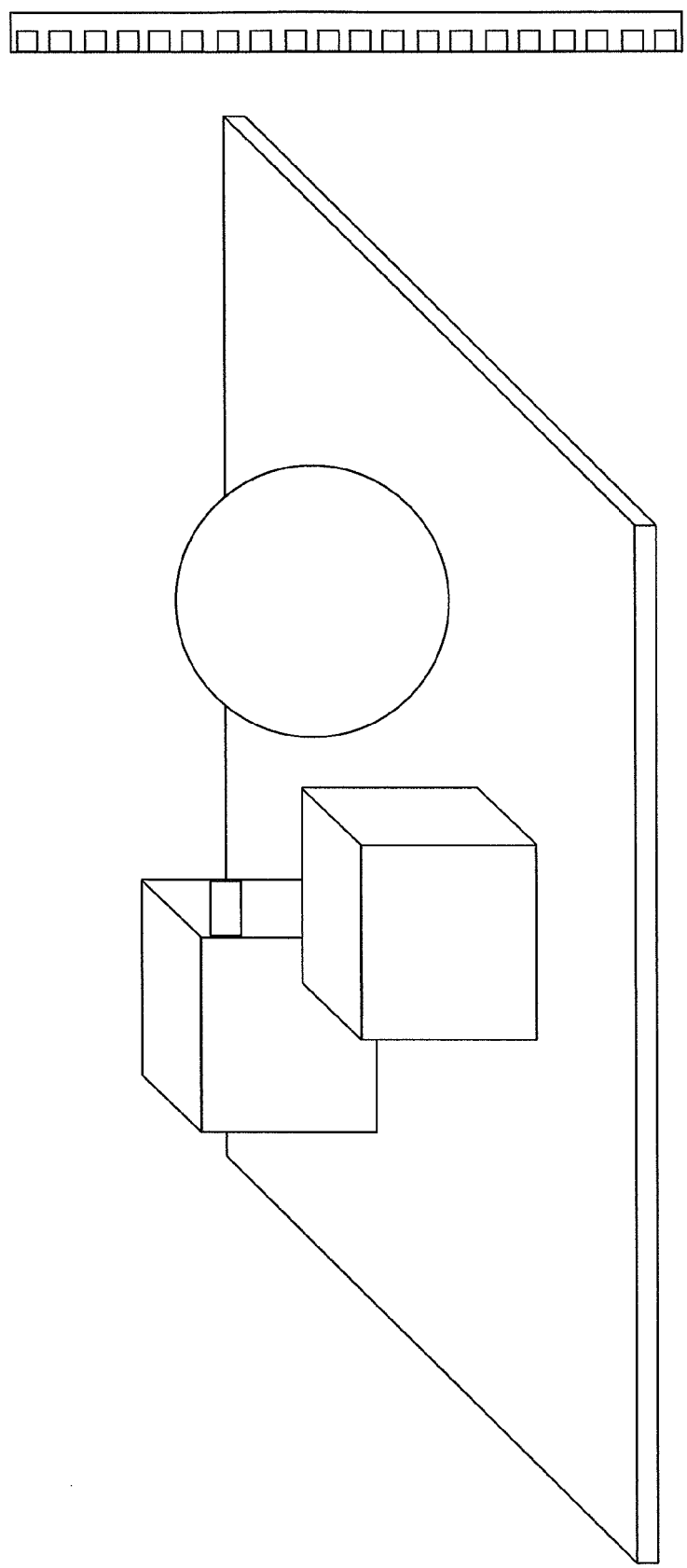

Multiple-Pixel Case

Single Pixel Case Sub-Aperture

Single Pixel Case Filled Aperture

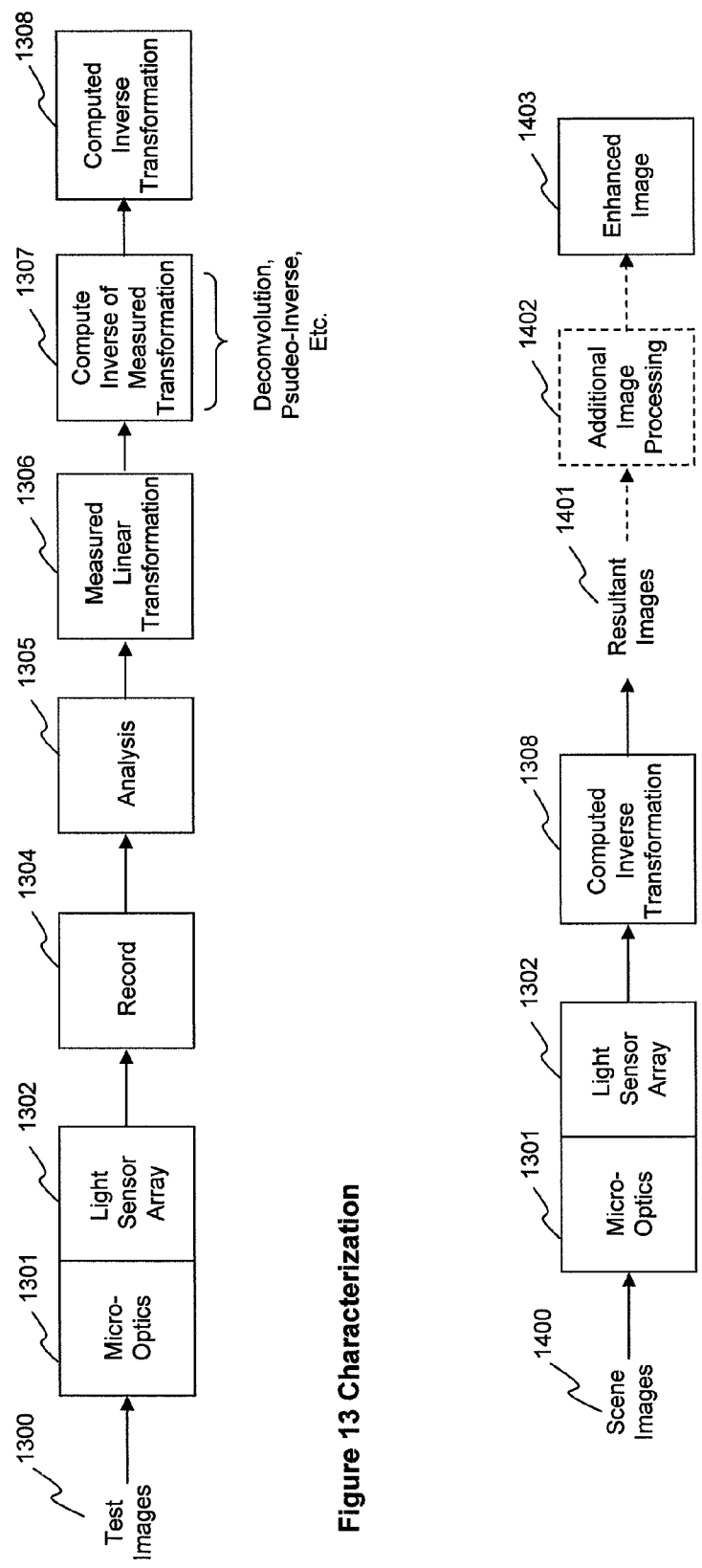

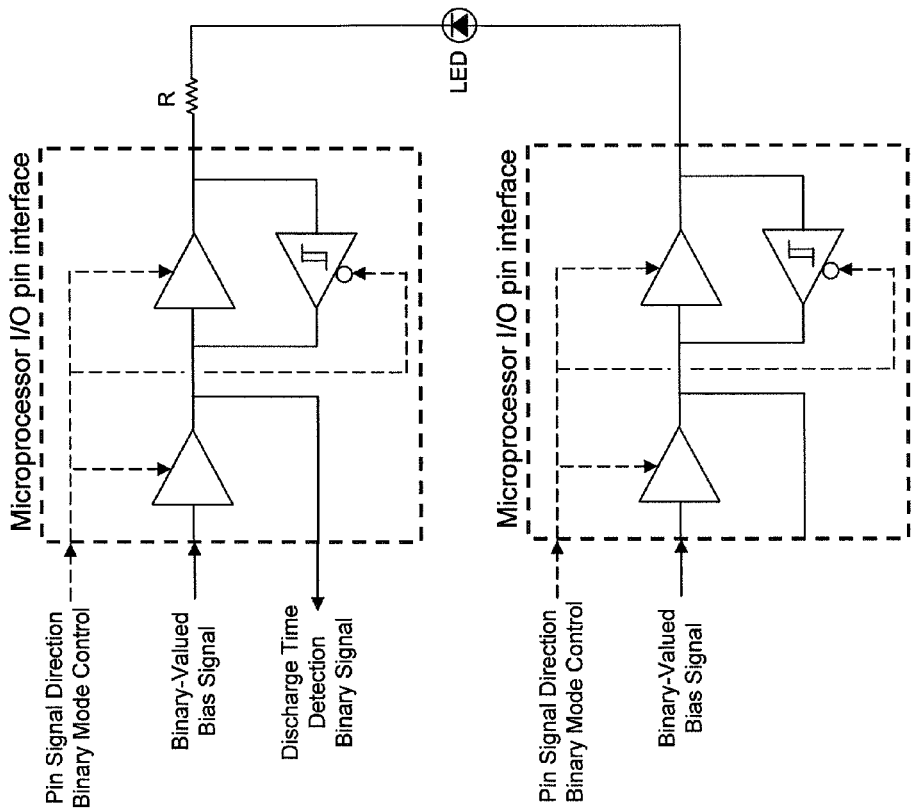
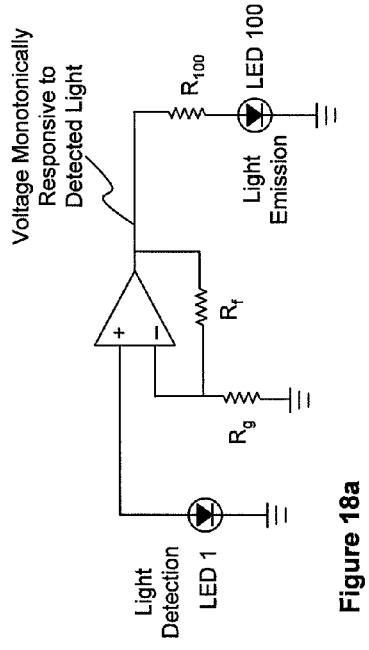
Figure 18a
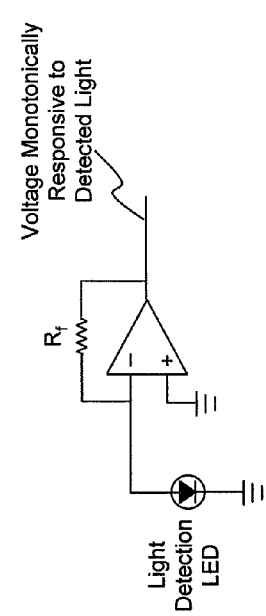
Figure 18b
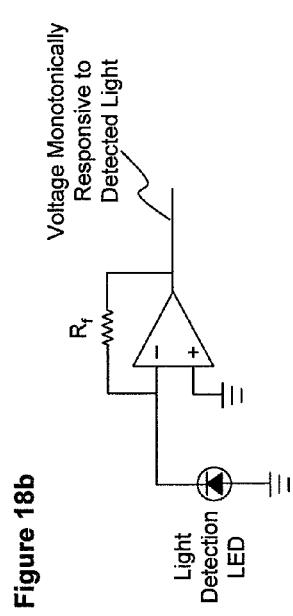
Figure 18c
Figure 18d

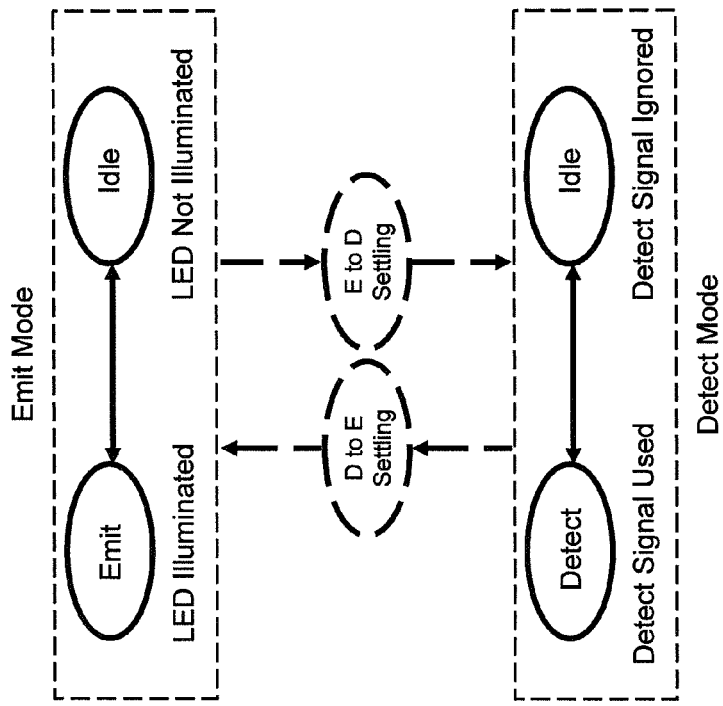
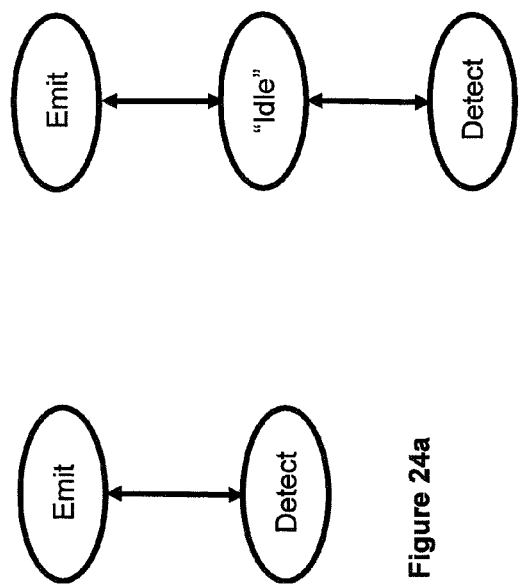
Figure 24a
Figure 24b
Figure 24c
Figure 24d

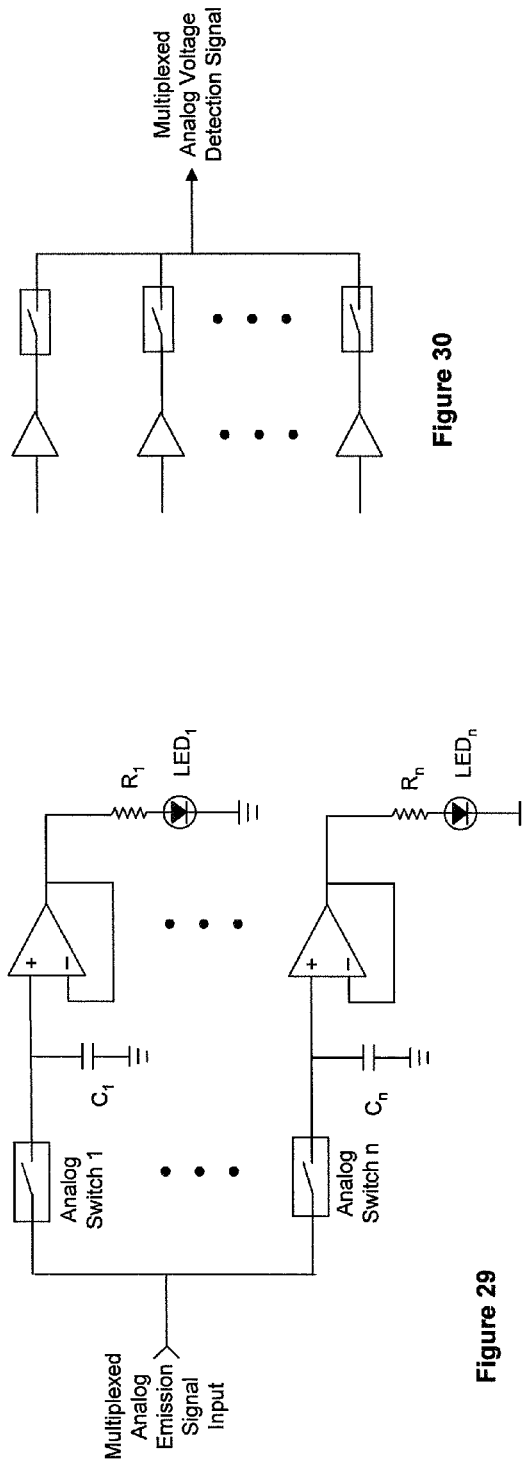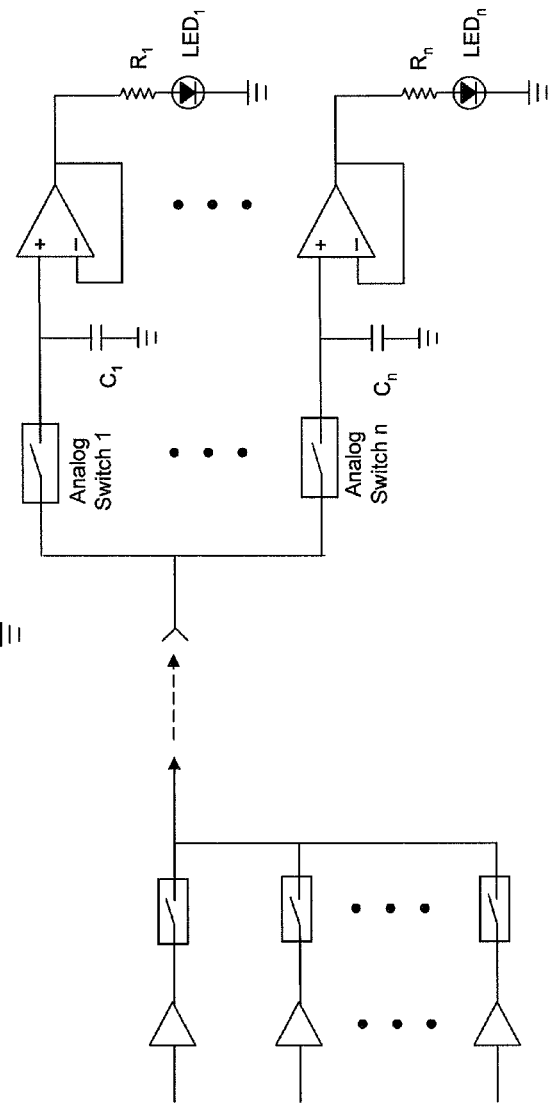
Figure 29
Figure 30
Figure 31

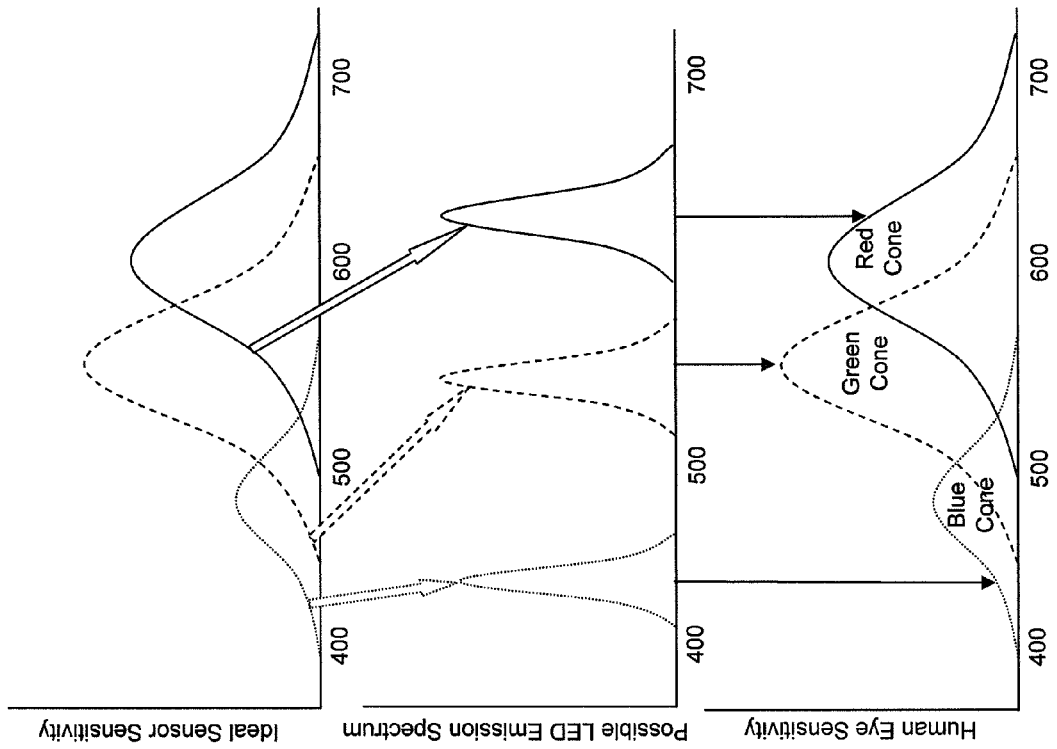
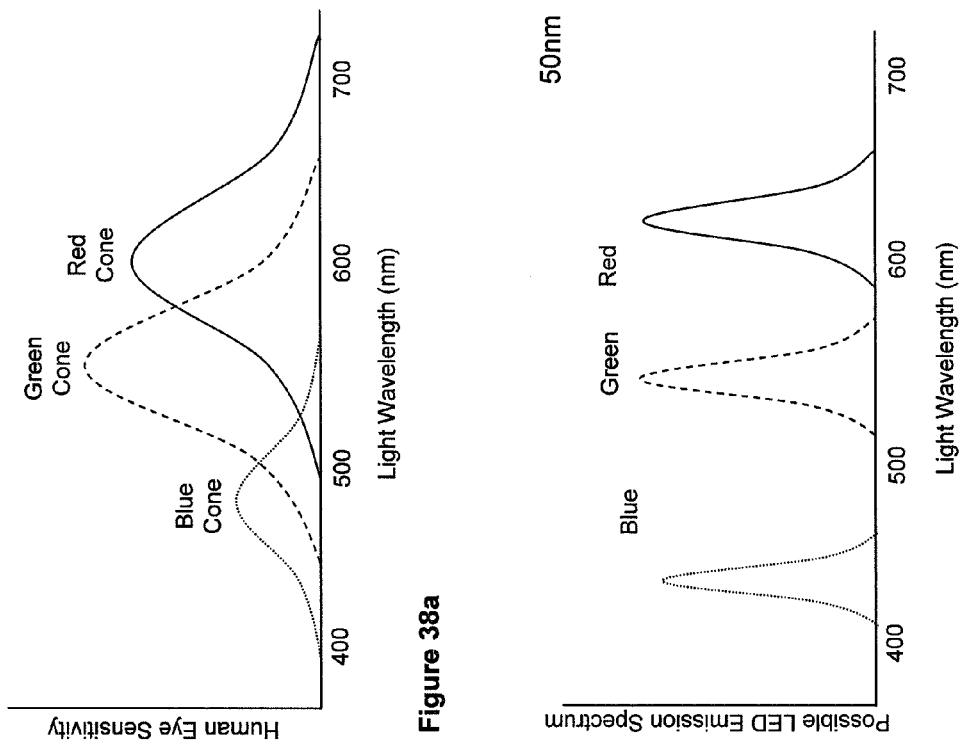
Figure 38a
Figure 38b
Figure 38c

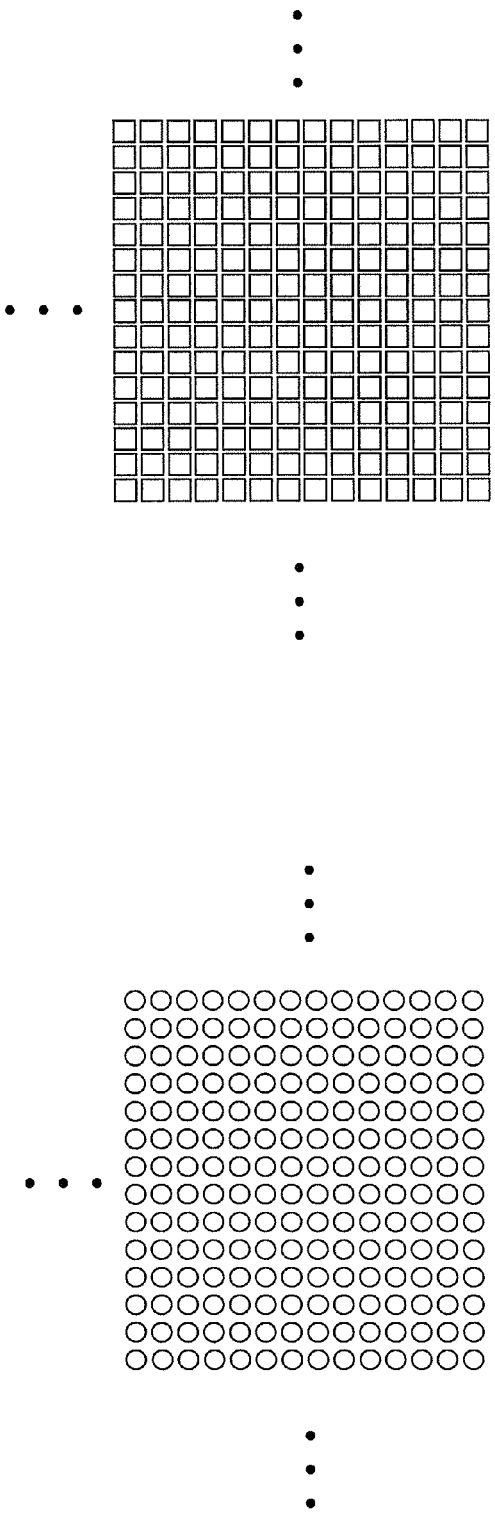
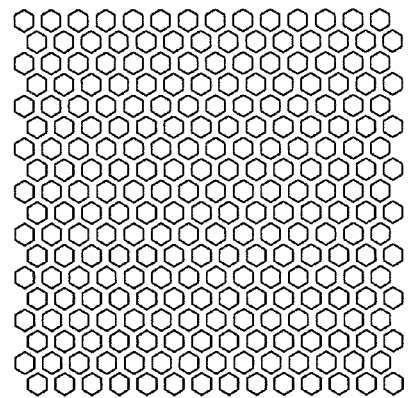
Figure 43b
Figure 43c
Figure 43a

SYNTHETIC IMAGE FORMATION VIA SIGNAL PROCESSING FOR VIGNETTED OPTOELECTRONIC ARRAYS, LENSLESS CAMERAS, AND INTEGRATED CAMERA-DISPLAYS

CROSS-REFERENCE TO RELATED APPLICATION

This regular U.S. patent application is a continuation of U.S. application Ser. No. 12/471,275 filed May 22, 2009 now U.S. Pat. No. 8,125,559; which claims the benefit of priority under 35 U.S.C. 119 from provisional U.S. patent application No. 61/128,968, filed on May 25, 2008. Application Ser. Nos. 12/471,275 and 61/128,968 are fully incorporated herein by reference for all purposes.

FIELD OF THE INVENTION

This invention pertains to electronic image formation and refinement from overlapping measurement vignettes captured by an array of image sensors and associated micro-optics. The present invention is directed in major part to an alternate image formation system that combines readily-fabricated micro-optical structures, a two-dimensional image sensor array with electronic or digital image processing to actually construct the image.

BACKGROUND OF THE INVENTION

Image formation as used in camera obscura and photography dates back to the pinhole camera discovery, experiments, descriptions, and developments of Chinese philosopher Mozi (470 BC to 390 BC), Greek philosopher Aristotle (384 to 322 BC), and Iraqi scientist Ibn al-Haitham (965-1039 AD). As depicted in FIG. 1a, reflected or emitted light from objects or light sources in a scene radiate in all directions, but a small pinhole aperture limits the rays of light to those collinear with both the pinhole aperture and the object or source in the scene. Light rays in other directions are blocked and thus prevented from scattering into the aforementioned collinear rays. The collinear rays then project undiffused and without comingling into the region on the other side of the pinhole aperture where at any distance they can be projected onto a surface, albeit with various distortions (due to irregularities in the aperture shape, degree of curvature of the projection surface, etc.) and at low light intensity (since most of the light rays are by necessity prevented from traveling through the aperture. Moving the projection surface closer to the pinhole aperture makes the projected image smaller and brighter, while moving the projection surface farther from pinhole aperture makes the projected image larger and dimmer. The image forms naturally at any distance by virtue of the organization of the light rays passed through the pinhole aperture. In recent years CCD cameras using pinhole apertures rather than lenses have become commercially available.

In more modern mainstream forms of optical systems, a lens or system of lenses is employed for image formation for light passing through an aperture. A simple representative example is depicted in FIG. 1b, wherein objects or light sources in a scene radiate light in all directions and a significant angular sector of this is captured by a lens of material, dimensions, and curvatures to systematically bend the direction of travel of the captured angular sector of radiated light. In particular, the lens material, dimensions, and curvatures are such that all light rays emanating and spreading from a given location on an object or light source within a scene that are captured by the lens are bent so as to converge at a single point on the opposite side of the lens. In particular, the lens material, dimensions, and curvatures are characterized by a constant $f$ (called the focal length), and if the distance between the lens and an object or light source within a scene is of the value A, the image forms in focus at a point at distance B on the opposite side of the lens where $1/A+1/B=1/f$ (this relation known as the "Lens Law"). At distances on the opposite side of the lens that are shorter than the distance B, the light rays have not yet come close enough to converge, causing an out of focus image. At distances on the opposite side of the lens greater than the distance B, the light rays have crossed each other and are spreading apart, also causing an out of focus image.

Both these approaches require a significant separation distance between the (lens or pinhole) aperture and the image formation surface. Physical limitations of these and other aspects of camera technology thus create a required appreciable depth or thickness of the optical imaging system. They also require all light for the resulting image to pass through an aperture.

The linear image sensors employed in fax machines, PDF™ scanners, and many types of digital photocopiers use direct and localized-transfer "contact" imaging arrangements. A geometrically-linear array of light sensors are positioned effectively directly upon a flat object such as a paper document that illuminated from the sides or other in other ways. Significant angular sectors of light radiating from a given spot on the flat object are captured by an extremely local light sensor element in the linear array of light sensors. An example of this is shown in FIG. 1c. In many embodiments, each light sensor individually captures the light value of a single pixel of the final generated image. In most fax machines, PDF™ scanners, and many types of digital photocopiers, the geometrically-linear image sensor array is either moved over the surface of the flat object (as in a scanner) or the flat object is moved over the geometrically-linear image sensor array (as in a fax machine). These are suggested in the depiction of FIG. 1d.

This differs from the lens and pinhole imaging systems (which require a central aperture and free propagation space as the image formation mechanism) represented by FIGS. 1a-1b and the contact imaging systems (which require close to direct contact with the object an arrangement coexistent with illumination) represented by FIGS. 1d-1e. In this system a spatial array of light sensors (typically relatively large, for example with height and width dimensions of a few inches) performs measurements on the incoming light field, and imaging is obtained numerically.

SUMMARY OF THE INVENTION

The present patent is directed to numerically-obtained image formation from data obtained by light sensor arrays (such as the rectangular array depicted in FIG. 1f) via signal processing operations. The resulting system and method do not require a large bulky imaging lens nor the physical separation distances required by imaging lenses or pinhole camera arrangements. The sensor for the resulting system can be flat or curved, or may be integrated into LCD and LED display screens so as to obtain more direct eye contact and more natural telepresence experiences.

In an exemplary embodiment, it is assumed the image sensor array is provided with a micro-optic structure, such as an array of micro-lenses or a suitably perforated optical mask, which provides a significant occultation of the observed scene to each sensor so that each vignette captures a slightly different portion of the observed scene.

In an embodiment provided for by the invention, each LED in an LED array is, by various manners as may be advantageous, sequentially selected to operate in light detecting mode while others adjacent to it are operated in a light emitting mode or an idle mode.

In an exemplary embodiment, the image sensor array need not be planar, for example it may be rendered as a curved surface.

In an exemplary embodiment, image formation is realized by performing linear mathematical transformations on the measurements made by the sensor array.

In an exemplary embodiment the type of image formed can be somewhat different that that produced by a traditional photographic or video camera by nature of the physical size and resultant spatial span of the assumed image sensor array being considerably larger than that of a lens or pinhole aperture.

In an exemplary embodiment, because the image formation is performed in a signal processing domain, it is possible to modify or modulate aspects of the imaging as a function of a configuration command or control signal.

Additionally, the mathematics, imaging, and other aspects of the resultant technology may provide new understanding and appreciations for the types and qualities of vision possible with the otherwise deeply-studied single-lens (apposition) compound-eyes found in arthropods such as insects and crustaceans (these comprising many small separate "simple eye" elements comprising a cornea and/or lens and photoreceptor). To date, the visual image-formation sensation of organisms possessing single-lens apposition compound-eyes is thought to be primitive and of limited resolution, providing perhaps more the function of a motion detector than that of the static image capabilities associated with human vision. Should the possible static image capabilities of single-lens compound-eyes be revealed to be more significant than had been appreciated when signal processing image formation is included in the assessment, various aspects of these creations of nature may be re-examined for use in new methods of imaging technology.

BRIEF DESCRIPTION OF THE DRAWINGS

FIG. 2a depicts an exemplary embodiment comprising a micro-optic structure, a light sensor array, an image formation signal processing operation and an optional additional subsequent image processing operations.

FIG. 2b depicts a variation of the embodiment of FIG. 2a wherein the micro-optic structure and light sensor array are grouped into a first subsystem, and the image formation signal processing operation and subsequent image processing operations are grouped into a second subsystem.

FIG. 2c depicts a variation of the embodiment of FIG. 2a wherein the micro-optic structure, light sensor array, and image formation signal processing operation are grouped into a common subsystem.

FIG. 2d depicts a variation of the embodiment of FIG. 2a wherein each of the micro-optic structure, light sensor array, image formation signal processing operation, and subsequent image processing operations are grouped into a common subsystem.

FIG. 13 illustrates a procedure for obtaining a linear transformation and a computed inverse transformation that are matched to a particular two-dimensional micro-optic structure and light sensor array.

FIG. 14 shows how the resulting computed inverse transformation associated with the measured given two-dimensional micro-optic structure and light sensor array can then be used for image formation.

FIG. 18a-18d depict various circuits demonstrating approaches to detecting light with an LED.

FIGS. 24a-24c depict exemplary state diagrams for the operation of the LED and the use of input signals and output signals. FIG. 24d depicts an exemplary state transition diagram reflecting the considerations of FIGS. 24a-24c.

FIG. 26b depicts a simplified representation of FIG. 23 as is useful in interpreting FIG. 26a.

FIG. 29 depicts an exemplary analog demultiplexing function.

FIG. 30 depicts an exemplary arrangement to sequentially select from a plurality of detection amplifier outputs.

FIG. 31 depicts a combination of the arrangements of FIGS. 29 and 30.

FIG. 38a illustrated the human eye sensitivity to the spectrum of wavelengths of visible light.

FIGS. 38b and 38c depict exemplary positionings of three approximately 50 nm basspands in portions of the visible spectrum near peaks of the cone responses and away from areas of significant spectral overlap.

FIG. 39a depicts a mimic of the cone responses of the human eye depicted in FIG. 38a.

FIG. 43a-43c depict various lattice arrangements for individual LEDs, stacks of LEDs, or groups of LEDs and/or electronics elements as provided for by the invention.

DETAILED DESCRIPTION

Figure 1D:
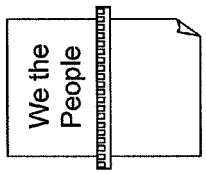
FIG. 1d depicts a geometrically-linear image sensor array that may be moved over the surface of the flat object, as in a flatbed scanner, or the flat object is moved over the geometrically-linear image sensor array, as in a fax machine.

Referring to FIG. 2a, incoming light 200 from a visual scene is optically organized, filtered, etc. by at least one micro-optic structure 201 to provide light field 201a suitably structured for incoming presentation to a light sensor array 202. The light sensor array 202 produces a representation (electrical, digital, numeric, etc.) 202a of the incoming light field 201a suitable for presentation to a signal processing operation 203 configured to provide image formation. In an example embodiment, the representation 202a of the incoming light field is not a visually useful electronic or digital image as it comprises pixels having amplitude values resulting from summations of light levels across entire individual image vignettes. In an example embodiment, the image formation signal processing operation 203 comprises a linear transformation whose character depends on the optical organization the micro-optic structure 201 imposes on the incoming light 200 from the visual scene. The image formation signal processing operation 203 produces a visually useful electronic or digital image 203a, which may be used directly or which may be provided to subsequent image processing operations 204 to result in an outgoing digital image 205.

An embodiment may provide for the image formation signal processing operation 203 to be adjustable responsive to provided configuration commands or control signals 207. An embodiment may provide for the image processing operations 204 could be configurable and adjustable and include the option for a no-change pass-through (no-operation) operation. The image processing operations 204 may be adjustable responsive to provided configuration commands or control signals 208.

In one adaptation of the arrangement of FIG. 2a, the micro-optic structure 201 and the light sensor array 202 are grouped into a first subsystem 211, and the image formation signal processing operation 203 and the subsequent image processing operations 204 are grouped into a second subsystem 212. This adaptation is depicted in FIG. 2b. The adaptation may provide for the image processing operations 204 to be configurable and adjustable, and include the option for a no-change pass-through (no-operation) operation. The image processing operations 204 may be configured or adjusted responsive to provided configuration commands or control signals 208.

In another adaptation of the arrangement of FIG. 2a, the micro-optic structure 201, the light sensor array 202, the image formation signal processing operation 203 are grouped into a subsystem 220. Any subsequent image processing operations 204, should they be needed or provided, are performed outside the subsystem 220. This adaptation is depicted in FIG. 2c.

In another adaptation of the arrangement of FIG. 2a, the micro-optic structure 201, the light sensor array 202, the image formation signal processing operation 203, and any provide support for subsequent image processing operations 204 are grouped into a common subsystem 230. This adaptation is depicted in FIG. 2d. In one arrangement of the adaptation of FIG. 2d the image processing operations 204 could be configurable adjustable, and include the option for a no-change pass-through (no-operation) operation. The image processing operations 204 may be configured or adjusted responsive to provided configuration commands or control signals 208.

Attention is now directed to the relationship and arrangements pertaining to the micro-optic structure 201 and the light sensor array 202. FIG. 3a shows an exemplary arrangement wherein an individual light-sensing element 301 is effectively attached or proximate to a columnated aperture element 302. The columnated aperture element 302 may be implemented as a punctuated mask, structured or etched deposition, micro-array of hollow columnated tubules, etc., and comprises a passage way for light to travel from the outside world to the individual light-sensing element 301 but is otherwise opaque.

The depth of the columnated aperture element 302 is such that light approaching the arrangement from certain angles, such as those depicted as light rays 321 and 322, can reach the light-sensing element 301 but light approaching the arrangement from all other angles, such as the light ray 323, are blocked and absorbed by the walls of the columnated aperture element 302. Light absorption by the walls of the columnated aperture element 302 may be realized by the material used to create the columnated aperture element 302, by a depositional coating applied to the walls of the columnated aperture element 302, or by other means. The individual instances of columnated aperture elements 302 within the micro-optic structure 201 and the individual light-sensing element 301 within the light sensor array 202 is such that light from neighboring columnated aperture elements 302 and individual light-sensing elements 301 does not conduct or refract in such a ways as to create cross-talk or noise conditions among the individual light-sensing elements 301 within the light sensor array 202.

Figure 3B:
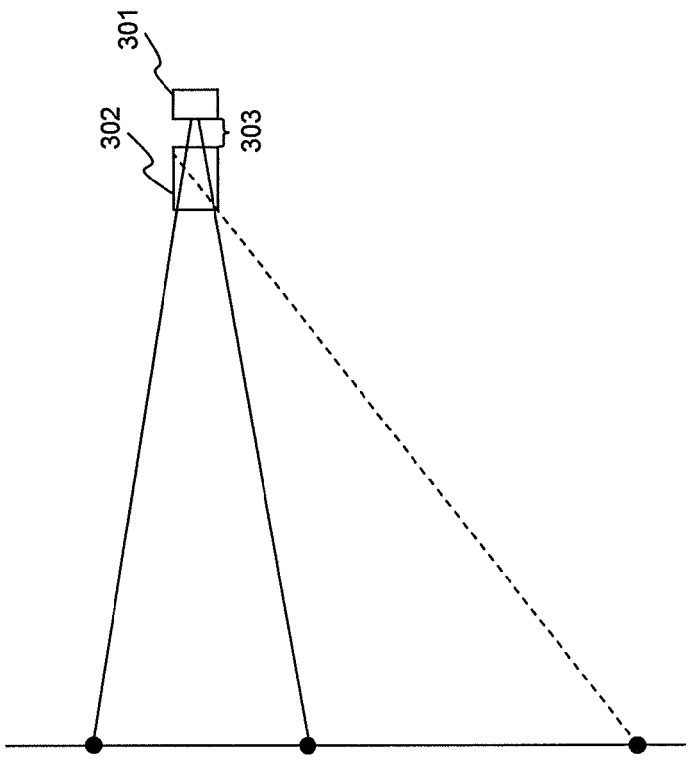
FIG. 3b shows a variation on the arrangement of FIG. 3a wherein the individual light-sensing element is separated from the columnated aperture element by a gap.
Figure 3A:
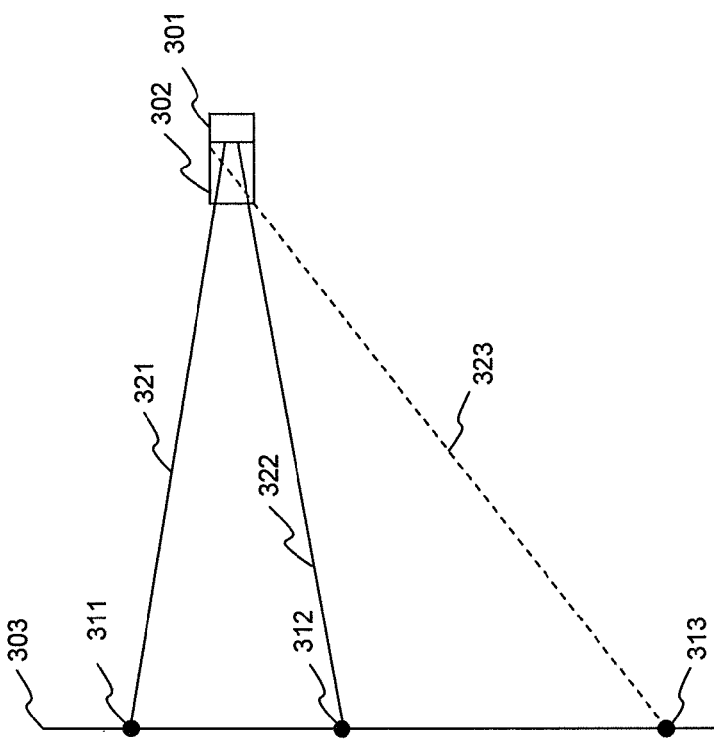
FIG. 3a shows an exemplary arrangement wherein an individual light-sensing element is effectively attached or proximate to a columnated aperture element. The columnated aperture element may be implemented as a punctuated mask, structured or etched deposition, micro-array of hollow columnated tubules, etc., and comprises a passage way for light to travel from the outside world to the individual light-sensing element.

FIG. 3b shows a variation on the arrangement of FIG. 3a wherein the individual light-sensing element 301 is separated from the columnated aperture element 302, by a gap 303. The arrangement involving the gap 303 would need to be implemented such that that light from neighboring columnated aperture elements 302 and individual light-sensing elements 301 does not conduct or refract in such a ways as to create cross-talk or noise conditions among the individual light-sensing elements 301 within the light sensor array 202.

Figure 4B:
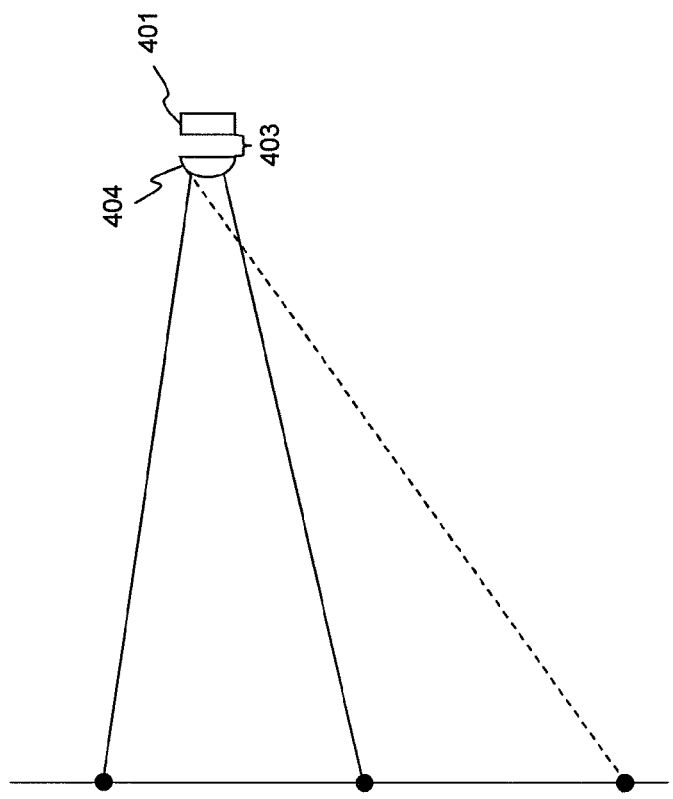
FIGS. 4a and 4b, respectively, depict exemplary variations on the arrangements of FIGS. 3a and 3b wherein the columnated aperture element of FIGS. 3a and 3b has been replaced by a lens.
Figure 4A:
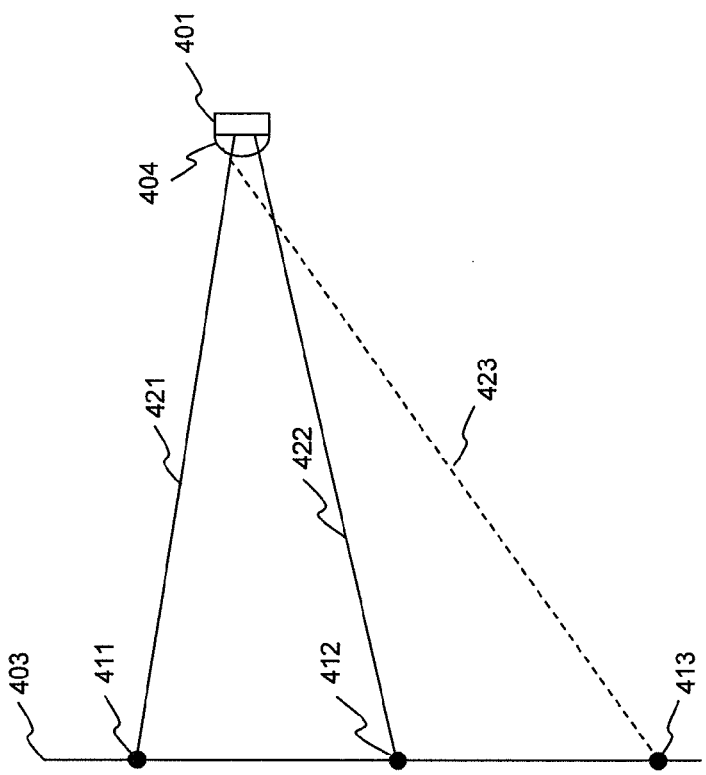

FIGS. 4a and 4b, respectively, depict exemplary variations on the arrangements of FIGS. 3a and 3b wherein the columnated aperture element 302 of FIGS. 3a and 3b has been replaced by a lens 404. Here the lens 404 is depicted as being convex-planar, but it is understood the lens 404 could be concave-planar, binary, Fresnel, etc., and in the case of FIG. 4b may also be convex, binary, Fresnel, etc. on the side of the lens closest to the individual light-sensing elements 401.

Figures 4C, 4D:
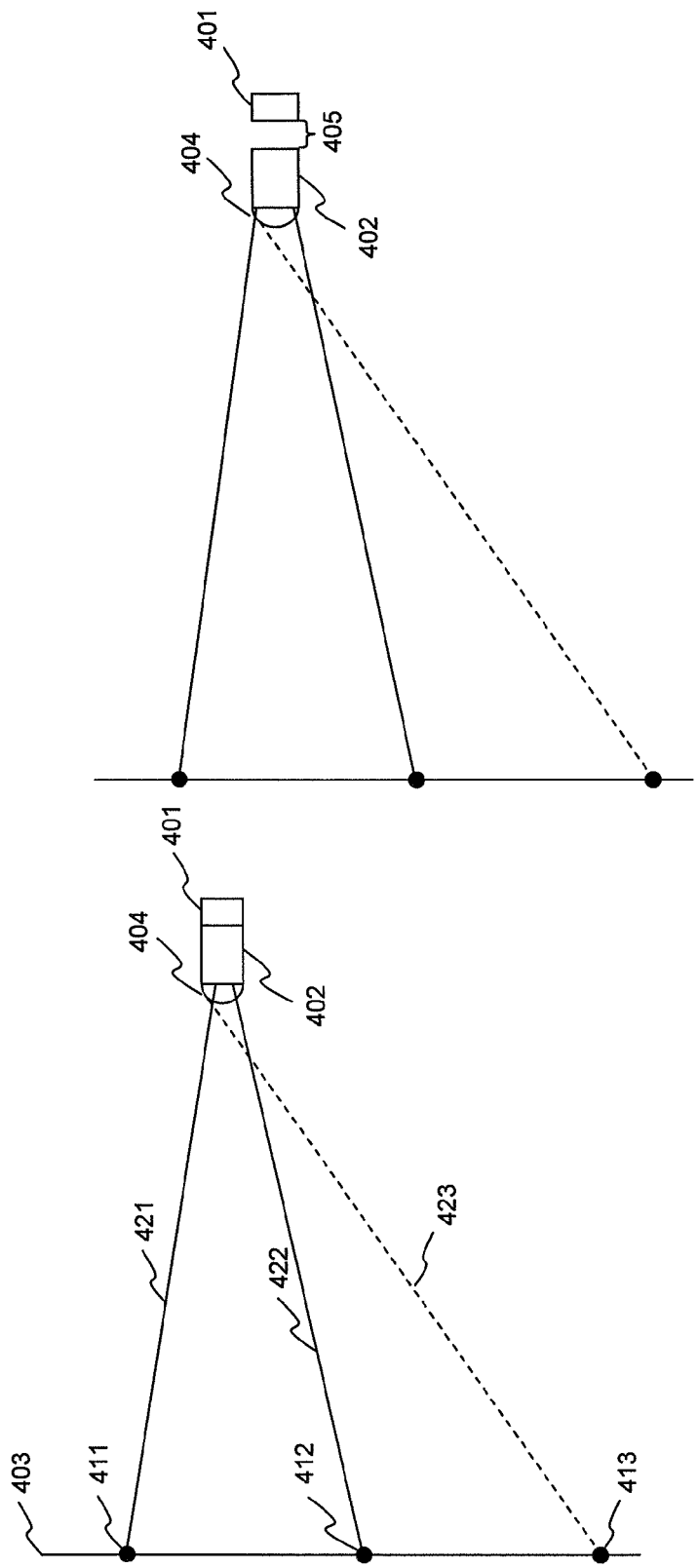
FIGS. 4c and 4d, respectively, depict other exemplary variations on the arrangements of FIGS. 3a and 3b wherein the columnated aperture element has been fitted with a lens on the exterior end.

FIGS. 4c and 4d, respectively, depict other exemplary variations on the arrangements of FIGS. 3a and 3b wherein the columnated aperture element 402 has been fitted with a lens 404 on the exterior end. Here the lens 404 is depicted as being convex-planar, but it is understood the lens 404 could be concave-planar, binary, Fresnel, etc, and may also be convex, binary, Fresnel, etc. on the side of the lens closest to the individual light-sensing elements 401.

Figure 4F:
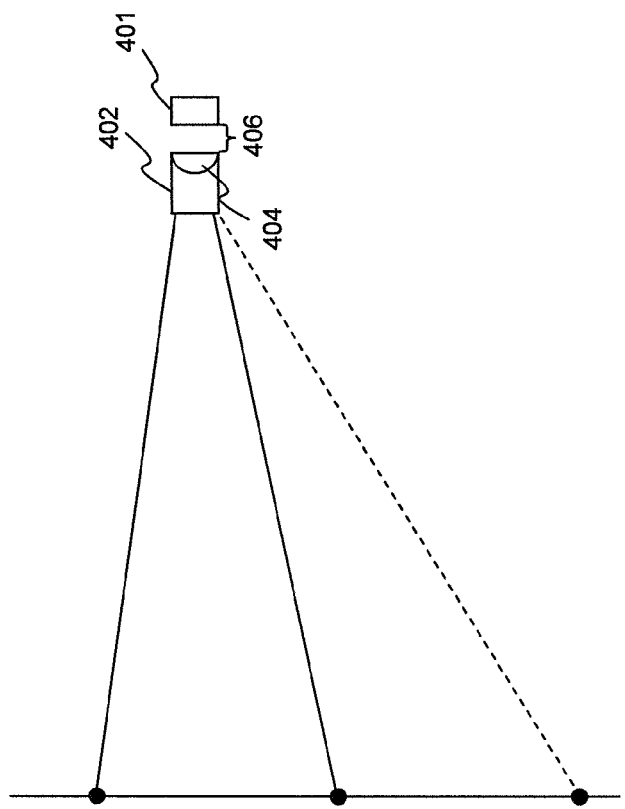
FIGS. 4e and 4f, respectively, depict other exemplary variations on the arrangements of FIGS. 3a and 3b wherein the columnated aperture elements has been fitted with a lens on the interior end.
Figure 4E:
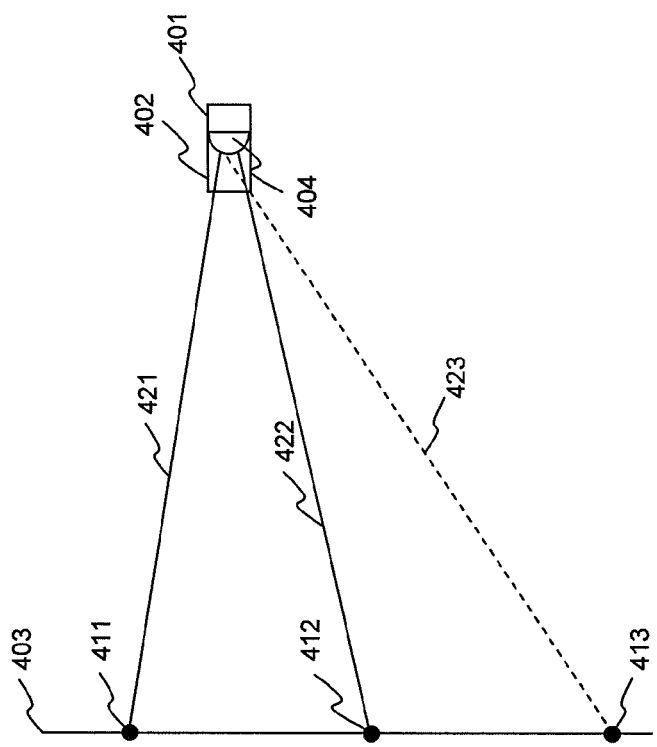

FIGS. 4e and 4f, respectively, depict yet other exemplary variations on the arrangements of FIGS. 3a and 3b wherein the columnated aperture element 402 has been fitted with a lens on the interior end. Here the lens 404 is depicted as being convex-planar, but it is understood the lens could be concave-planar, binary, Fresnel, etc., and in the case of FIG. 4f may also be convex, binary, Fresnel, etc. on the side of the lens closest to the individual light-sensing elements 401.

Figure 4H:
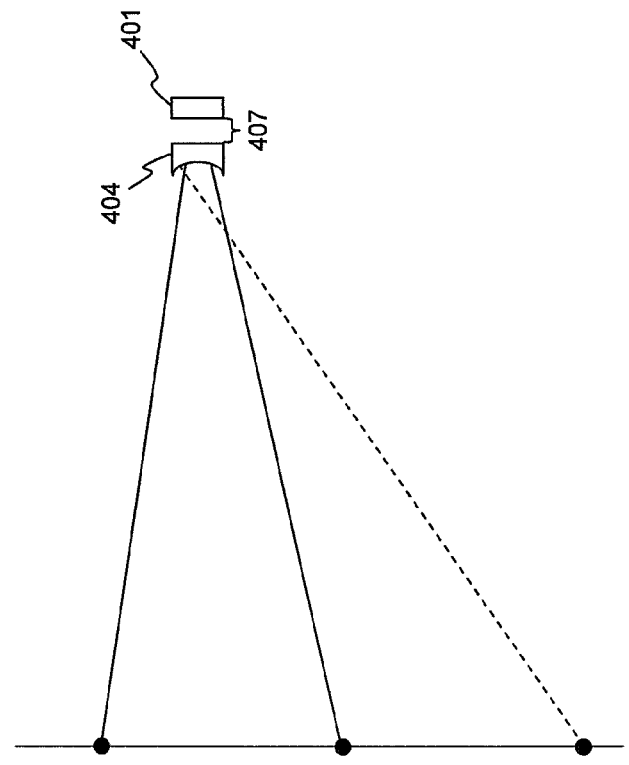
FIGS. 4g and 4h, respectively, depict other exemplary variations on the arrangements of FIGS. 4a and 4b wherein the lens is depicted as concave-planar.
Figure 4G:
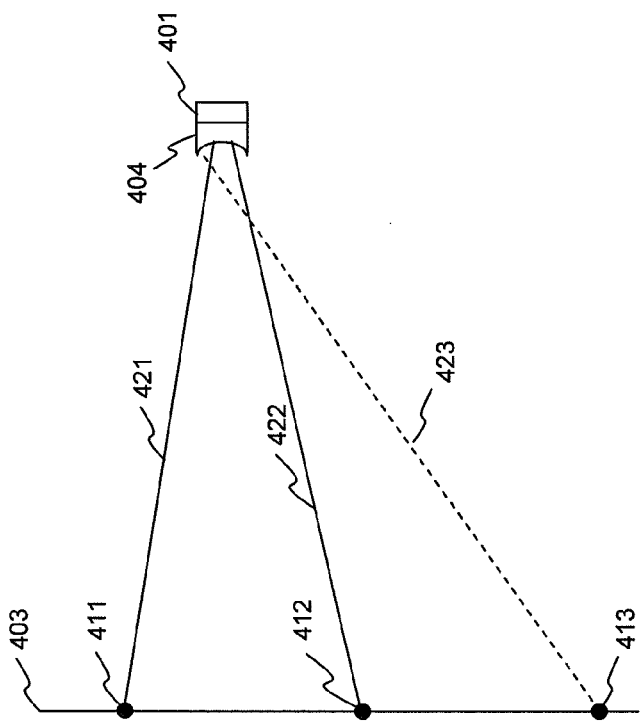

FIGS. 4g and 4h, respectively, depict still yet other exemplary variations on the arrangements of FIGS. 4a and 4b wherein the lens 404 is depicted as concave-planar. In the case of FIG. 4b may also be convex, binary, Fresnel, etc. on the side of the lens closest to the individual light-sensing elements 401.

Many other variations of these types and beyond may be chosen to create various situations that would generate usefully structured light 201a from the scene 201 in accordance with the principles of the invention as would be clear to one skilled in the art and thus are provided for by the invention.

As indicated earlier, the purpose of these micro-optic structure 201 and light sensor array 202 arrangements generate usefully structured light 201a from the scene and in particular to partition the light from the scene so that each of the individual light-sensing elements 301, 401 within the light sensor array 202 obtains a unique one of a plurality of overlapping vignettes derived from the incoming light from the scene.

Figure 5B:
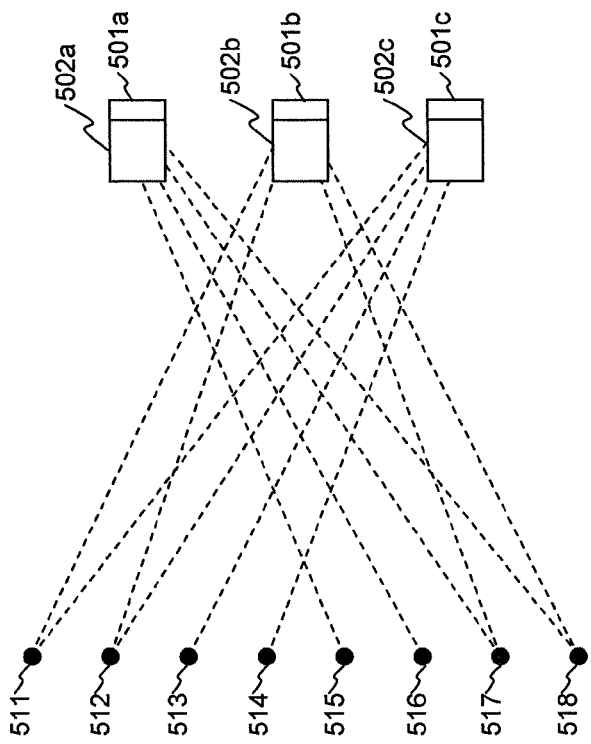
FIGS. 5a and 5b illustrate a representative example of light reflecting or light emitting image elements and an exemplary array of light sensing elements with associated columnated aperture elements. Exemplary rays of light are either passed (FIG. 5a) or blocked (FIG. 5b) by the columnated aperture elements
Figure 5A:
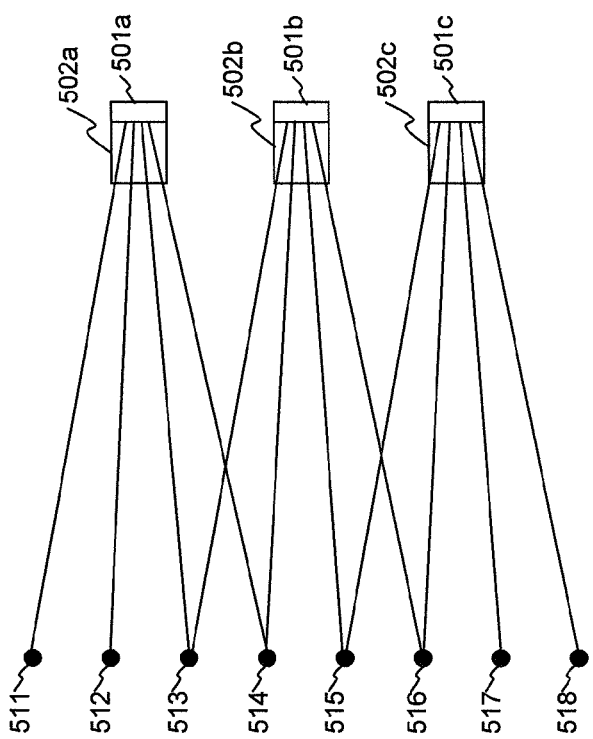

FIGS. 5a and 5b illustrate a representative example of light reflecting or light emitting image elements 511-518 and an exemplary array of light sensing elements 501a-501c with associated columnated aperture elements 502a-502c. Exemplary rays of light from the light reflecting or light emitting image elements 511-518 are either passed through (FIG. 5a) or blocked (FIG. 5b) by the columnated aperture elements 502a-502c. It is noted that in this example, the exemplary scene is planar and oriented perpendicularly to the array of light emitting image elements 501a-501c.

Figure 7B:
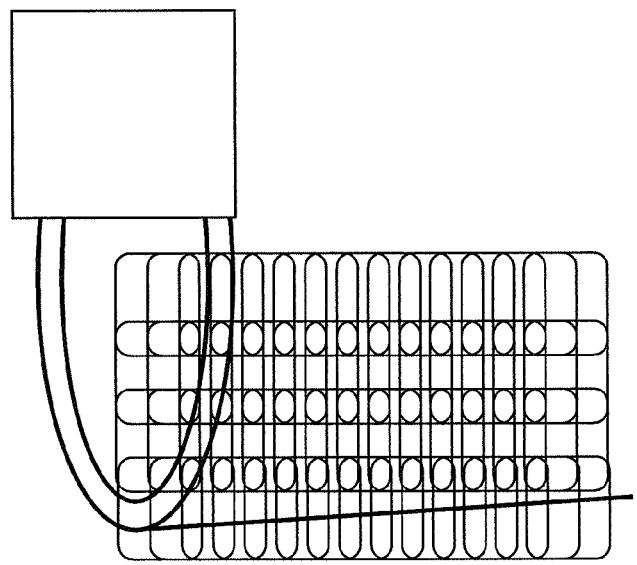
FIG. 7b depicts a variation on FIG. 7a with more or square-shaped or rectangular-shaped vignettes, each created by a particular micro optic structure.
Figure 7A:
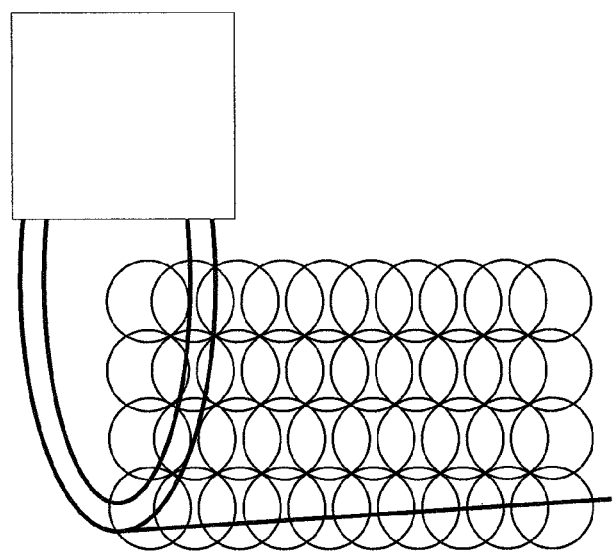
FIG. 7a depicts an exemplary collection of circular or elliptical vignettes, each created by a particular micro optic structure.
Figure 6:
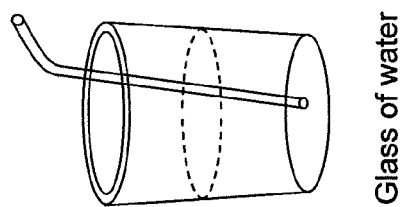
FIG. 6 depicts a scene image of a glass of water that will be the subject image for FIGS. 7a and 7b.

To further appreciate the purpose of these micro-optic structure 201 and light sensor array 202 arrangements, FIG. 6 depicts a scene image of a glass of water that will be the subject image for FIGS. 7a and 7b. FIG. 7a depicts an exemplary collection of circular or elliptical vignettes, each created by a particular micro optic structure (comprising, for example, elements such as 302, 402, 404, etc., as described in conjunction with FIGS. 3a-3b and 4a-4g, a hole in a mask, etc.) and observed by a particular light sensing elements 301, 401 as described in conjunction with FIGS. 3a-3b and 4a-4g. FIG. 7b depicts a variation on FIG. 7a with more or square-shaped or rectangular-shaped vignettes, each created by a particular micro optic structure.

Note in comparison with the type of imaging done with pinholes and lenses (cf. FIGS. 1a and 1b), wherein the image is viewed from below for areas of the scene that are above the lens and viewed from above for areas of the image that are below the lens, these vignettes are viewed straight-on. Under these circumstances the image produced is somewhat different from that as would be formed by a lens or pinhole arrangement such as those depicted in FIGS. 1a and 1b. In some embodiments, it may be advantageous to adjust the directional orientations of the micro-optic structures to various angles so as to obtain other times of image acquisition geometries.

Figure 8:
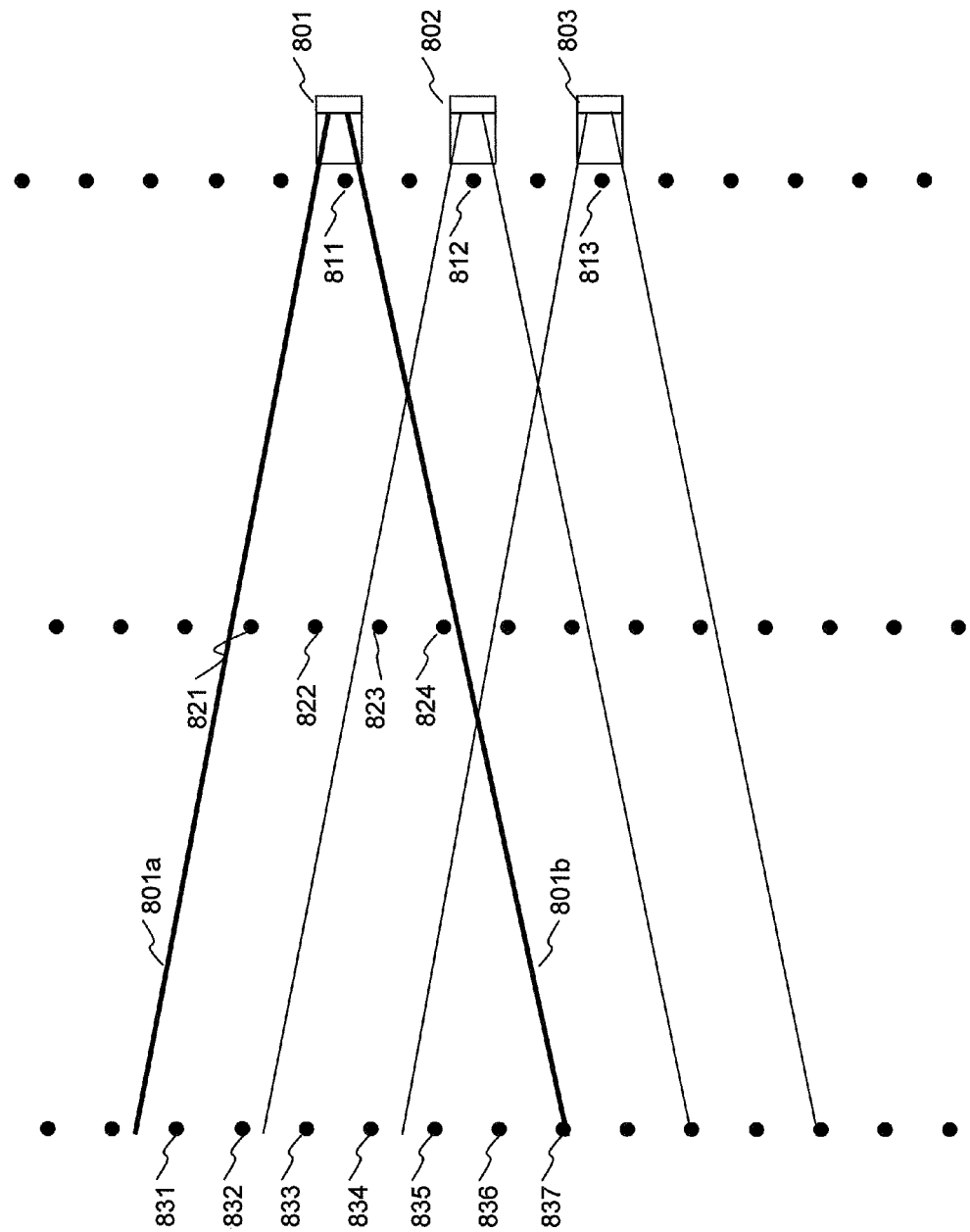
FIG. 8 illustrates the process by which the degree of vignette overlap increases as separation between the object in the scene and its distance from the micro-optic structure and light sensor array increases.

Further, it is noted that the degree of overlap of the vignettes is typically a function of the separation distance between a scene object and the micro-optic structure 201 and light sensor array 202. FIG. 8 illustrates the process by which the degree of vignette overlap increases as separation between the object in the scene and its distance from the micro-optic structure 201 and light sensor array 202 increases. In FIG. 8, light sensing element 801 is depicted with a conical light capture range bounded by boundaries 801a and 801b. When the object is in contact or near contact with the micro-optic structure 201 and light sensor array 202, the size of each light capture area is very locally defined, in this case depicted so that light reflected or radiating from an object location 811, 812, 813 immediately adjacent to a particular light capture aperture and associated light sensing element 801, 802, 803, etc. is capture only by that particular light capture aperture and associated light sensing element. In FIG. 8, the spacing between neighboring object locations of 811, 812, 813 is uniform, and is the same for neighboring object locations subsequently discussed object locations 821, 822, 823, 824 and 831, 832, 833, 834, 835, 836, 837.

At a farther separation distance, the light capture vignettes begin to both expand and overlap. For example, at a farther separation distance the conical light capture range for light sensing element 801 (bounded by boundaries 801a and 801b) expands to include additional object locations 821, 822, 823, 824. Further, light reflecting or radiating from object locations 823, 824 are also captured by light sensing element 802, meaning object locations 823, 824 are in an area of overlap of the conical light capture range for light sensing element 801 and the conical light capture range for light sensing element 802. At a yet farther separation distance the conical light capture range for light sensing element 801 (bounded by boundaries 801a and 801b) expands to include additional object locations 831, 832, 833, 834, 835, 836, 837. Of these, object locations 833, 834, 835, 836, 837 are also captured by light sensing element 802 and 835, 836, 837 are also captured by light sensing element 803. Thus object locations 835, 836, 837 are in an area of three-way overlap of light sensing elements 801, 802, and 803. As can be seen, a simple "similar triangles" argument from high-school geometry shows that the conical light capture range of a given light sensing element expands linearly in width as the radial separation distance increases.

Figure 1E:
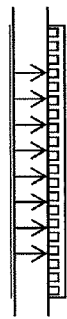
FIG. 1e shows a side view of such arrangements, depicting light rays directed to the geometrically-linear image sensor array.
Figure 9D:
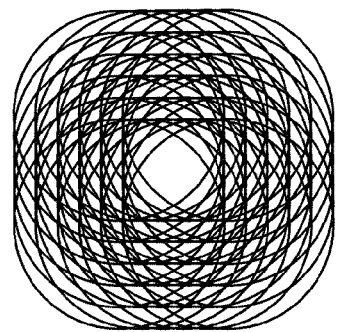
FIGS. 9a-9d illustrate how the degree of vignette overlap increases from 0% to values approaching 100% as the separation distance between a scene object and the micro-optic structure and light sensor array increases.
Figure 9C:
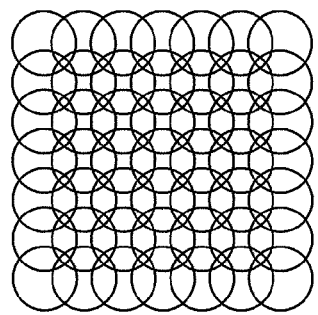
Figure 9B:
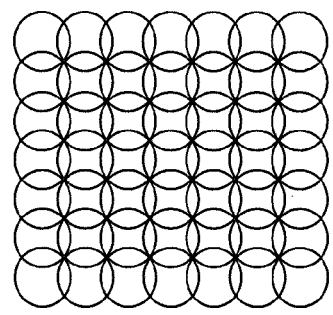
Figure 9A:
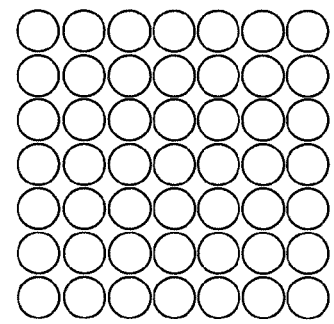

FIGS. 9a-9d illustrate how the degree of vignette overlap increases from 0% to values approaching 100% as the separation distances between a scene object and the micro-optic structure and light sensor array. When the scene object is in or very nearly in direct contact with the micro-optic structure 201 and light sensor array 202, the system can be designed so that there is no overlap between vignettes, as shown in FIG. 9a. This corresponds to the contact imaging systems such as depicted in FIGS. 1d and 1e. As the source of the image moves away from the sensor array, the natural ray geometry brings more of the image scene into the light capture aperture 302, 402 of each light sensing element 301, 402, 801, etc. At some point in the increased separation, the portions of the image scene will reflect or radiate light into more than one light capture aperture and its associated light sensing element, creating an overlap in vignettes between at least adjacent light capture apertures and associated light sensing elements as depicted in FIG. 9b. As the separation distance increases between scene object and the micro-optic structure 201 and light sensor array 202, the overlap in vignettes between light capture apertures and associated light sensing elements also increases further, as suggested by FIG. 9c. As the separation distance between scene object and the micro-optic structure 201 and light sensor array 202 becomes very large, the overlap in vignettes between light capture apertures and associated light sensing elements become significant, and eventually to the point where they nearly coincide, as suggested by FIG. 9d.

Figure 10A:
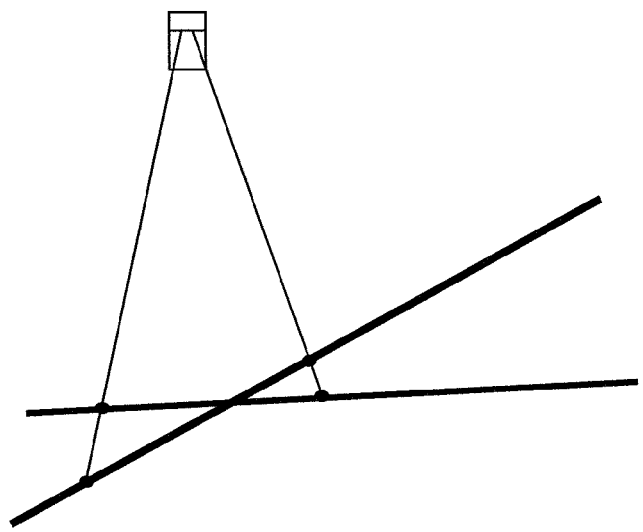
FIG. 10a depicts a scene object that slanted with respect to the camera sensor that will result in a different capture range than the more vertical scene object, and those at the top of the depicted slanted scene object surface will have more overlapping vignettes than those at the bottom of the depicted slanted scene object surface.
Figure 10B:
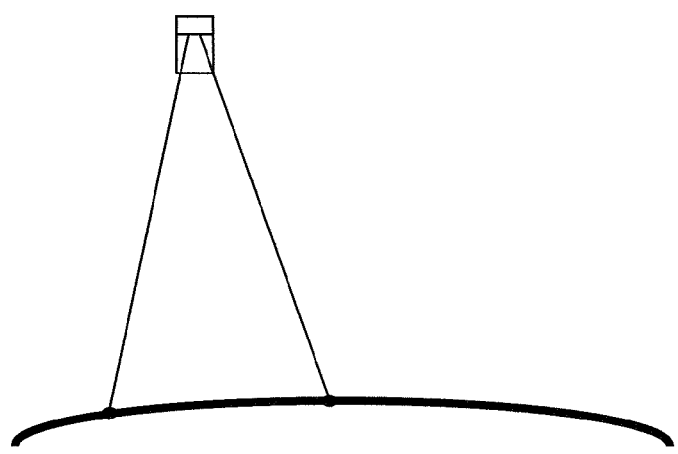
FIGS. 10b and 10c depict scene objects with curved surfaces that will result in varying degrees of vignette overlapping over the scene object surface.
Figure 10C:
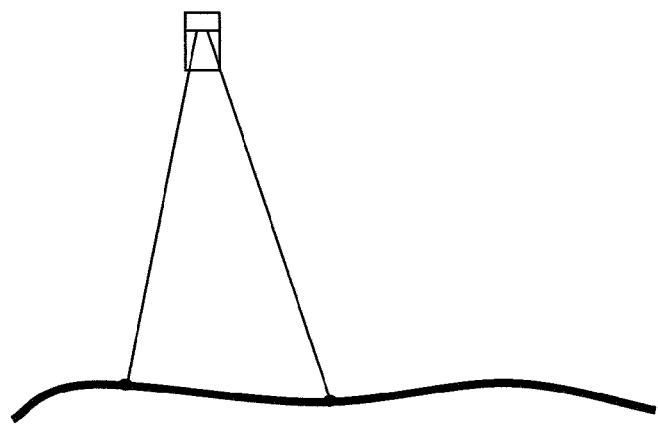

This process and effect is not dissimilar from the decrease in resolution and resolving power of conventional lens-based optical imaging systems as subject objects in the image appear increasingly far from the lens projecting a formed image on a resolution-limited sensing element such as a CCD light sensing array film emulsion, or photographic plate. It also has implications for objects that are not coplanar to the micro-optic structure 201 and light sensor array 202. For example, in FIG. 10a the slanted scene object surface has a different capture range than the more vertical scene object surface, and those at the top of the depicted slanted scene object surface will have more overlapping vignettes than those at the bottom of the depicted slanted scene object surface. Similarly, scene objects with curved surfaces, such as the strictly convex example of FIG. 10a and the undulating curvature example of FIG. 10b, will also experience varying degrees of vignette overlapping over the scene object surface.

Figure 1F:
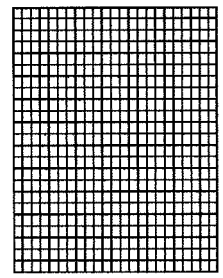
FIG. 1f depicts an exemplary direct view of a two-dimensional micro-optic structure and light sensor array as provided for by the invention.
Figure 1A:
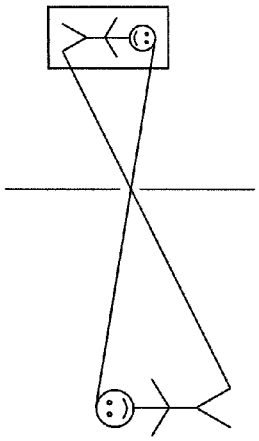
FIG. 1a depicts the exemplary use of a small pinhole aperture employed for image formation for light passing through an aperture as may be used in a "pinhole camera" or camera obscura.
Figure 1B:
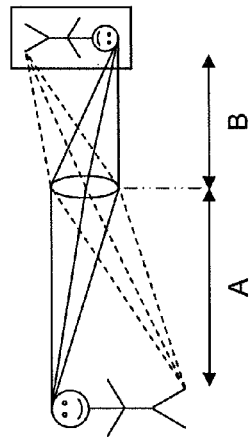
FIG. 1b shows the exemplary use of a lens or system of lenses employed for image formation for light passing through an aperture onto a focal plane on the opposite side of the lens.
Figure 1C:
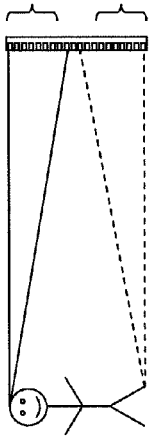
FIG. 1c depicts a "contact" imaging arrangement comprising a geometrically-linear array of light sensors positioned effectively directly upon a flat illuminated object such as a sheet of paper.
Figure 11C:
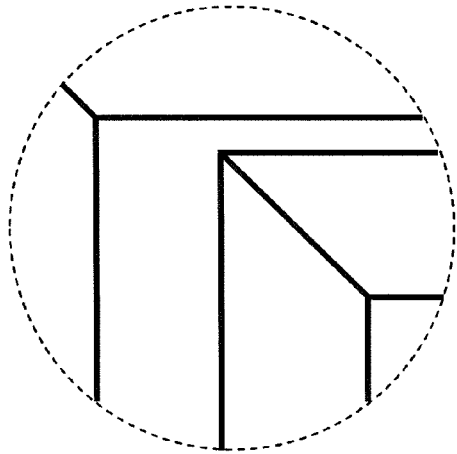
FIG. 11a depicts an exemplary three-dimensional scene involving two blocks and a spherical ball as observed by a two-dimensional micro-optic structure and light sensor array.
FIG. 11b shows a view akin to that observed by the two-dimensional micro-optic structure and light sensor array, with the dotted area shown in FIG. 11c in an expanded view.
Figure 11B:
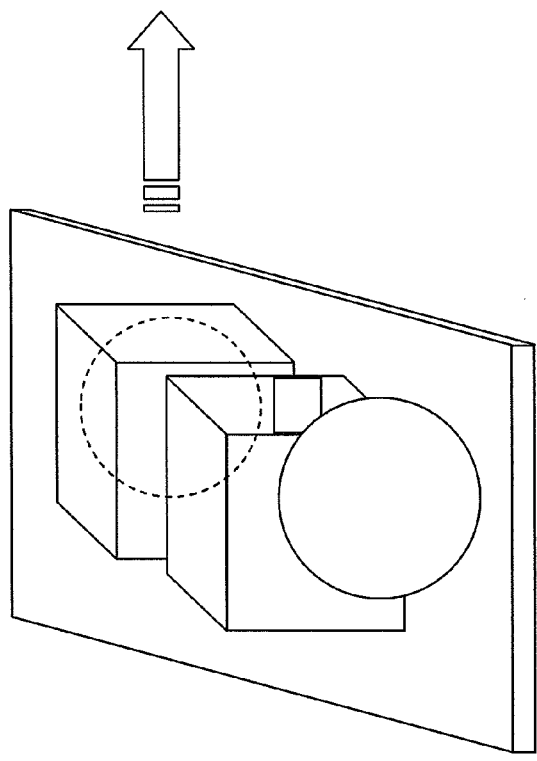

As the object scene grows in geometry complexity, additional phenomena become apparent. FIG. 11a depicts an exemplary three-dimensional scene involving two blocks and a spherical ball as observed by a two-dimensional micro-optic structure 201 and light sensor array 202, the latter shown in profile. The two-dimensional micro-optic structure 201 and light sensor array 202 could, for example, appear in direct view as shown in FIG. 1f. FIG. 11b shows a view akin to that observed by the two-dimensional micro-optic structure 201 and light sensor array 202, with the dotted area shown in FIG.

11c in an expanded view. The object scene of FIG. 11b involves a curved surface, with implications as discussed in conjunction with FIG. 10b, edges of the cubes that comprise slanted surfaces, with implications as discussed in conjunction with FIG. 10a, and boundary issues wherein the edge of a nearer object abruptly ends and the surface of a more distant object appears. These all present image formation challenges to be considered and addressed.

Figure 12C:
FIG. 12c shows an exemplary realization of a multiple-pixel light sensing element.
Figure 12B:
FIG. 12b shows a variation of FIG. 12b wherein the single pixel light sensor is smaller than the area of the columnated aperture.
Figure 12A:
FIG. 12a shows an exemplary columnated aperture covered by a single pixel light sensor.

Further, the various cases described thus far can comprise a variety of light sensor elements. FIG. 12a shows a simple case wherein the full area of an exemplary columnated aperture is covered by a single pixel light sensor. FIG. 12b shows a variation of this wherein the single pixel light sensor is smaller than the area of the columnated aperture. An alternate implementation of effect realized by the arrangement of FIG. 12b can be obtained by placing a restrictive mask over the light sensor, so as to reduce its light-sensing area, in the implementation of FIG. 12a. Other alternative implementations are clear to one skilled in the art and are provided for by the invention. Also, each light sensor itself can be single pixel, multi-pixel, monochrome, color, multiple-wavelength, etc. This is provided for by the invention. FIG. 12c shows an examplary realization of a multiple-pixel light sensing element; either or both stacked and/or adjacent color and multiple-wavelength light sensors.

In one embodiment of the invention, image formation is realized by performing linear transformations on the measurements made by the sensor array. The type and coefficient particulars of the resulting action of the linear transformation depend on details of the two-dimensional micro-optic structure 201 and light sensor array 202, as well as the details of the type of imaging desired and ranges of separation distance involved in the scene to be observed. In general, particularly for early product manufacture, the two-dimensional micro-optic structure 201 and light sensor array 202 may be difficult to reproducibly fabricate within necessarily accurate tolerances so that linear transformations can be made to match an a priori family of linear transformation coefficients. Further, it is likely desirable that a two-dimensional micro-optic structure 201 and light sensor array 202 with spot variations or defects (either present at time of manufacture or appearing as the result of aging or damage) or systemic parameter drift over time or temperature may also prevent high performance with the use of an a priori family of linear transformation coefficients. FIG. 13 illustrates a procedure for obtaining a linear transformation that is matched to a particular two-dimensional micro-optic structure 201 and light sensor array 202. This procedure may be applied to each two-dimensional micro-optic structure 201 and light sensor array 202 manufactured, or to a two-dimensional micro-optic structure 201 and light sensor array 202 arrangement representative of a group or lot within specific tolerances, or for an individual two-dimensional micro-optic structure 201 and light sensor array 202 at one or more times over its lifetime. In one embodiment, the arrangement of FIG. 13, or variations of it apparent to one skilled in the art, may be built into a camera product for the purpose of ongoing or as-needed self-contained calibration.

In FIG. 13, a light field from a (for example, pixilated) test image 1300 is directed to a given two-dimensional micro-optic structure 1301 and light sensor array 1302 to produced measured data that may be stored in a record 1304 for use in an analysis function 1305. In another implementation, the measured data from the light sensor array 1302 may be passed directly to the analysis function 1305. The analysis function 1305 produces a measured linear transformation 1306. From this, the inverse of the measured linear transformation is computed 1307 resulting in a computed inverse transformation 1308 associated with the measured given two-dimensional micro-optic structure 1301 and light sensor array 1302. The inverse transformation may be computed in any number of ways, including deconvolution, spectral inversion, generalized inverse/pseudoinverse, Gaussian Elimination, etc. Deconvolution for images is well-known; see for example see Peter A. Jansson, *Deconvolution of Images and Spectra* (updated Second Edition available from Dover, N.Y., 2008, ISBN 9780486453255) and many contemporary references on image processing. An exemplary method using a (Moore-Penrose) psuedoinverse is provided later in the specification.

It is noted that the computed inverse transformation 1308 may take on a number of structural forms. In one embodiment, the computed inverse transformation 1308 is represented by a 4-dimensional array equivalent to a tensor operating on one or more matrices (equivalent to a two-dimensional data array) so as to produce another one or more matrices (equivalent to a two-dimensional data array). In another embodiment, wherein image data is organized as a (long) vector or data stream, the computed inverse transformation 1308 is represented by a (large) matrix or equivalent arrangement for linear computation. It is noted that in many implementations it may be advantageous to perform the computations involved with the computed inverse transformation 1308 directly on a data stream produced by sequenced scans of the light sensor array 1302.

FIG. 14 shows how the resulting computed inverse transformation 1308 associated with the measured given two-dimensional micro-optic structure 1301 and light sensor array 1302 can then be used for image formation. A scene image 1400 is applied to associated two-dimensional micro-optic structure 1301 and light sensor array 1302 to produce data that is operated on by the computed inverse transformation 1308 associated with the measured given two-dimensional micro-optic structure 1301 and light sensor array 1302. This produces at least an image of at least a raw form 1401 which can either be used directly or subjected to additional image processing 1402 to produce enhanced images.

In order for the inverse transformation 1308 to exist mathematically for the number of pixels comprised in a final image 1401, the measured linear transformation 1306 must have sufficient rank (in the sense of linear transformations, matrices, and operators). This is equivalent to the condition that in order to solve for N unknown variable there must be at least N linearly-independent equations. Should there be fewer than N linearly-independent equations, there are not enough equations to solve for the values of the pixels in the a final image 1401; accordingly the rank of the measured linear transformation 1306 is less than N. Should the number of equations be more than N, the system can be over-specified. This is not a problem should the extra equations be linearly-dependent on some subset of N linearly-independent equations. In actuality, however, this cannot be casually or even stringently assured in measurements made of a physical system. Thus the given two-dimensional micro-optic structure 1301 and light sensor array 1302, together with any actions imposed on the data by the interface to light sensor array 1302, must be such that at least a sufficient number of linearly independent equations be represented in the measured linear transformation 1306, and additionally the computation 1307 resulting in a computed inverse transformation 1308 associated with the measured given two-dimensional micro-optic structure 1301 and light sensor array 1302 must be such that any over-specified data be used or sufficiently parsed and discarded as appropriate.

Figure 15:
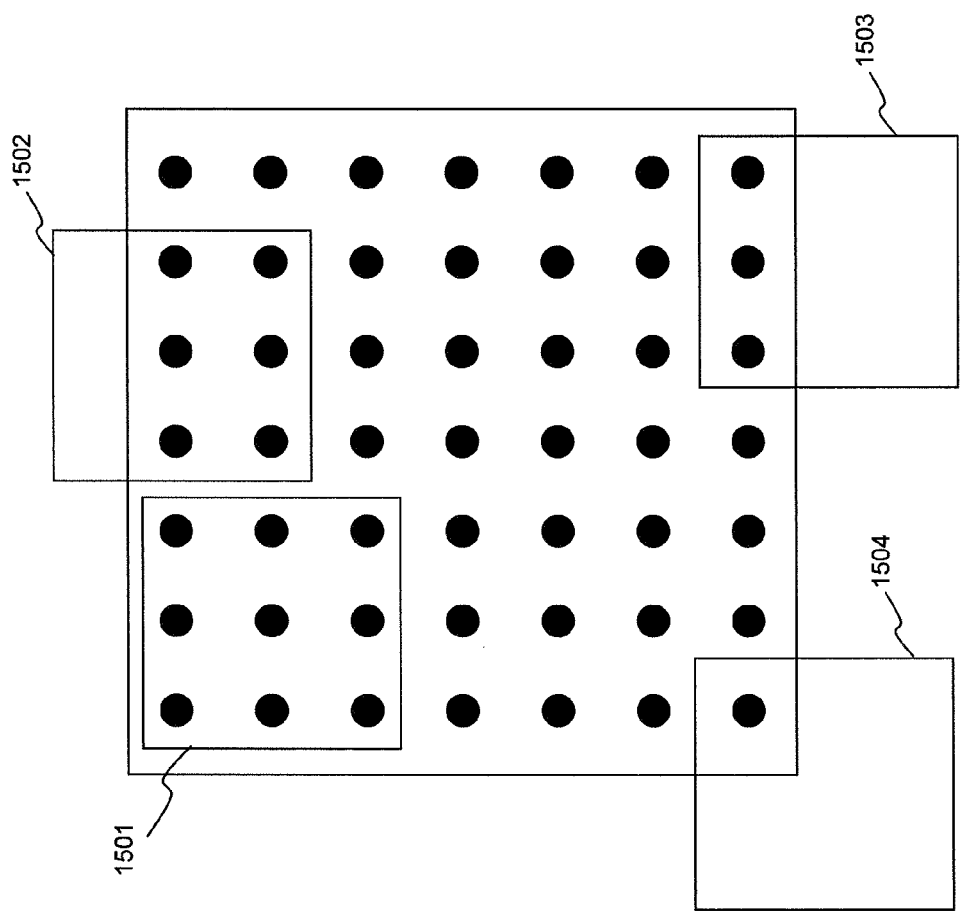
FIG. 15 depicts the aperturing of a pixilated test image such as may serve as the test image in FIG. 13.

FIG. 15 depicts exemplary aperturing of an exemplary pixilated test image such as may serve as the test image 1301 in FIG. 13. The exemplary apertures here are depicted as squares, but may take on other shapes such as circles, ellipses, rectangles, diamonds, crosses, etc. as may correspond to the non-zero transmission patterns encountered in the design of the two-dimensional micro-optic structure 1301 and light sensor array 1302. Aperture 1501 is comprises only pixels in the test image pixel array and is fully populated with those pixels. Aperture 1502 comprises fewer of these image pixels by virtue of a 1-pixel overreach off the edge of the image in one direction. Aperture 1503 comprises yet fewer of image pixels by virtue of a 2-pixel overreach off the edge of the image in the opposite direction. Aperture 1504 comprises yet fewer of image pixels by virtue of a 2-pixel overreach off the edge of the image both orthogonal directions. As a result of the aperture size, aperture 1504 results in the capture of only a single pixel from the test image.

Each light sensor thus measures a linear combination of the light amplitudes of at least one pixel in the test image and typically as many pixels in the test image as the aperture permits. Thus the output from each light sensor effectively represents an equation, and in that each light sensor measures a distinct collection of pixels, there is a structure by which at least a number of linearly-independent equations can be had. A key goal is to ensure that the arrangement results in an adequate number of linearly-independent equations so that an inverse linear transformation exists and can be computed. An additional requirement could include that the collection of equations are such that the resulting matrix associated with the resultant system of equations is sufficiently non-singular to prevent numerical problems in calculating the computed inverse transformation 1308.

Figure 16:
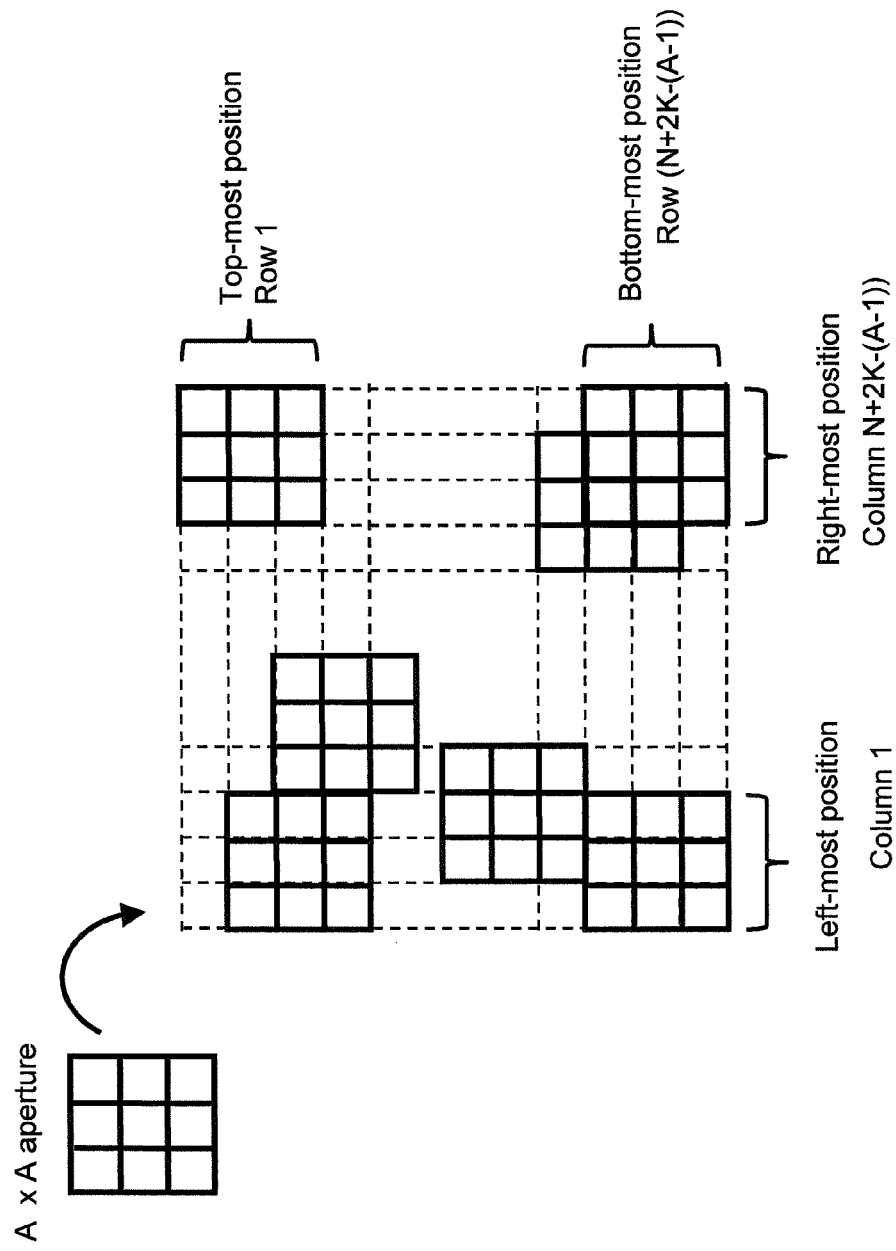
FIG. 16 shows various displacements of an A×A aperture within an N×N image pixel array.

It can be readily seen that the number of measurements depends on the number of pixels in an image, the number of pixels in an aperture, and the number of pixels the aperture is allowed to overreach the edges of an image. Let the array be N×M, and consider the side of the image that has dimension N. An aperture of size A on the corresponding side can be positioned at N−(A−1) or N−A+1 locations along that side of the image, as can be confirmed by visual inspection of a diagram such as FIG. 16 which shows various displacements of an A×A aperture within an N×N image pixel array.

In the case of FIG. 15, N=7 and A=3 so N−A+1=5, which again can be confirmed by visual inspection of FIG. 15.

Each permitted pixel of overreach adds a count of two to the quantity N−A+1, so for K pixels of permitted overreach, the number of measurements is N−A−1+2K. If one pixel of overreach is permitted in FIG. 15 (i.e., K=1), N−A−1+2K=7. If two pixels of overreach is permitted in FIG. 15 (i.e., K=2), N−A−1+2K=9.

This count scheme applies in each dimension so for an N×M test image the total number of measurements is (N−A+1+2K)*(M−A−1+2K). This count scheme can be adjusted for other types of aperture shapes and differing overreach policies in each direction as is apparent to one skill in the art and as such are provided for by the invention.

In the case of a square N×N test image the count is the aforementioned formula evaluated with N=M, or (N−A+1+2K)$^2$. For the case of FIG. 15 (N=7, A=3):

If no overreach is permitted (i.e., K=0), the test image comprises 7×7=49 pixels while the total measurement count is $(7-3+1)^2=25$. In this case there are not enough equations to recover the original 49 pixels, only enough for a 25-pixel decimated version of the test image.

If a one pixel of overreach is permitted (i.e., K=1), the test image comprises 7×7=49 pixels while the total measurement count is $(7-3+1+2)^2=49$. In this case there are exactly enough equations to recover the original 49 pixels assuming all measurements are of sufficient quality and that the system of equations is not numerically unstable (due to a corresponding near-singularity in the measured linear transformation 1306).

If a two pixel overreach is permitted (i.e., K=2), the test image comprises 7×7=49 pixels while the total measurement count is $(7-3+1+4)^2=81$. In this case there are far more than enough equations to recover the original 49 pixels should at least 49 of the equations be linearly independent.

For the system of equations to be over-specified, the apertures and overreach must be engineered so that 2K+1>A. When the system of equations is over-specified, some of the equations can be discarded, but the extra equations can be used to build robustness into the computed inverse transformation 1308 as will be explained.

Figure 17:
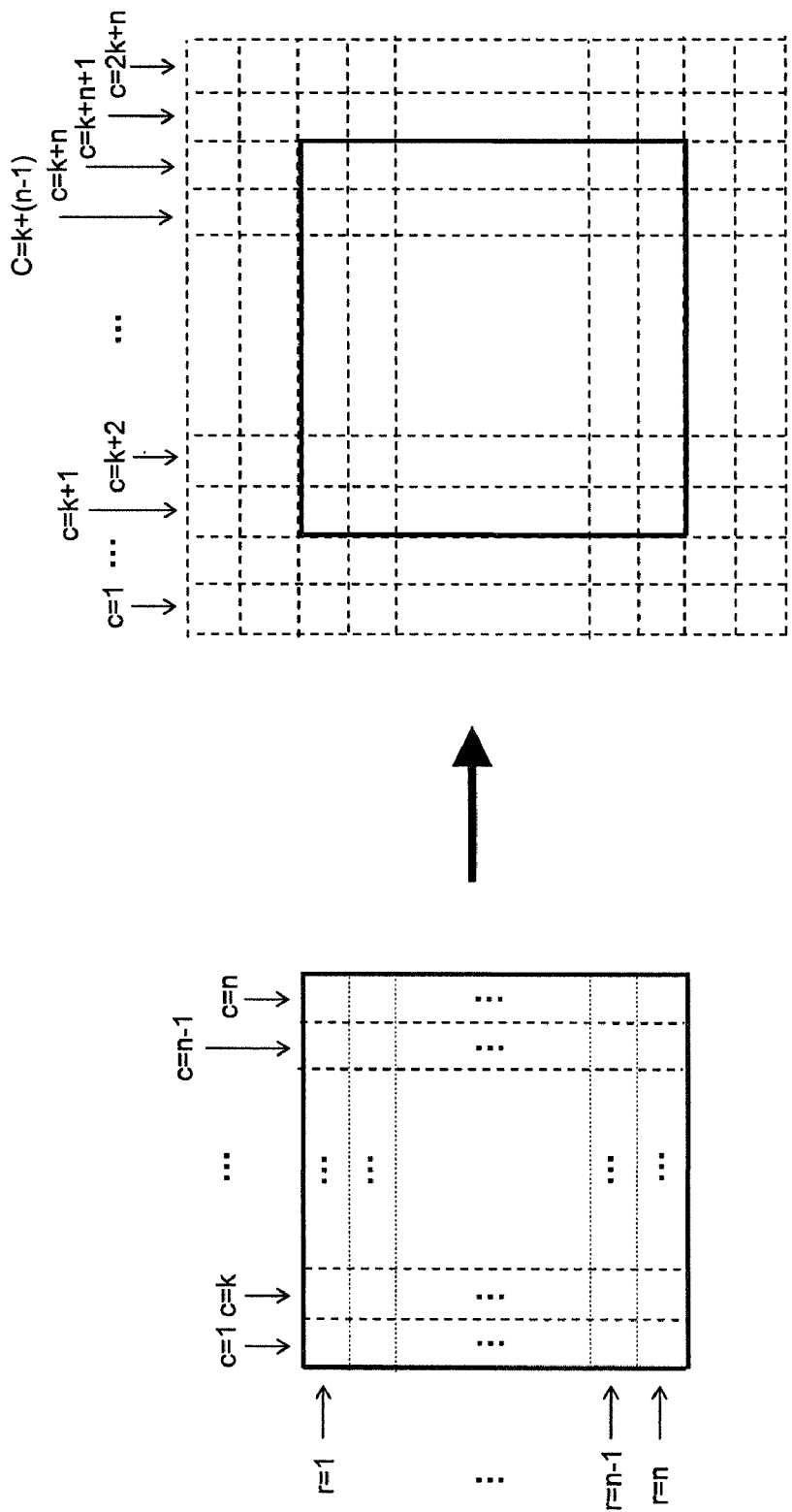
FIG. 17 depicts how a border of additional pixels in the light sensor array can be adapted to provide data for the overreach pixels.

As to overreach processes, there are at least two possible approaches plus various combinations of these as provided for by the invention. In one exemplary embodiment, the overreach pixel locations are ignored. In another exemplary approach, the recovered image 1401 is smaller than the light sensor array 1302. The additional pixels in the light sensor array 1302 provide data for the overreach pixels as depicted in FIG. 17.

The chosen aperture model and overreach policy is organized as assuming the image to be calculated 1401 is set to be n-row by m-column. In one embodiment, an over-specified the measured linear transformation 1308 is obtained for the N-row by M-column image.

Test images can be applied to obtain the measured linear transformation 1308. Such a measurement can be obtained in any number of ways as would be clear to one skilled in the art and these are provided for by the invention. For example, individual pixels of an LCD or LED display can be lit sequentially with calibrated brightnesses. In another example, sufficiently isolated combinations of pixels of an LCD or LED display can be lit sequentially with calibrated brightnesses. In another example, a fixed test pattern with associated spatio-spectral properties can be used and more intensive computations used obtain the measured linear transformation 1308.

In one embodiment, the observed image is represented by a single one-dimensional vector or data stream. This representation can be obtained in any number of ways as would be clear to one skilled in the art and these are provided for by the invention. For example, a pixel in an N-row by M-column image array, said pixel having row and column index (r, c), would be assigned to vector or data stream position M*r+c. In another example, the same pixel could be assigned to vector or data stream position r+N*c. In such an arrangement, the measured linear transformation 1308 is a sparse N*M by n*m matrix, at least in abstract mathematical representation. For large values of N, n, M, and m, other computer representations of the measured linear transformation 1308, such forms of linked lists, may be used. If either of N>n and/or M>m, the resulting matrix is note square and the system of equations is over-specified.

The traditional solution to a linear vector equation comprising a linear transformation by a matrix requires the matrix to be square and nonsingular. For a non-square matrix it is possible to use one form or another of a generalized inverse or pseudo-inverse linear operator. In an exemplary embodiment of interest, the Morse-Penrose pseudo-inverse is used. The Morse-Penrose pseudo-inverse employs a least-squares fitting of the inverse through the over-specified data in the original rectangular matrix. This least-squares result builds a robustness into the structure and performance of the inverse as outlier measurements are naturally compensated for by the least-squares fitting.

As a simple demonstration, one skilled in the art can begin with a small monochrome pixel array, for example 20×20, comprising a recognizable image with features that can be easily scrutinized. (Alternatively, a table of arbitrary numbers could be used in place of an image.) The image will be used as a scene image 1400. Its (square) array of pixels is reorganized into a (400-entry) test image vector using one or the other of the N*r+c or r+N*c formulas described above. The aperture arrangement and measured linear transformation 1306 can be emulated by a small aperture matrix, for example 2×2. For a simple illustrative example, all entries in the 2×2 aperture matrix can be set to 1. A nested loop can be used to perform conditional tests on iterated indices to produce the emulated measured linear transformation 1306, which in the case of 1-pixel overreach will be a large rectangular matrix of size 400×441. A Morse-Penrose pseudo-inverse operation can be applied to this matrix—for example if the calculations are done in the Mathematica programming language, there is a primitive function available for performing the Morse-Penrose pseudo-inverse—to produce the computed inverse transformation 1308 (in this case, a 441×400 matrix).

The image vector is operated on by the emulated measured linear transformation 1306 (the 400×441 matrix) to produce a (441-entry) emulated light sensor array 1302 data output, representing an actual data output vector or a data stream. If desired in this calculation small quantities of random noise or other deviations can be added to the non-zero entries of the emulated measured linear transformation 1306 (400×441) matrix to simulate imperfect measurements.

The Morse-Penrose pseudo-inverse computed inverse transformation 1308 (441×400 matrix) is applied to the (441-entry) light sensor array data vector (data stream) to produce a (400-entry) vector representing the pixel values of the computed image 1401. This vector is organized into a 20×20 array by inverting the previously chosen one of the N*r+c or r+N*c formulas. This 20×20 array is rendered as an image (or viewed as an array of numbers) and compared to the original. In the case of no noise to perturb the emulated measured linear transformation 1306, the original image 1400 and calculated image B are identical. In the case of a small amount of noise to perturb the emulated measured linear transformation 1306, the Morse-Penrose pseudo-inverse performs more work and original image 1400 and calculated image 1401 differ somewhat.

Use of LED Arrays as Light Sensors and Time-Multiplexed Sensor-Displays

Light detection is typically performed by photosite CCD (charge-coupled device) elements, phototransistors, CMOS photodetectors, and photodiodes. Photodiodes are often viewed as the simplest and most primitive of these, and typically comprise a PIN (P-type/Intrinstic/N-type) junction rather than the more abrupt PIN (P-type/N-type) junction of conventional signal and rectifying diodes.

However, virtually all diodes are capable of photovoltaic properties to some extent. In particular, LEDs, which are diodes that have been structured and doped specific types of optimized light emission, can also behave as at least low-performance photodiodes. In popular circles Forrest M. Mims has often been credited as calling attention to the fact that that a conventional LED can be used as a photovoltaic light detector as well as a light emitter (Mims III, Forrest M. "Sun Photometer with Light-emitting diodes as spectrally selective detectors" Applied Optics. Vol. 31, No. 33. Nov. 20, 1992), and that as a photodetector the LEDs can exhibit spectral selectivity similar to that of the LED's emission wavelength. Additionally, LEDs also exhibit other readily measurable photo-responsive electrical properties, such as photodiode-type photocurrents and related accumulations of charge in the junction capacitance of the LED.

In an embodiment provided for by the invention, each LED in an array of LEDs can be alternately used as a photodetector or as a light emitter. At any one time, each individual LED would be in one of three states:

A light emission state,
A light detection state,
An idle state.

as may be advantageous for various operating strategies. The state transitions of each LED may be coordinated in a wide variety of ways to afford various multiplexing, signal distribution, and signal gathering schemes as may be advantageous. The similarities between the spectral detection band and the spectral emission bands of each of a plurality of types of colored-light LED may be used to create a color light-field sensor from a color LED array display such as that currently employed in "LED TV" products and road-sign color-image LED advertising signs. The various materials, physical processes, structures, and fabrication techniques used in creating the LED array and associated co-located electronics (such as FETs, resistors, and capacitors) may be used to further co-optimize a high performance monochrome LED array or color LED array to work well as both an image display and light-field sensor compatible with synthetic optics image formation algorithms using methods, systems, and process such as those aforedescribed.

Employing these constructions, the invention provides for an LED array image display, used in place of a LCD image display, to serve as a time-multiplexed array of light emitter and light detector elements. The resulting system does not require an interleaving or stacking of functionally-differentiated (with respect to light detection and light emission) elements. This is particularly advantageous as there is a vast simplification in manufacturing and in fact close or precise alignment with current LED array image display manufacturing techniques and existing LED array image display products.

FIG. 18a through FIG. 24 depict circuits useful in demonstrating principles and signal management strategies that are employed in this aspect of the invention. These initially introduce the concepts of received light intensity measurement ("detection") and varying light emission intensity of an LED in terms of variations in D.C. ("direct-current") voltages and currents. However, light intensity measurement ("detection") may be accomplished by other means such as LED capacitance effects—for example reverse-biasing the LED to deposit a known charge, removing the reverse bias, and then measuring the time for the charge to then dissipate within the LED. Also, varying the light emission intensity of an LED may be accomplished by other means such as pulse-width-modulation—for example, a duty-cycle of 50% yields 50% of the "constant-on" brightness, a duty-cycle of 50% yields 50% of the "constant-on" brightness, etc. These, too, are provided for by the invention and will be considered again later as variations of the illustrative approaches provided below.

To begin, LED1 in FIG. 18a is employed as a photodiode, generating a voltage with respect to ground responsive to the intensity of the light received at the optically-exposed portion of the LED-structured semiconducting material. In particular, for at least a range of light intensity levels the voltage generated by LED1 increases monotonically with the received light intensity. This voltage may be amplified by a high-impedance amplifier, preferably with low offset currents. The example of FIG. 18*a* shows this amplification performed by a simple op amp with negative feedback via a voltage divider. The gain provided by this arrangement can be readily recognized by one skilled in the art as $1+(R_f/R_g)$. The op amp produces an isolated and amplified output voltage that increases, at least for a range, monotonically with increasing light received at the light detection LED1. Further in this example illustrative circuit, the output voltage of the op amp is directed to LED100 via current-limiting resistor R100. The result is that the brightness of light emitted by LED100 varies with the level of light received by LED1.

For a simple lab demonstration of this rather remarkable fact, one may choose a TL080 series (TL082, TL084, etc.) or equivalent opamp powered by ±12 volts, R100 of ~1KΩ, and $R_f/R_g$ in a ratio ranging from 1 to 20 depending on the type of LED chosen. LED100 will be dark when LED1 is engulfed in darkness and will be brightly lit when LED1 is exposed to natural levels of ambient room light. For best measurement studies, LED1 could comprise a "water-clear" plastic housing (rather than color-tinted). It should also be noted that the LED1 connection to the amplifier input is of relatively quite high impedance and as such can readily pick up AC fields, radio signals, etc. and is best realized using as physically small electrical surface area and length as possible. In a robust system, electromagnetic shielding is advantageous.

The demonstration circuit of FIG. 18*a* can be improved, modified, and adapted in various ways (for example, by adding voltage and/or current offsets, JFET preamplifiers, etc.), but as shown is sufficient to show that a wide range of conventional LEDs can serve as pixel sensors for an ambient-room light sensor array as may be used in a camera or other room-light imaging system. Additionally, LED100 shows the role an LED can play as a pixel emitter of light.

FIG. 18*b* shows a demonstration circuit for the photocurrent of the LED. For at least a range of light intensity levels the photocurrent generated by LED1 increases monotonically with the received light intensity. In this exemplary circuit the photocurrent is directed to a natively high-impedance op amp (for example, a FET input op amp such as the relatively well-known LF 351) set up as an inverting current-to-voltage converter. The magnitude of the transresistance (i.e., the current-to-voltage "gain") of this inverting current-to-voltage converter is set by the value of the feedback resistor $R_f$. The resultant circuit operates in a similar fashion to that of FIG. 18*a* in that the output voltage of the op amp increases, at least for a range, monotonically with increasing light received at the light detection LED. The inverting current-to-voltage converter inverts the sign of the voltage, and such inversion in sign can be corrected by a later amplification stage, used directly, or is preferred. In other situations it may be advantageous to not have the sign inversion, in which case the LED orientation in the circuit may be reversed, as shown in FIG. 18*c*.

FIG. 18*d* shows an illustrative demonstration arrangement in which an LED can be for a very short duration of time reverse biased and then in a subsequent interval of time the resultant accumulations of charge in the junction capacitance of the LED are discharged. The decrease in charge during discharge through the resistor R results in a voltage that can be measured with respect to a predetermined voltage threshold, for example as may be provided by a (non-hysteretic) comparator or (hysteretic) Schmitt-trigger. The resulting variation in discharge time varies monotonically with the light received by the LED. The illustrative demonstration arrangement provided in FIG. 18*d* is further shown in the context of connects to the bidirectional I/O pin circuit for a conventional microprocessor. This permits the principal to be readily demonstrated through a simple software program operating on such a microprocessor. Additionally, as will be seen later, the very same circuit arrangement can be used to variably control the emitted light brightness of the LED by modulating the temporal pulse-width of a binary signal at one or both of the microprocessor pins.

Figure 19:
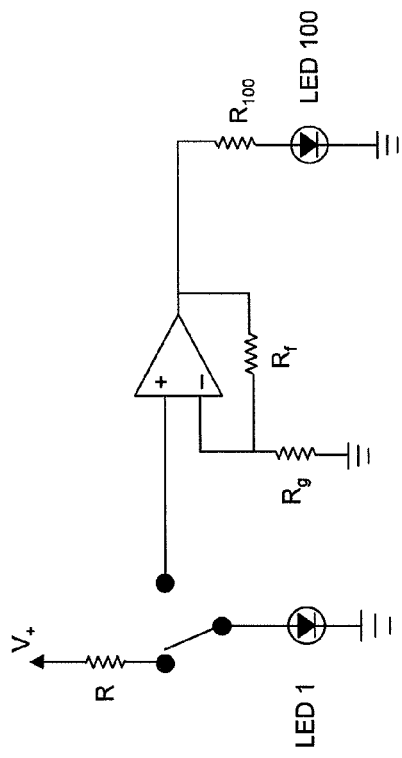
FIG. 19 shows a simple illustrative variation of the circuit of FIG. 18a where a SPDT switch is introduced for controlling the function of LED1 at any given time.

FIG. 19 shows a simple illustrative variation of the circuit of FIG. 18*a* where a SPDT switch is introduced for controlling the function of LED1 at any given time. When the switch is flipped to the left, LED1 is illuminated at a brightness level determined by current limiting resistor R and applied voltage V+. During an interval of time when the switch is flipped to the right position, LED1 serves as the light sensor for the arrangement of FIG. 18*a*. When LED1 is emitting light, there is no measurement of light and the operation of the remainder of the circuit, including that of LED100, for that interval of time is meaningless. As will be shown, however, this circuit can be reused for other LEDs and/or can be adapted to store the voltage associated with an earlier measurement so that LED100 can continue to emit light of a historically-set brightness. The SPDT, switch can be replaced with a simpler mode switching arrangements as will be seen.

Figure 20:
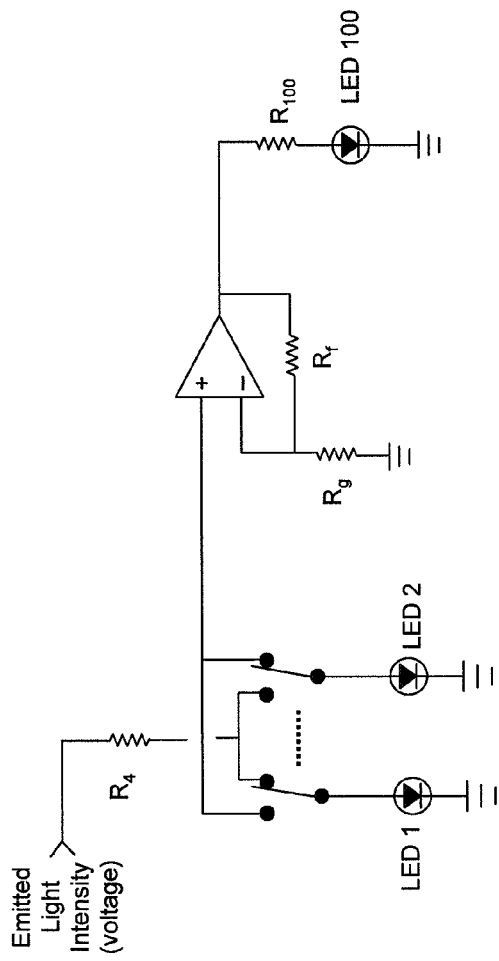
FIG. 20 illustrates how two LEDscan share the amplifier circuit and an emitting LED while in alternating roles of emitting and detecting light.

FIG. 20 illustrates how two LEDs, here LED1 and LED2, can share the amplifier circuit and LED100 while in alternating roles of emitting and detecting light. In this illustrative circuit, a DPDT switch is configured as a reversing switch. When the switch is flipped to the left, LED1 serves as the photodetector for the arrangement of FIG. 18*a* while LED2 emits light at a brightness determined by current-limiting resistor R4 and the voltage applied to the "Emitted Light Intensity" input. When the switch is flipped to the right the roles of LED1 and LED2 are exchanged. Should the voltage applied to the "Emitted Light Intensity" input be varied, the intensity of the light emitted by whichever of LED1 and LED2 is at that moment in emission mode (as determined by the position of the DPDT switch) can be responsively controlled. Thus LED1 and LED2 can provide independently adjustable levels of light intensity when in light emission mode.

Figure 21:
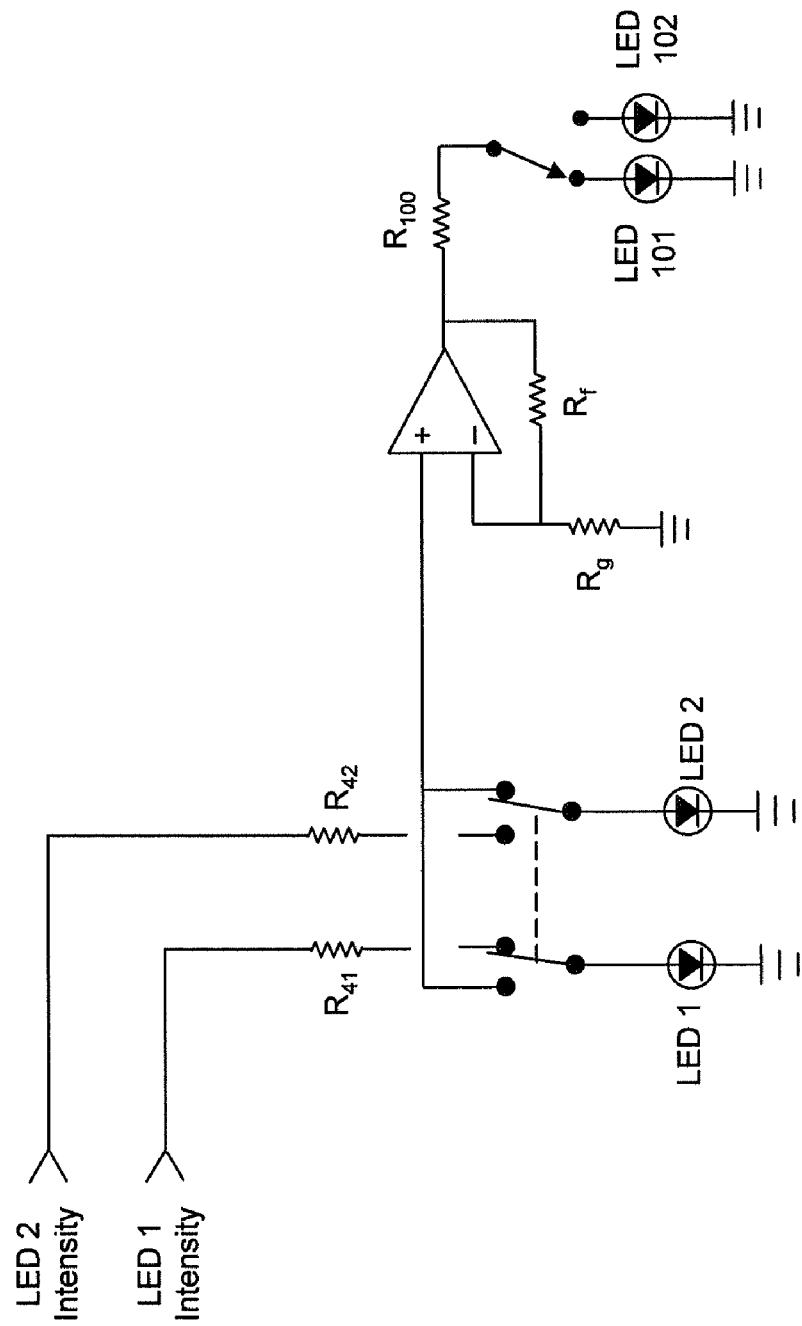
FIG. 21 shows an illustrative variation of the arrangement of FIG. 20 when a second switch is used to determine which LED is illuminated responsive to the light levels detected by LED1 or LED2.

FIG. 21 shows an illustrative variation of the arrangement of FIG. 20 when a second (here a SPDT) switch is used to determine which of LED101 and LED102 is illuminated responsive to the light levels detected by LED1 or LED2. If the DPDT switch and the SPDT switch are operated in the same direction simultaneously, LED101 will light with an intensity determined by the light level received by LED1 and LED102 will light with an intensity determined by the level of light received by LED2 respectively. When LED1 or LED2 are not detecting light, they instead emit light with separately determined intensifies responsive to their respective "LED1 Intensity" and "LED2 Intensity" voltage inputs, and LED101 and LED102 are respectively dark (as no current flows when the SPDT switch pole is not connected).

It is noted that in any of the previous examples, the SPDT and DPDT switches may be mechanical (as suitable for a quick laboratory demonstration) or may be implemented with analog semiconductor switch elements such as switching FETs, CMOS transistor configurations, etc. One skilled in the art will recognize that the switches described in FIGS. 18*a*-21 may be implemented with components such as MPF102 JFETs, CD4016 and CD4066 analog switch integrated circuits, CD4051 multiplexer integrated circuits, and/or other similar components. Thus, all the functions described thus far can be implemented entirely with semiconductor elements. One skilled in the art will further recognize that the opamps, resistors, and analog switches may all be fabricated on a common substrate with CMOS transistors that may be fabricated and interconnected via standard photolithography electronic fabrication techniques. Additionally, such circuits may be optimized for simplicity, function, and/or cost minimization.

Figure 22:
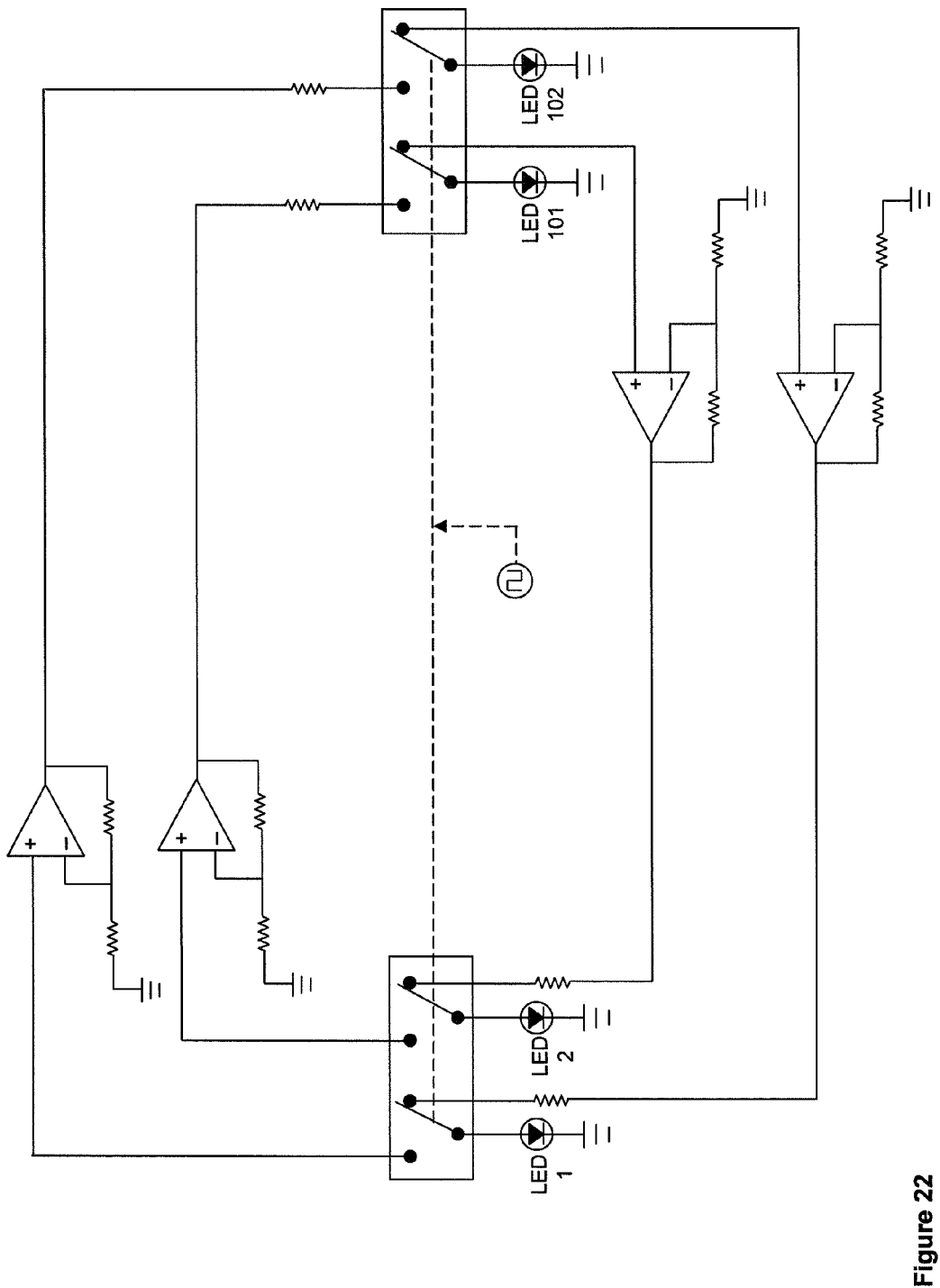
FIG. 22 depicts a further illustrative variation of FIG. 21 wherein LED1 and LED2 can reproduce a light distribution measured by LED101 and LED102 while LED101 and LED2 can reproduce a light distribution measured by LED1 and LED2, all of this humanly perceived as occurring simultaneously.

FIG. 22 depicts a further illustrative variation of FIG. 21 wherein two DPDT switches are operated together simultaneously (acting as a single 4PDT switch). Based on the development thus far, it is clear to see that when both switches are in the left position, LED101 and LED102 emit light of intensity responsive to the light received by LED1 and LED2, respectively. Further, it is equally clear to see that when the switches are in the far right position LED1 and LED2 emit light of intensity responsive to the light received by LED101 and LED102, respectively. If the switches are electronic, they may be operated by a square wave oscillator (as shown in the figure). If the oscillator frequency exceeds ~25-30 Hz the light and dark modes of each LED will blend together as perceived by the human eye with each LED illuminated at approximately half the brightness as would be perceived if the switches were such that the LEDs were fully illuminated without interception. The 50% drop in brightness resulting from each LED actively emitting light only 50% of the time. In this way LED1 and LED2 can reproduce a light distribution measured by LED101 and LED102 while LED101 and LED2 can reproduce a light distribution measured by LED1 and LED2, all of this humanly perceived as occurring simultaneously.

As mentioned earlier, the illustrative SPDT, DPDT, and 4PDT mode switching arrangements described thus far can be replaced with a simpler switching configurations. In particular, in the detection circuit of FIG. 18a, the LED1 connection to the amplifier input is of relatively quite high impedance. Thus, a switched connection to a relatively much lower impedance signal source will essentially fully dominate any circuit effects of the LED1 interconnection with the amplifier and allow LED1 to be illuminated by the lower impedance signal source. Such an analog-signal switch connection may be realized by a switching FETs, CMOS transistor configuration, etc., that permits operation of the switch with a binary control signal.

Figure 23:
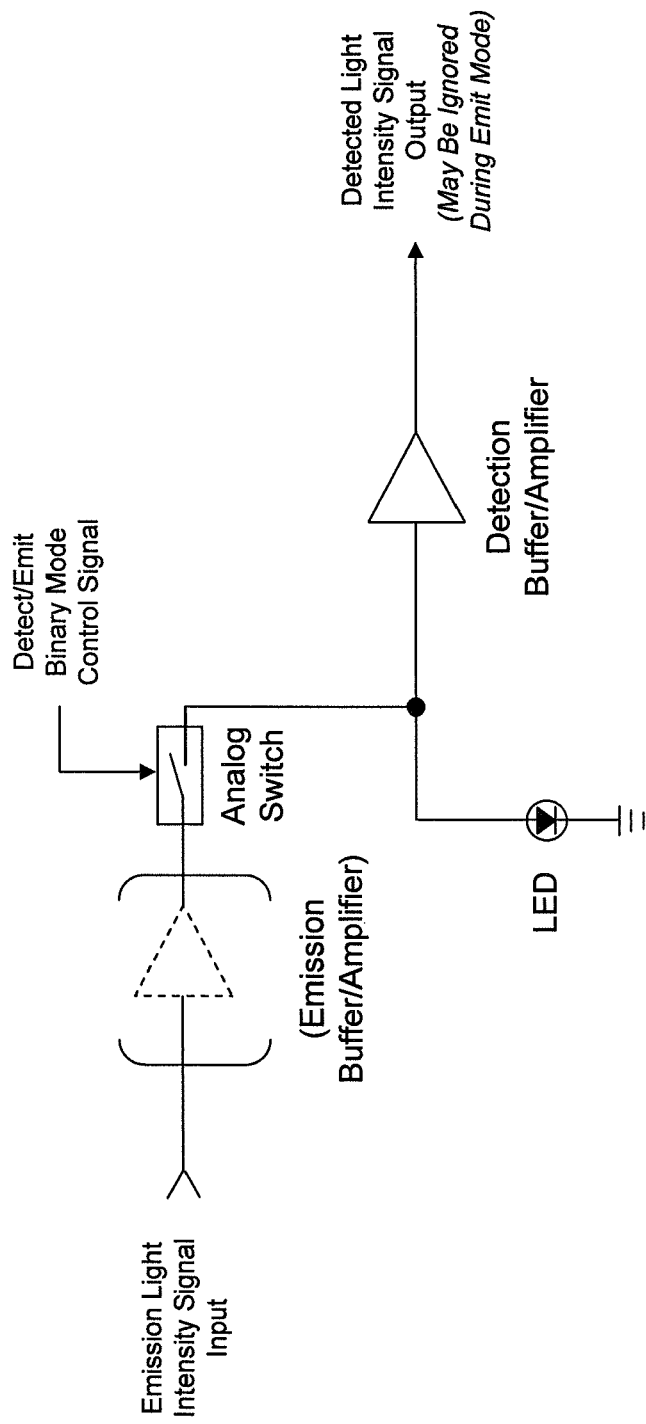
FIG. 23 depicts an illustrative circuit arrangement wherein an LED connected to a detection buffer/amplifier (as in FIG. 18a) is also connected to a binary-signal-controlled analog switch element.

FIG. 23 depicts an illustrative circuit arrangement wherein an LED connected to a detection buffer/amplifier (as in FIG. 18a) is also connected to a binary-signal-controlled analog switch element with high "off" impedance (such as a switching FETs, CMOS transistor configuration, etc.). When the binary control signal is of one state (for example, "0" or "low") the analog switch provides a sufficiently high impedance and does not appreciably load the LED voltage path to the detection buffer/amplifier, and the output of the detection buffer/amplifier provides a signal response to the light intensity incident on the photo-active portion of the LED. When the binary control signal is of the other state (for example, "1" or "high") the analog switch provides a sufficiently low impedance path between the LED and a low-impedance emission signal source will essentially fully dominate any circuit effects of the LED interconnection with the amplifier and allow the LED to be illuminated responsive to the low impedance signal source. The low impedance signal source may be external and permit direct connection with the analog switch element, or may be a second buffer/amplifier which buffers and/or amplifies an incoming emission light intensity signal. During the time that the analog switch is closed so that the LED may emit light responsive to incoming emission illumination signal, the output of the detection buffer/amplifier may be viewed as meaningless and ignored. In some embodiments, however, instead of being ignored this signal may be used for other purposes (for example diagnostics, feedback, etc.).

FIGS. 24a-24c depict exemplary state diagrams for the operation of the LED and the use of input signals and output signals described above. From the viewpoint of the binary mode control signal, the arrangement of FIG. 23 has at only two states: a detection state and an emission state, as suggested in FIG. 24a. From the viewpoint of the role of the LED in a larger system incorporating the circuit arrangement such as that of FIG. 23, there may a detection state, an emission state, and an idle state (where there is no emission nor detection occurring), obeying state transition maps such as depicted in FIG. 24b or FIG. 24c. At a further level of detail, there are additional considerations:

To emit light, the binary mode control signal of the FIG. 23 example must be in "emit" mode (causing the analog switch to be closed) and the emission light signal must be of sufficient value to cause the LED to emit light (for example, so that the voltage across the LED is above the "turn-on" voltage for that LED).
If the binary mode control signal is in "emit" mode but the emission light signal is not of such sufficient value, the LED will not illuminate. This can be useful for brightness control (via pulse-width modulation), black-screen display, and other uses. In some embodiments, this may be used to coordinate the light emission of neighboring LEDs in an array while a particular LED in the array is in detection mode.
If the emission light signal of such sufficient value but the binary mode control signal is in "detect" mode, the LED will not illuminate responsive to the emission light signal. This allows the emission light signal to be varied during a time interval when there is no light emitted, a property useful for multiplexing arrangements.
During a time interval beginning with the change of state of the binary mode control signal to some settling-time period afterwards, the detection output and/or light emission level may momentarily not be accurate.
To detect light, the binary mode control signal of the FIG. 23 example must be in "detect" mode (causing the analog switch to be open). The detected light signal may be used by a subsequent system or ignored. Intervals where the circuit is in detection mode but the detection signal is ignored may be useful for multiplexing arrangement, in providing guard-intervals for settling time, to coordinate with the light emission of neighboring LEDs in an array, etc.

FIG. 24d depicts an exemplary state transition diagram reflecting the above considerations. The top "Emit Mode" box and bottom "Detect Mode" box reflect the states of an LED from the viewpoint of the binary mode control signal as suggested by FIG. 24a. The two "Idle" states (one in each of the "Emit Mode" box and "Detect Mode" box) of FIG. 24d reflect (at least in part) the "Idle" state suggested in FIG. 24b and/or FIG. 24c. Within the "Emit Mode" box, transitions between "Emit" and "Idle" may be controlled by emit signal multiplexing arrangements, algorithms for coordinating the light emission of an LED in an array while a neighboring LED in the array is in detection mode, etc. Within the "Detect Mode" box, transitions between "Detect" and "Idle" may be controlled by independent or coordinated multiplexing arrangements, algorithms for coordinating the light emission of an LED in an array while a neighboring LED in the array is in detection mode, etc. In making transitions between states in the boxes, the originating and termination states may be chosen in a manner advantageous for details of various multiplexing and feature embodiments. Transitions between the groups of states within the two boxes correspond to the vast impedance shift invoked by the switch opening and closing as driven by the binary mode control signal. In the Figure, the settling times between these two groups of states are gathered and regarded as a transitional state.

Figure 25:
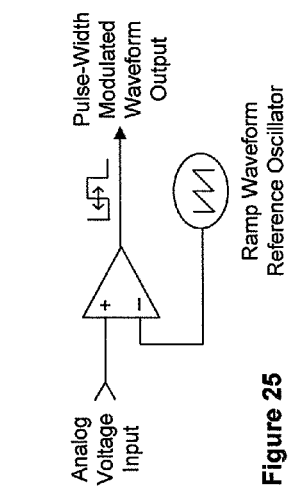
FIG. 25 illustrates an exemplary analog circuit method of generating a pulse-width modulated waveform.

As mentioned earlier, the amplitude of light emitted by an LED can be modulated to lesser values by means of pulse-width modulation (PWM) of a binary waveform. For example, if the binary waveform oscillates between fully illuminated and non-illuminated values, the LED illumination amplitude will be perceived roughly as 50% of the full-on illumination level when the duty-cycle of the pulse is 50%, roughly as 75% of the full-on illumination level when the duty-cycle of the pulse is 75%, roughly as 10% of the full-on illumination level when the duty-cycle of the pulse is 10%, etc. Clearly the larger fraction of time the LED is illuminated (i.e., the larger the duty-cycle), the brighter the perceived light observed emitted from the LED. FIG. 25 illustrates one method of generating a pulse-width modulated waveform by using a comparator to compare the values of an analog voltage input varying over a range of voltages that is also the same as the range of voltages provided by a ramp waveform oscillator. Another method of generating a pulse-width modulated waveform is to use one or more timers operating in or operated by a microprocessor program.

In the demonstrative arrangement depicted in FIG. 22, the duty cycle was set at 50% (sans negligible switching times to operate the switch) so that each LED is a detector for half the time and an emitter for the other have of the time. However, detections can be made quickly, so spending so much of the duty-cycle detecting prevents an LED in the FIG. 22 arrangement from being a very efficient light emitter. Thus the illustrative system would behave better LED displays on one side of the arrangement of FIG. 22 and worse LED displays on the other side of the arrangement if the duty-cycle was changed from 50% to a number smaller or larger value (a smaller duty-cycle value brightening the LEDs displaying on one side of FIG. 22 and dimming the LEDs displaying on the other side of FIG. 22, and a large duty-cycle value resulting in an exchange of roles). FIG. 26a illustrates a mode control signal possessing a non-symmetric duty-cycle that favors emission time duration and limits detection time duration, as may be applied to the arrangement of FIG. 23, represented in a simplified form by FIG. 26b. The buffers/amplifiers depicted may be voltage or current. In some current-drive arrangement a current-limiting resistor is not needed, while in voltage-drive arrangements a current-limiting resistor may be required.

Figure 27A:
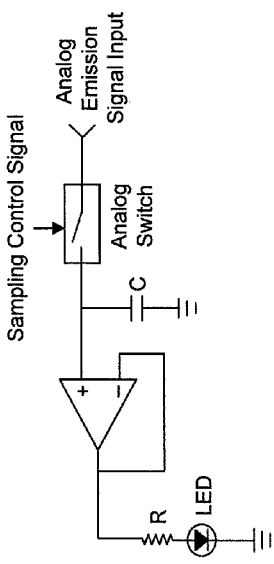
FIG. 27a depicts the exemplary use of a sample/hold arrangement.
Figure 27B:
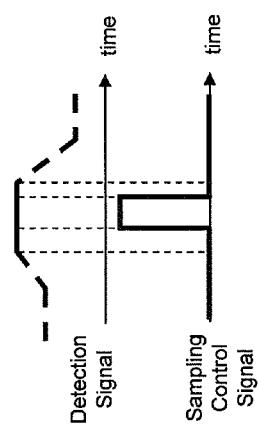
FIG. 27b depicts exemplary relative timing for the detection signal and the sampling control signal.

FIG. 27a depicts the exemplary use of a sample/hold arrangement wherein the analog switch briefly closes to direct the analog emission control voltage to the capacitor C. The capacitor C charges to match this voltage and retains this voltage value after the switch is opened. A unity gain amplifier reproduces this voltage without loading (and thus without discharging) the charge stored in the capacitor. Using this approach, a very short measurement time-interval may be used for detection, long enough to allow a shorter-duration sample/hold operation to be made and complete, and the resulting voltage may be held for a considerably longer emission time-interval. Exemplary relative timing for the detection signal and the sampling control signal as just described is depicted in FIG. 27b.

Figure 26B:
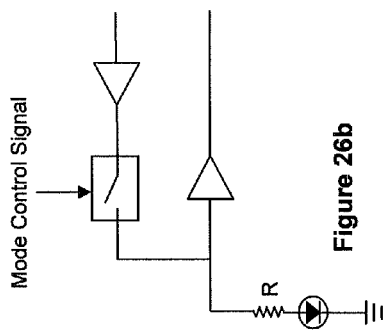
Figure 26A:
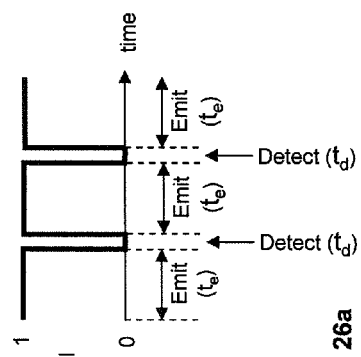
FIG. 26a illustrates a mode control signal possessing a non-symmetric duty-cycle that favors emission time duration and limits detection time duration.
Figure 28:
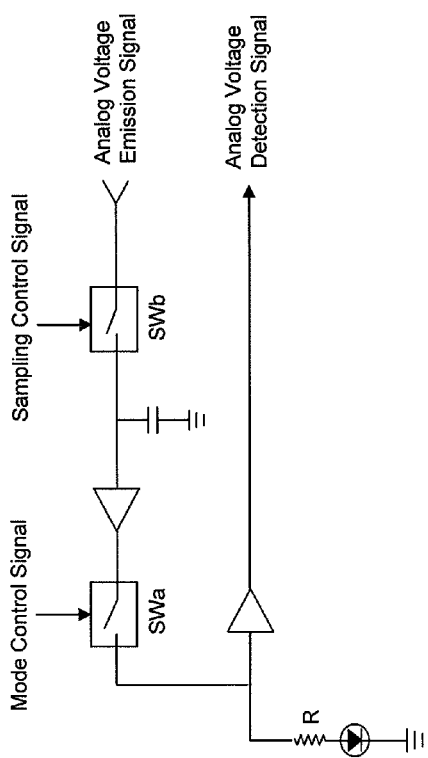
FIG. 28 shows the combination of the arrangement of FIG. 27a with the arrangement of FIG. 26b.

FIG. 28 shows the combination of the arrangement of FIG. 27a with the arrangement of FIG. 26b. Switch SWa provides emit/detect mode control while SWb provides sampling control. The active elements of such a circuit can be fabricated from two switching FETs and two amplifying MOSFETs, with four MOSFETs, or in other ways.

Further, the arrangement of FIG. 27a may be expanded so as to provide an exemplary analog demultiplexing function as shown in FIG. 29. Here, a plurality of normally-open analog switches are sequentially closed for brief disjointed intervals of time. The associated plurality of capacitors retain the sampled voltages until the next associated switch closing, each of which is respectively buffered by an associated buffer amplifier which drives an associated illuminating LED at a brightness associated with the retained sampled voltage value.

Additionally, an arrangement such as that depicted in FIG. 30 can be used to sequentially select from a plurality of detection amplifier outputs. Here again, a plurality of normally-open analog switches are sequentially closed for brief disjointed intervals of time. The arrangement of FIGS. 29 and 30 can be combined, as shown in FIG. 31, to multiplex a plurality of detection signals onto a common analog signal path which is then demultiplexed into a plurality of sample/hold circuits. This arrangement can be synchronized with the mode control signal so that each LED very briefly provides periodically updated detection measurement and is free to emit light the rest of the time.

Figure 32B:
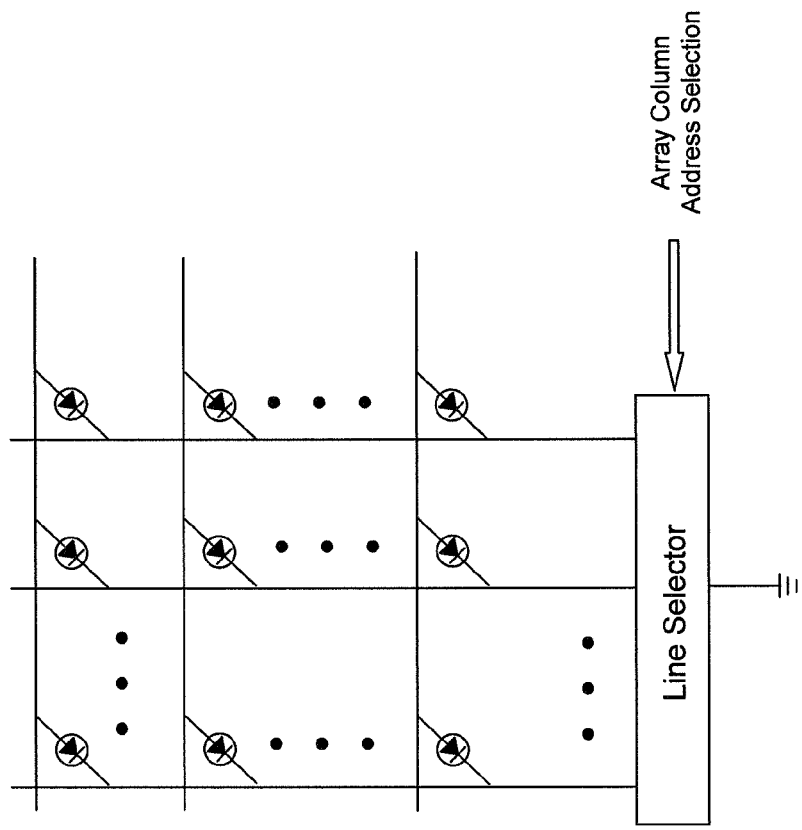
FIG. 32b depicts an adaptaion of FIG. 32a controlled by an address decoder so that the selected subset can be associated with a unique binary address.
Figure 32A:
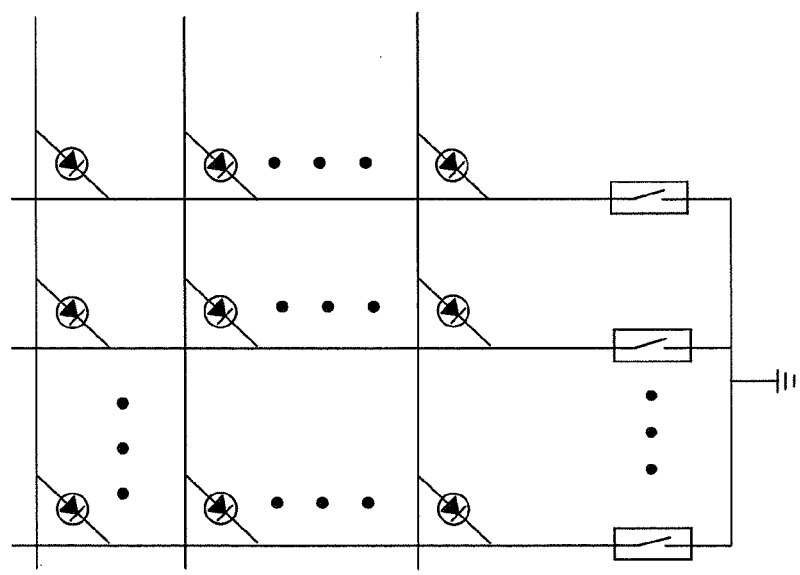
FIG. 32a depicts a selectable grounding capability for a two-dimensional array of LEDs.

Moreover, the interconnected plurality switch arrangement of FIG. 30 can be used to provide a selectable grounding capability for a two-dimensional array of LEDs as depicted in FIG. 32a. Here again, the plurality of normally-open analog switches are sequentially closed for brief disjointed intervals of time. This allows the selection of a particular subset (here, a column) of LEDs to be grounded while leaving all other LEDs in the array not connected to ground. Each of the horizontal lines then can be used to connect to exactly one grounded LED at a time. The plurality of normally-open analog switches in FIG. 32a may be controlled by an address decoder so that the selected subset can be associated with a unique binary address, as suggested in FIG. 32b. The combination of the plurality of normally-open analog switches together with the address decoder form an analog line selector. By connecting the line decoder's address decoder input to a counter, the columns of the LED array can be sequentially scanned.

Figure 33:
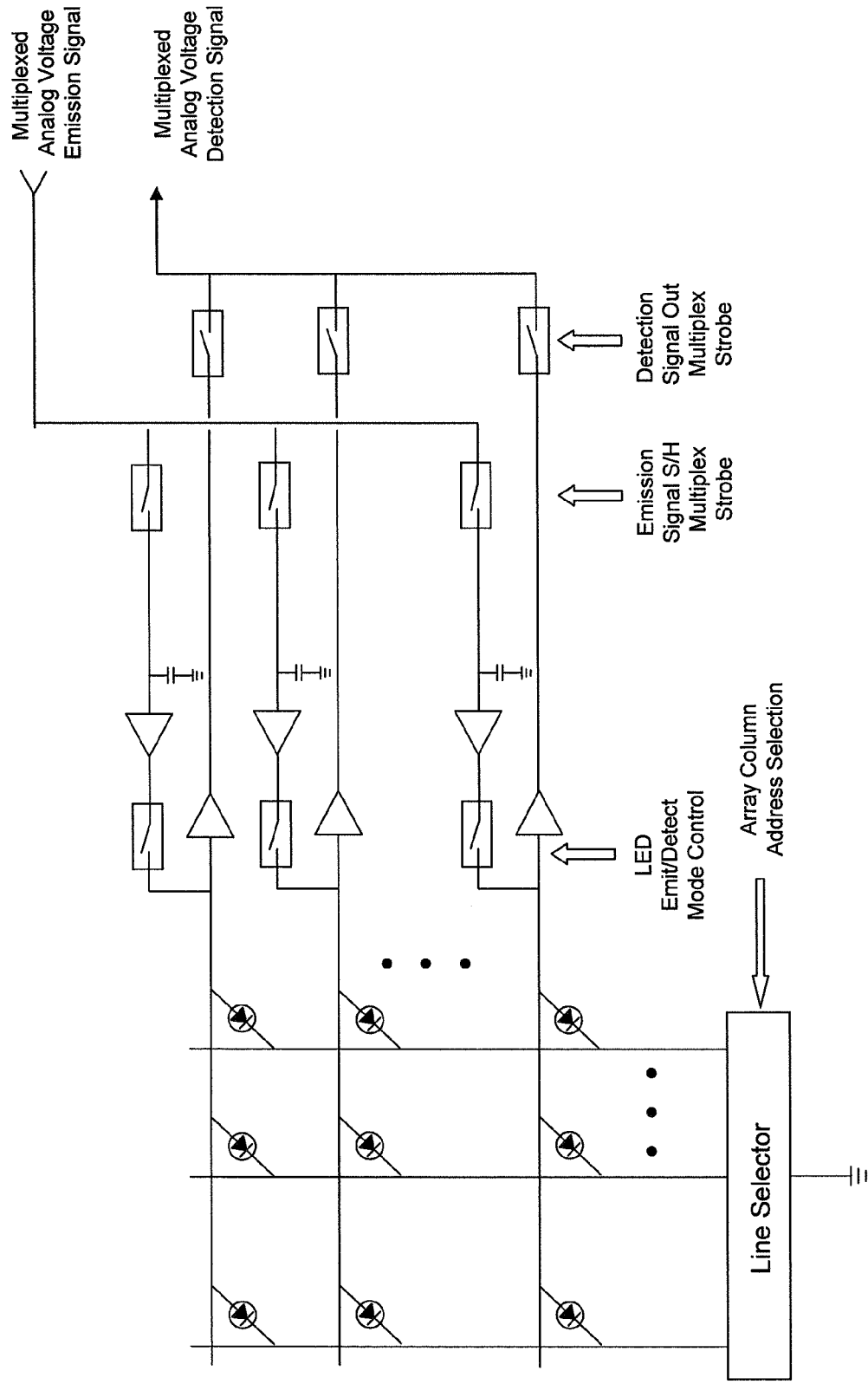
FIG. 33 depicts an exemplary combination of the arrangements of FIG. 28, FIG. 30, and FIG. 32b to form a highly scalable LED array display that also functions as a light field detector.

Based on these constructions, arrangements, and principles, FIG. 33 depicts an exemplary combination of the arrangements of FIG. 28, FIG. 30, and FIG. 32b together to form a highly scalable LED array display that also functions as a light field detector. The various multiplexing switches in this arrangement can be synchronized with the line selector and mode control signal so that each LED very briefly provides periodically updated detection measurement and is free to emit light the rest of the time.

Figures 34A, 34B:
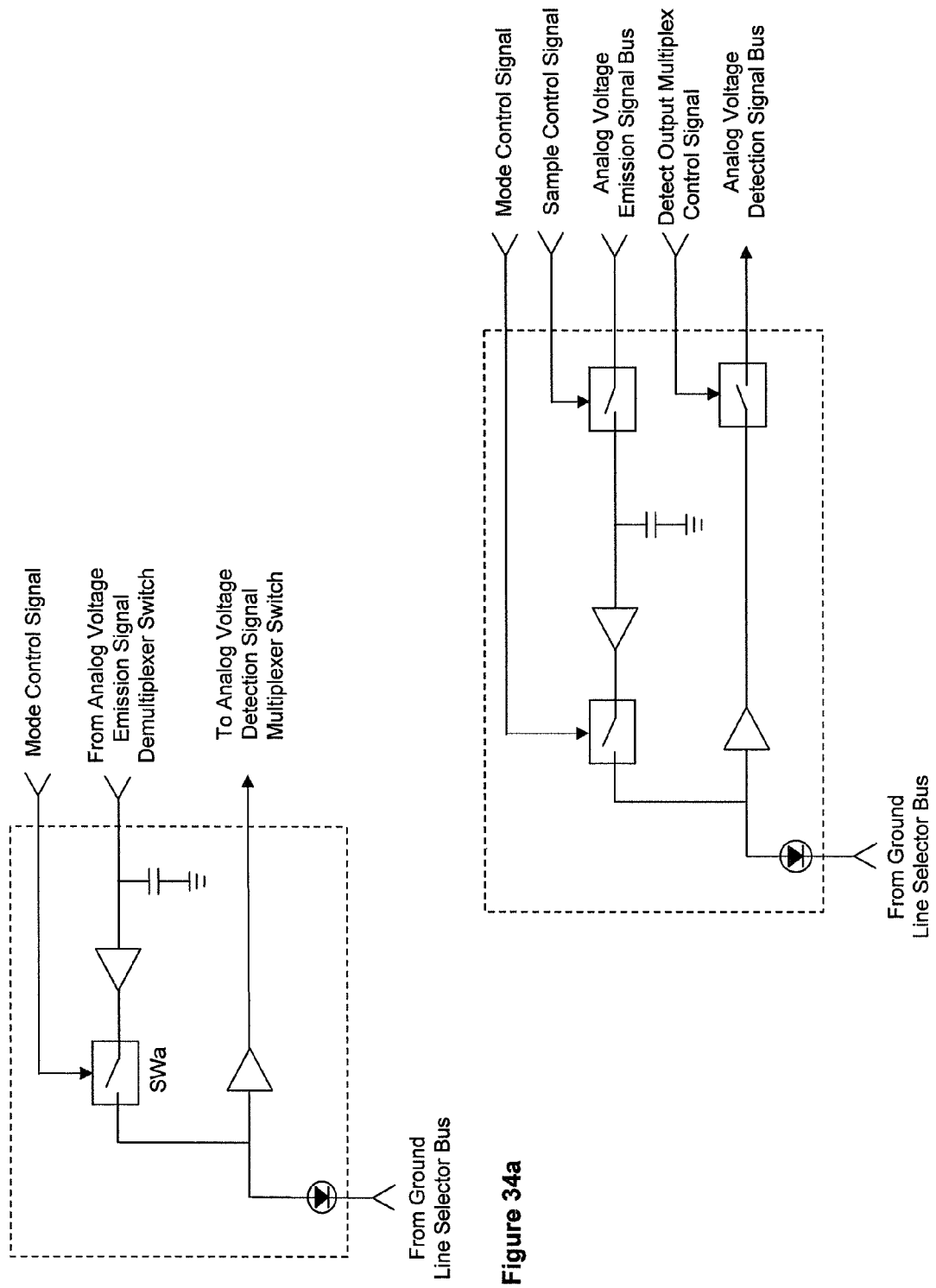
FIGS. 34a and 34b depict exemplary functional cells that may be used in a large scale array.

The arrangement of FIG. 33 can be reorganized so that the LED, mode control switch, capacitor, and amplifiers are collocated, for example as in the illustrative exemplary arrangement of FIG. 34a. Such an arrangement can be implemented with, for example, three MOSFET switching transistor configurations, two MOSFET amplifying transistor configurations, a small-area/small-volume capacitor, and an LED element (that is, five transistors, a small capacitor, and an LED). This can be treated as a cell which is interconnected to multiplexing switches and control logic.

The arrangement of FIG. 33 can be reorganized to decentralize the multiplexing structures so that the LED, mode control switch, multiplexing and sample/hold switches, capacitor, and amplifiers are collocated, for example as in the illustrative exemplary arrangement of FIG. 34b. Such an arrangement can be implemented with, for example, three MOSFET switching transistor configurations, two MOSFET amplifying transistor configurations, a small-area/small-volume capacitor, and an LED element (that is, five transistors, a small capacitor, and an LED). This can be treated as a cell whose analog signals are directly interconnected to busses. Other arrangements are also possible.

Figure 35B:
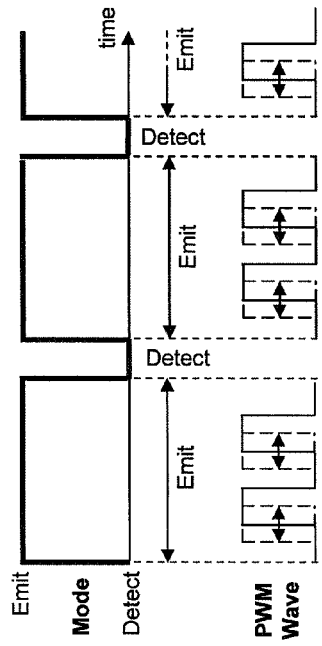
FIGS. 35a-35c depict adaptations of the digital circuit measurement and display arrangement of FIG. 18d into the construction developed thus far.
Figure 35C:
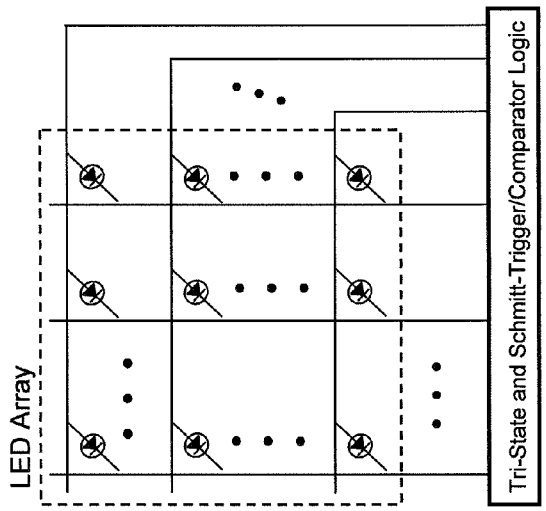
Figure 35A:
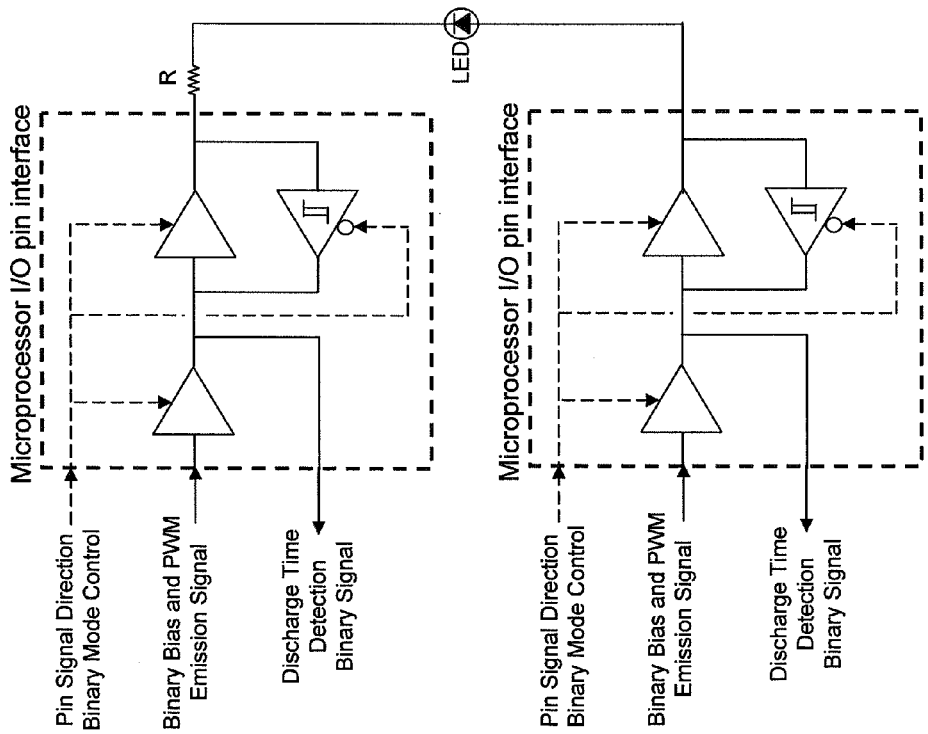

The discussion and development thus far are based on the analog circuit measurement and display arrangement of FIG. 18a that in turn leverages the photovoltaic properties of LEDs. With minor modifications clear to one skilled in the art, the discussion and development thus far can be modified to operate based on the analog circuit measurement and display arrangement of FIGS. 18b/18c that in turn leverage the photocurrrent properties of LEDs. FIG. 35a, FIG. 35b and FIG. 35c provide guidance on how the digital circuit measurement and display arrangement of FIG. 18d (that in turn leverages discharge times for accumulations of photo-induced charge in the junction capacitance of the LED) can be adapted into the construction developed thus far. FIG. 35a adapts FIG. 18d to additional include provisions for illuminating the LED with a pulse-modulated emission signal. Noting that the detection process described earlier in conjunction with FIG. 18d can be confined to unperceivably short intervals of time, FIG. 35b illustrates how a pulse-width modulated binary signal may be generated during LED illumination intervals to vary LED emitted light brightness. FIG. 35c illustrates an adaptation of the tri-state and Schmitt-trigger/comparator logic akin to that illustrated in the microprocessor I/O pin interface that may be used to sequentially access subsets of LEDs in an LED array as described in conjunction with FIG. 32a and FIG. 32b.

Figure 36A:
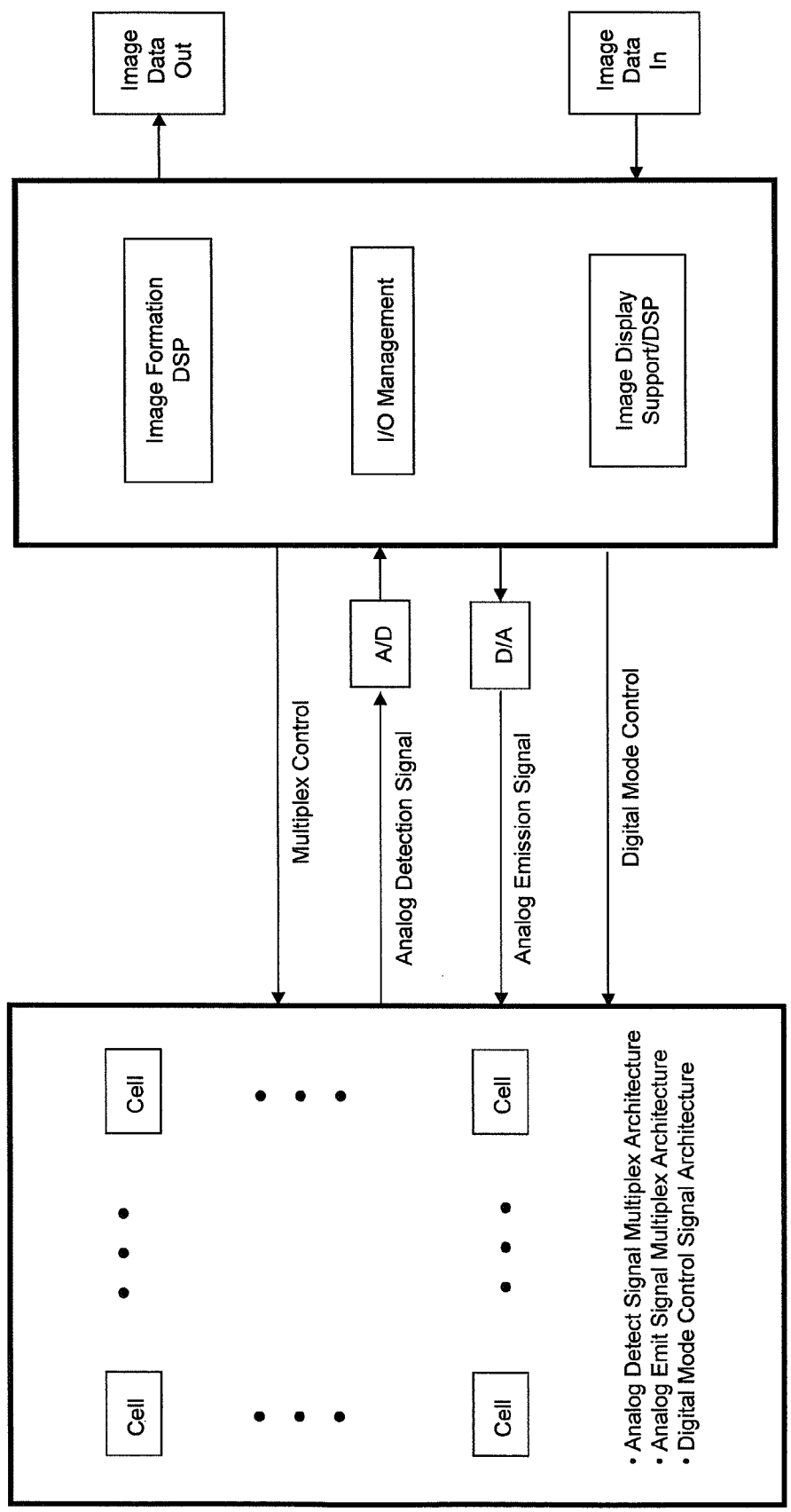
FIGS. 36a-36b depict exemplary embodiments of an overall system provided for by the invention.
Figure 36B:
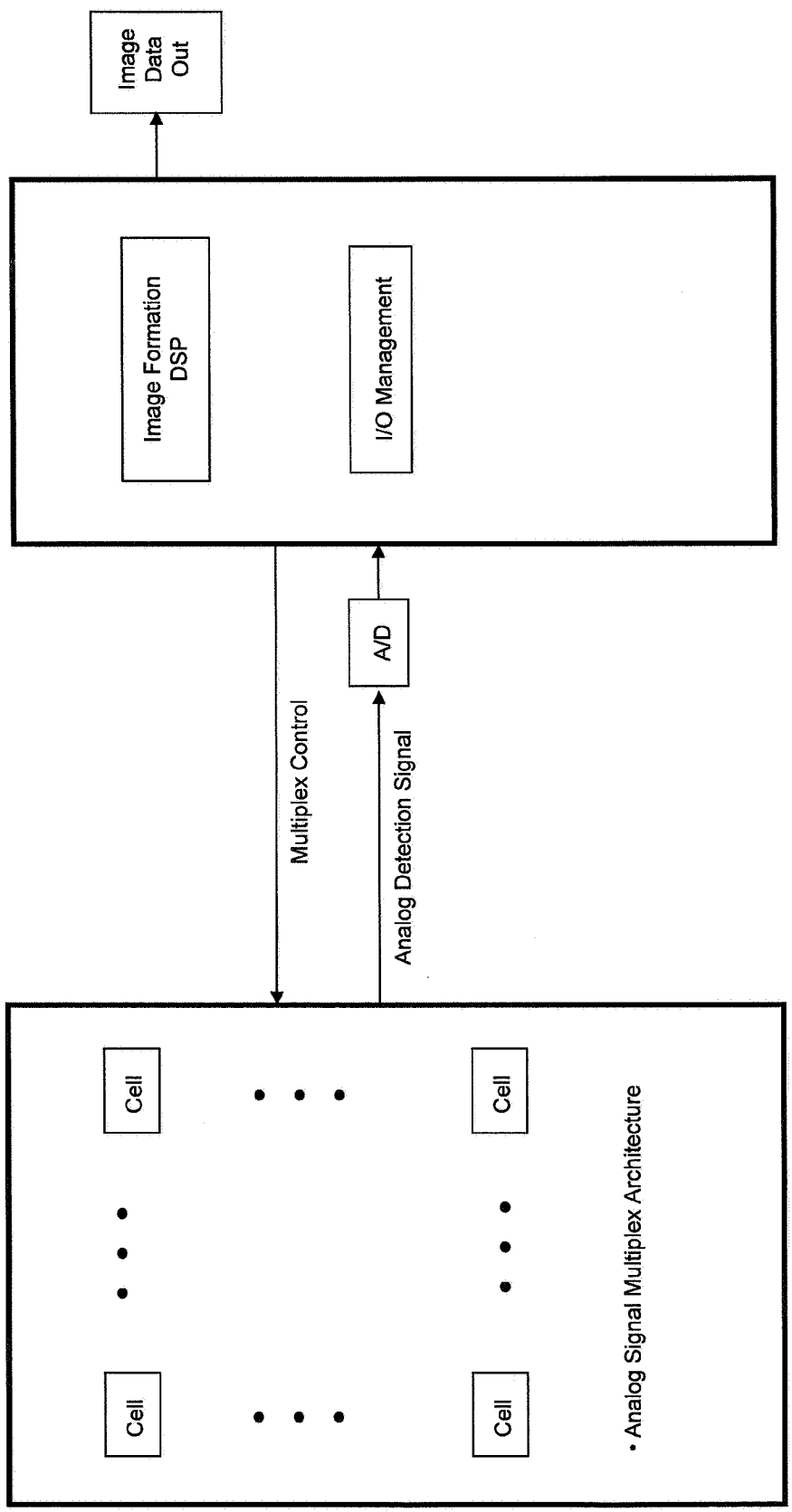

A plurality of cells such as the exemplary arrangements of FIG. 34a, 34b, individual LEDs in matrices interfaced directly to logic circuit as compatible with the arrangement of FIG. 35a, and other possible arrangements can be incorporated into the larger system arranges such as those depicted in FIG. 36a and FIG. 36b. Both of these figures depict an exemplary arrangement that takes the light field measurement and presents it to image formation algorithms, for example as based on the systems, methods, and techniques described earlier and produces image data out. The image data may serve as motion video or may comprise a static image sampling a scene at an earlier point in time. FIG. 36a depicts a two-way LED array system that serves as both a camera and a display. FIG. 36b depicts a simplified one-way LED array system that serves as a camera.

Figure 37A:
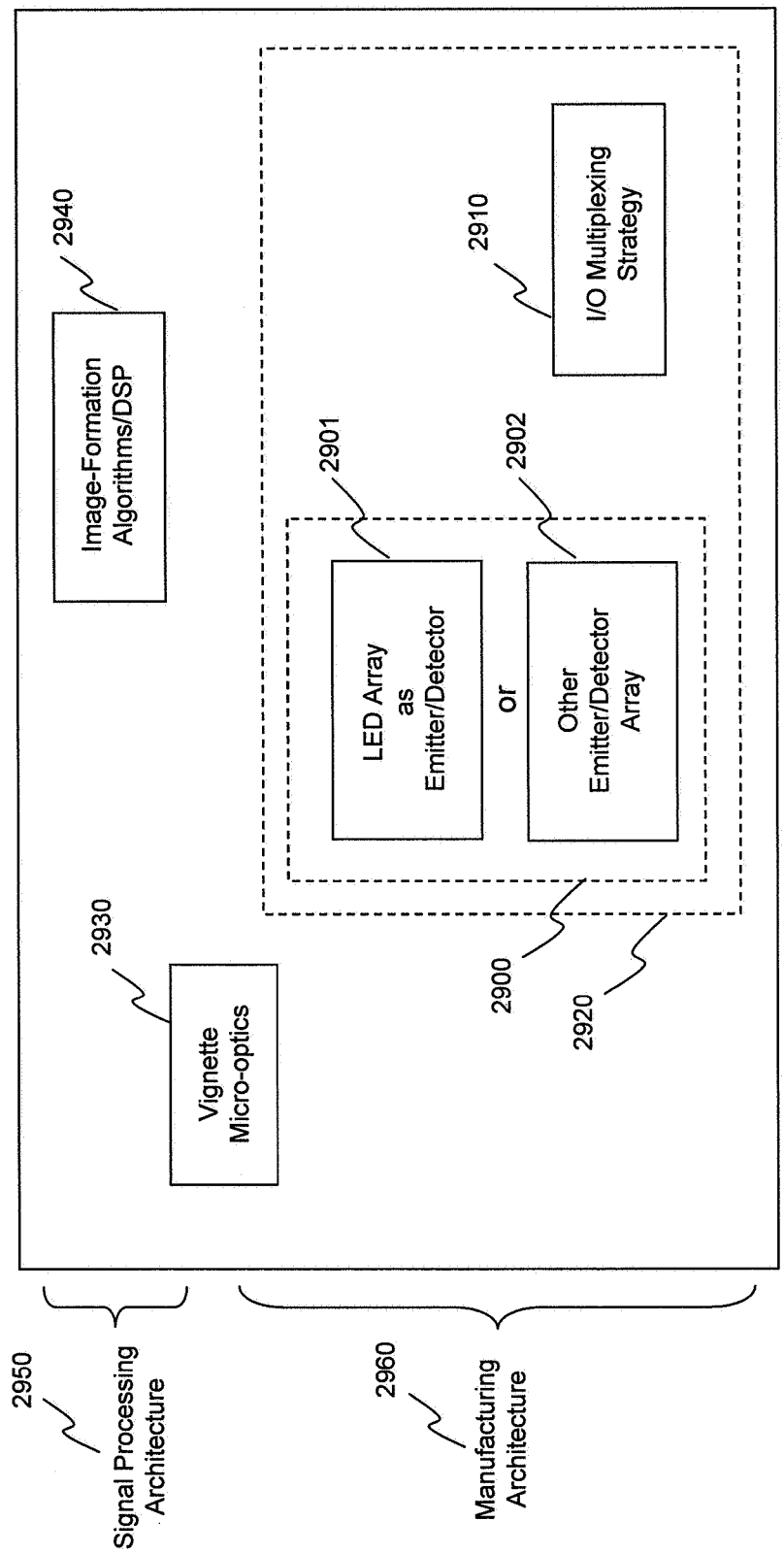
FIG. 37a and FIG. 37b depict a view of the resulting synergistic combinations of methods and elements as provided for by the invention.
Figure 37B:
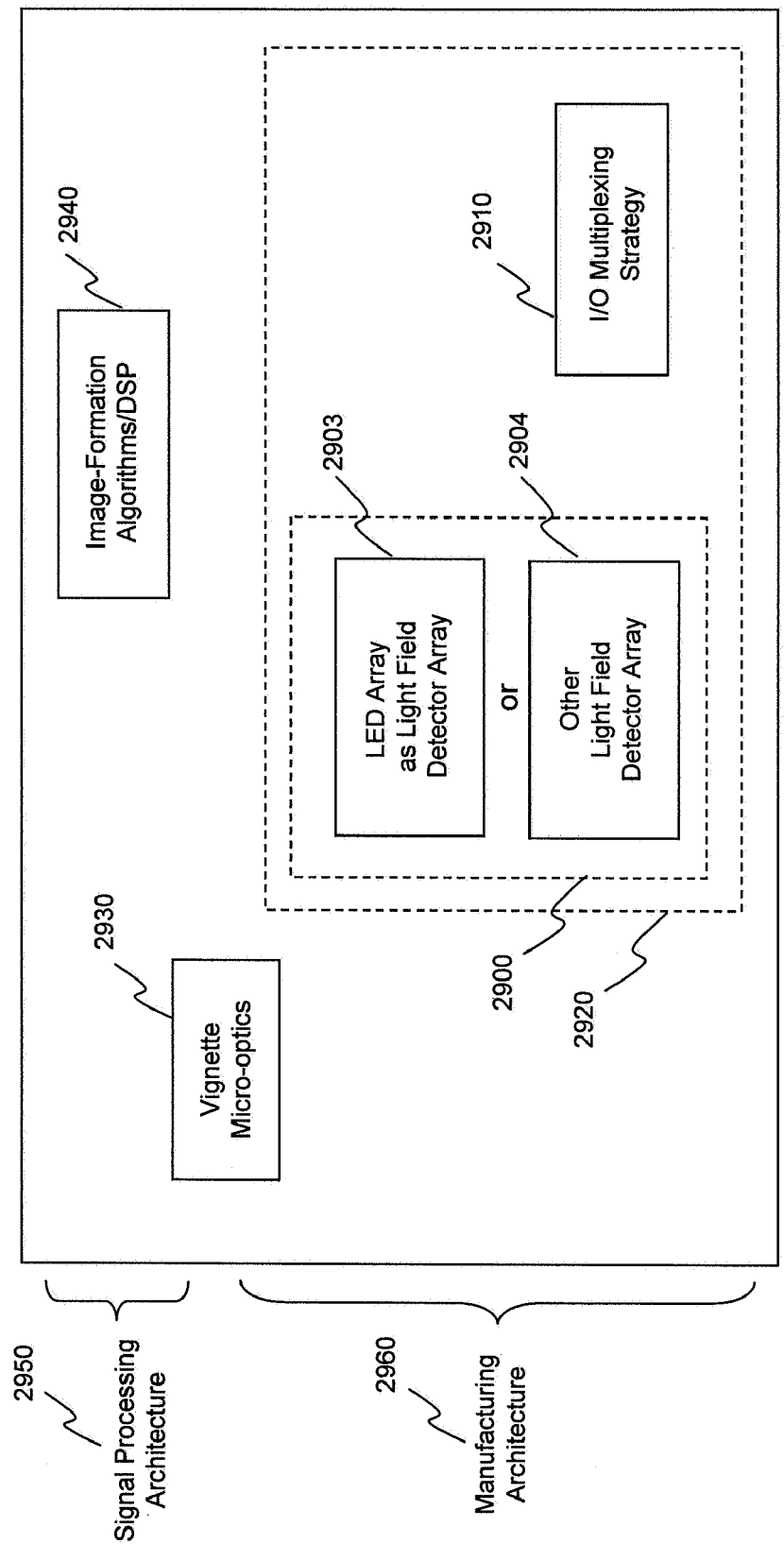

FIG. 37a and FIG. 37b depict a view of the resulting synergistic combinations of methods and elements as provided for by the invention. The signal processing architecture 2950 comprises image formation algorithms and associated DSP 2940 as well as aspects of the vignette micro-optical arrangements 2930 of the sensor or integrated sensor/display 2920. The manufacturing architecture 2960 comprises sensor or integrated sensor/display 2920 as well as associated vignette micro-optical arrangements 2930 and DSP, power supply, shielding, enclosures, etc. For a two-way system that serves as both a camera and a display, the integrated sensor/display 2920 may comprise an LED array as an emitter/detector 2901 or another type of emitter/detector array 2902 as illustrated in FIG. 37a. For a one-way system that as a camera without a common bulk lens, the sensor 2920 may comprise an LED array as a light field detector 2903 or another type of light field detector array 2904 as illustrated in FIG. 37b.

As indicated earlier, Forest Mims reported in 1992 the light spectral selectivity of LED photovoltaic generation very nearly matches the emitted light spectrum of the LED. It is also known that light-induced LED photocurrents (which are also the process charging the junction capacitance in the arrangement of FIG. 18d) also exhibit light spectral selectivity of that very nearly matches the emitted light spectrum of the LED. This suggests use of color LEDs as color-sensitive sensors. Thus it would be opportune and advantageous for a color LED array such as currently emerging for LED televisions to also serve as a color light field detector for use with the synthetic image formation systems and methods described earlier.

FIG. 38a illustrated the human eye sensitivity to the spectrum of wavelengths of visible light. The human eye comprises "cone" and "rod" constituent densely-packed spatially-distributed structures, wherein the rods detect incoming light brightness (luminance) while three types of cones discern three primary colors. In contrast, the spectral bandwidth of a traditional LED is typically 50 nm. Positioning three approximately 50 nm basspands in the portions of the visible spectrum near peaks of the cone responses yet away from areas of significant spectral overlap would result in a spectral placement such as that depicted in the example of FIG. 38b. For use as a sensor, clearly there are gaps in the spectral coverage; this will be revisited shortly. For use as a monitor, one approach to a good performance would be the arrangement depicted in FIG. 38c. Here an "ideal sensor" mimics the cone responses of the human eye and provides resultant red, green, and blue measurements. These measurements in turn would drive the amplitudes of the narrowband LED emissions from FIG. 38b, which in turn stimulate the three cone responses in areas of relatively low sensitivity overlap.

Figure 39A:
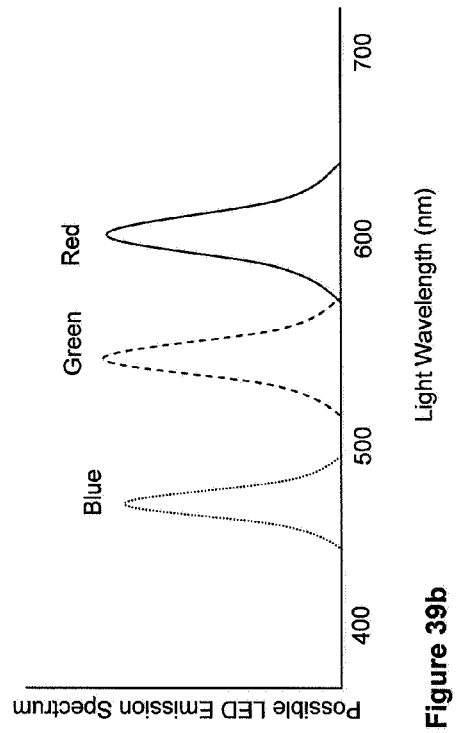
Figure 39B:
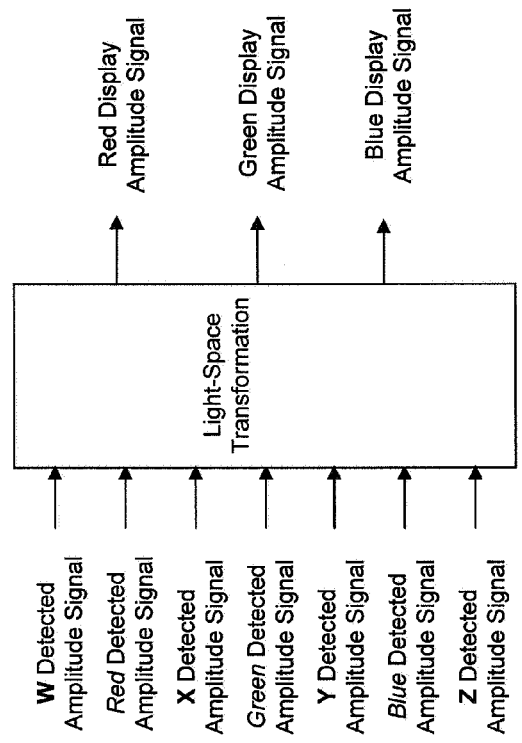
FIG. 39b depicts an approximating the curves of FIG. 38b.

Thus as a color light field sensor the wider spectral characteristics of FIG. 38a are desirable, while for a display the narrower spectral characteristics of FIG. 38a are desirable. It is known that through use of various techniques the emission spectrum of an LED can be widened. For example, it would be possible to obtain the response curves of FIG. 39a as a mimic of the cone responses of the human eye depicted in FIG. 38a. As a monitor, however emission spectral characteristics such as that of FIG. 38b are desirable. It has long been known (Yariv, Optical Electronics, Holt Rinehart, and Winston, 1971) that photocurrents comprise at least three independent photoresponsive effects that contribute to light-stimulated current flow in a PN diode junction. Thus it may be possible to adjust each color LED used in an array so that the detection spectrum of each comprises wider passbands, as in FIG. 39a in approximating the curves of FIG. 38a, while the emission spectra of each comprises narrower passbands, as in FIG. 39b in approximating the curves of FIG. 38b. The invention therefore provides for an embodiment in which each color LED used in an array so that the detection spectrum of each comprises wider passbands while the emission spectra of each comprises narrower passbands.

Figure 40A:
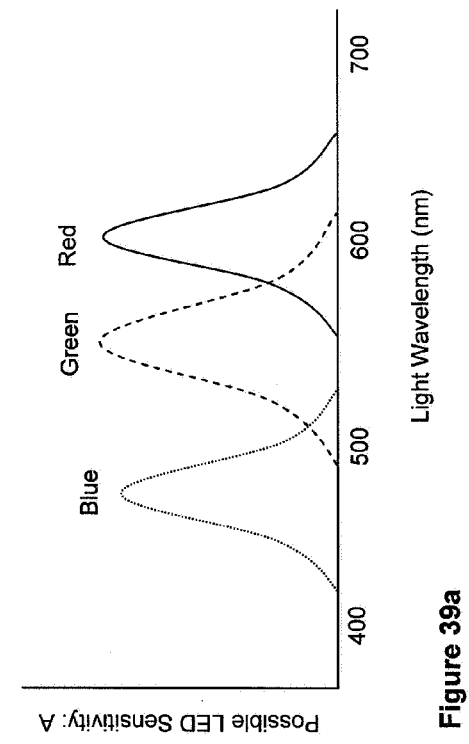
FIGS. 40a-40b depict a system employing narrowband detection spectral LED properties imposed by desirable emission characteristics supplemented by detection spectral of additional LEDs providing additional coverage bands.
Figure 40B:
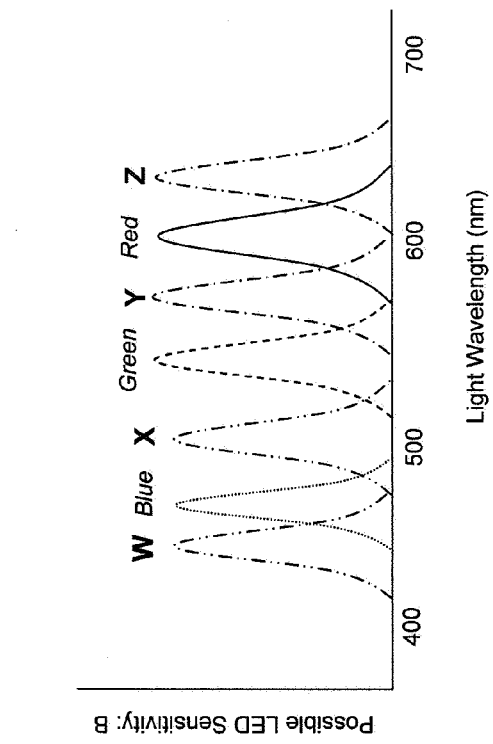

Should it not be possible, practical, or cost effective to obtain such LEDs, another approach is depicted in FIG. 40a and FIG. 40b. Here, the narrowband detection spectral LED properties imposed by desirable emission characteristics such as in FIG. 38b or FIG. 39b can be supplemented by additional LEDs providing additional coverage bands. An example of this is depicted in FIG. 40a wherein the red, green, and blue sensitivities inherited from the FIG. 39b emission spectra of emission LEDs are supplemented with additional LEDs with sensitivity bands W, X, Y, and Z. In one embodiment, the invention provides for detection outputs of these additional supplemental LEDs to be combined with the detection outputs of the three emission LEDs as suggested by FIG. 40b. In one variation of the embodiment, all the LEDs are transparent and stacked vertically. In one variation of the embodiment, all the LEDs are immediately adjacent on the plane of the array. In one variation of the embodiment, the electrical connections of the supplemental LEDs are switched by circuitry within the cells exemplarily depicted in FIGS. 34a-34b and FIGS. 36a-36b so as to connect to the emission LEDs only when the emission LEDs are operating in detection mode. In one variation of the embodiment, the detection measurements made by the supplemental LEDs are combined numerically with the detection measurements made by the emission LEDs.

Figure 41A:
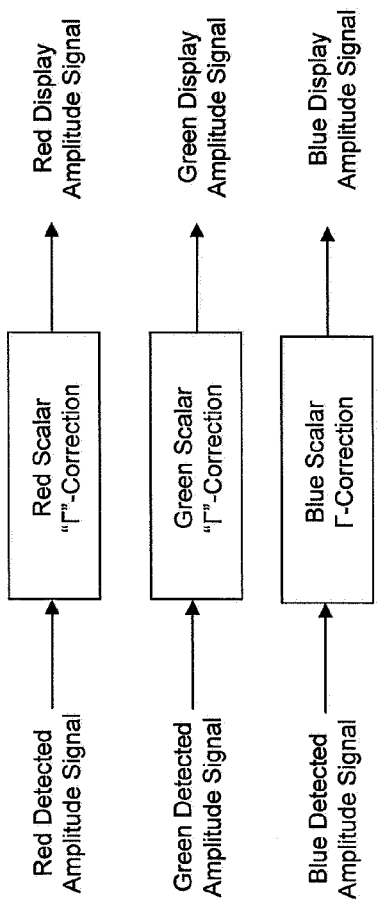
FIGS. 41a-41b depict various "gamma correction" operation arrangements for application to measurement data streams provided by detection signal multiplexing arrangements.
Figure 41B:
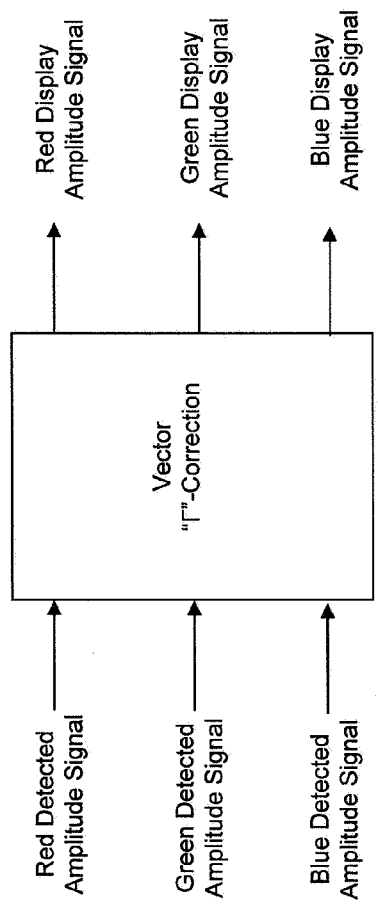

Further, the LED detection capabilities of emission LEDs may not have a desirable amplitude response with respect to received light amplitude or intensity. In this case, the invention provides for the application of traditional or more advanced forms of nonlinear "gamma correction" to the detected signals provided by the LED array. The gamma correction need not be limited to the traditional family of binomial power curves but instead be any appropriate non-linearity that proves useful. The "gamma correction" is applied to measurement data streams provided by the detection multiplexing arrangement (rather than separately implemented for each LED). In some embodiments the "gamma correction" is made advantageously made separately for each color detection signal as suggested by FIG. 41a. In other embodiments the "gamma correction" is made advantageously made on the vector of color detection signals as suggested by FIG. 41b, allowing for cross-coupled corrections. These cross-coupled corrections can be useful in color handling issues in regions of the spectrum where there is considerable overlap in the human eyes cone response curves.

Figure 42:
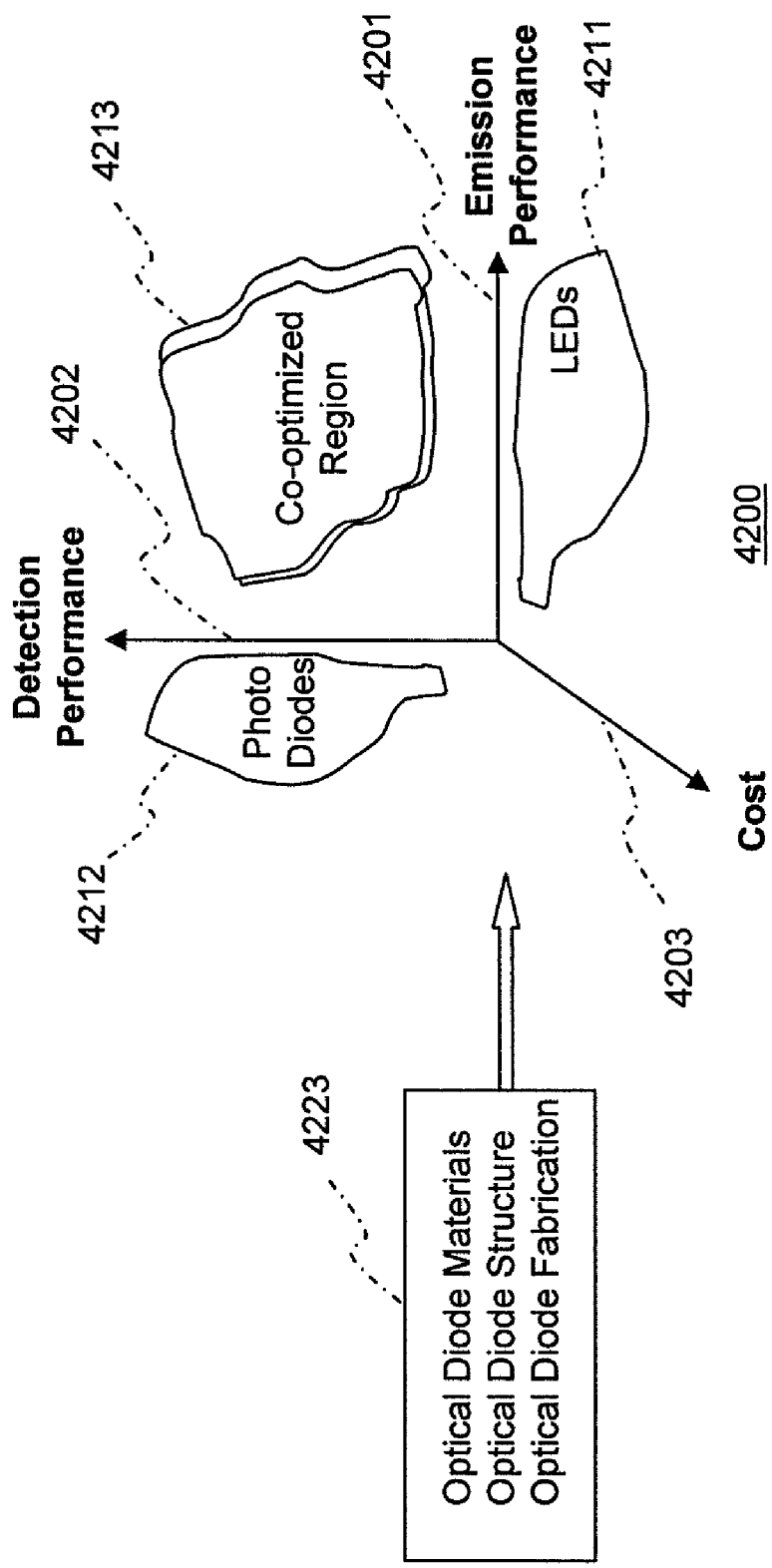
FIG. 42 depicts a metric space of device realizations for optoelectronic devices.
Figure 44:
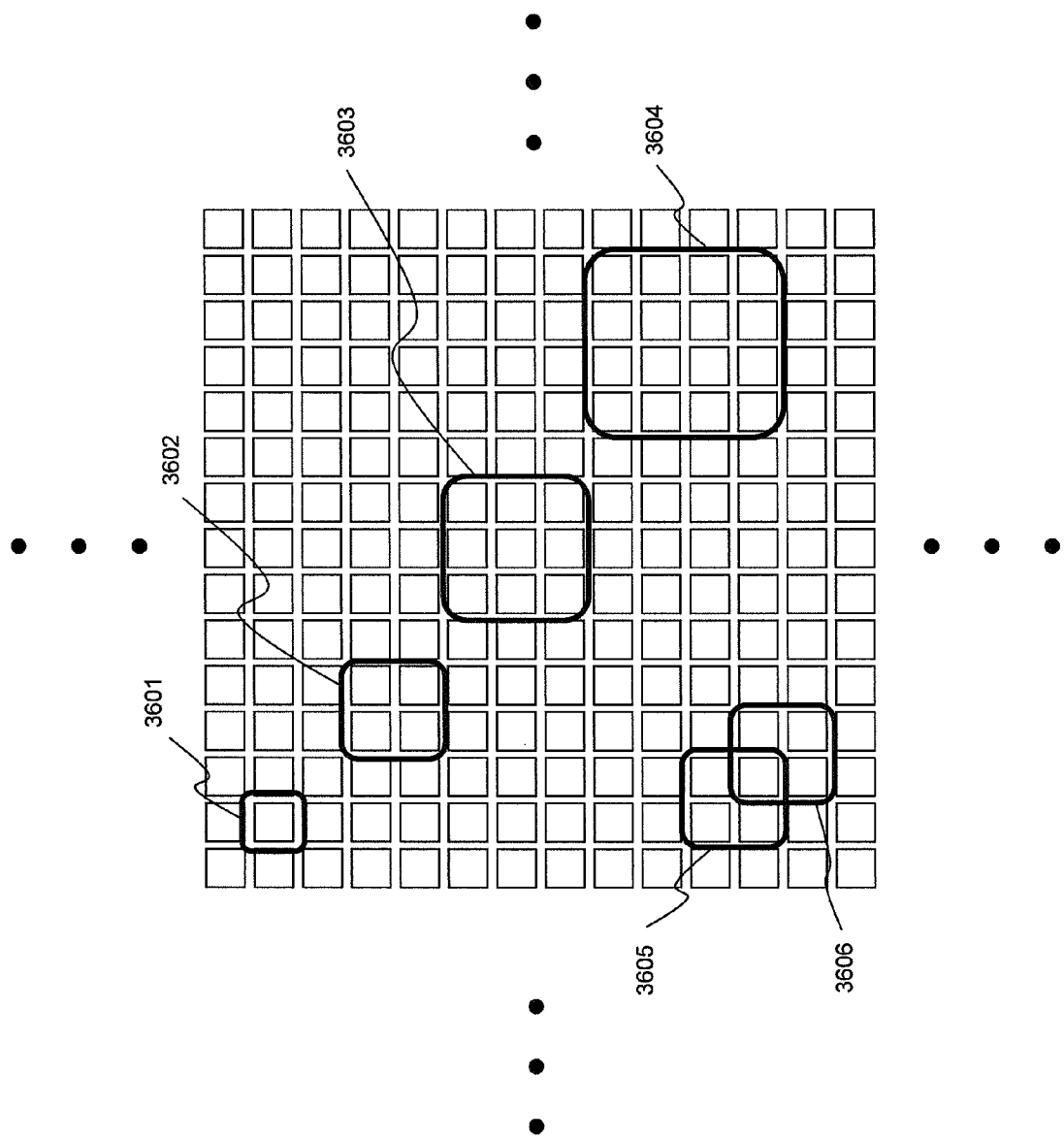
FIG. 44 depicts a numerical micro-aperture aperature arrangement for sythetic image formation of scene elements at different depths of field.

In contemporary optoelectronic device design and manufacturing, the choice of optical diode materials, structures, and fabrication techniques are separately optimized to obtain markedly different results for LEDs and photodiodes. This is illustrated in FIG. 42, wherein optical diode materials, structures, and fabrication techniques 4223 are regarded as "variables" resulting in devices having a range of attributes that are simplified down to emission performance 4201, detection performance 4202, and cost 4203 in a metric space of device realizations 4200. The figure illustrates broadly isolated planar regions for LEDs 4211 and photodiodes 4212 in this metric space of device realizations, each region spanning ranges of cost and performance. The invention provides for co-optimizations in both emission performance and detection performance against cost, represented by the volume region 4213. Such co-optimizations in both emission performance and detection may comprise adjustments and divergence of emission and detection spectral characteristics, co-location considerations, switching transistor interfacing, etc.

The invention provides for individual LEDs to be arranged in a variety two-dimensional arrays of a variety of planar and non-planar manners on rigid or flexible substrates. Individual LEDs or stacks of LEDs may be shared and distributed in a variety of patterns, for example as a simple lattice of circular devices as suggested in the exemplary arrangement of FIG. 43a, a simple lattice of square or rectangular devices as shown in FIG. 43b, the more complex lattice of hexagonal devices as shown in FIG. 43c, etc. Each device comprises LEDs or other light sensor/emitter elements and, in many embodiments, associated cell electronics exemplarily depicted in FIGS. 34a-34b and FIGS. 36a-36b. The layout arrangements are coordinated with micro-vignette and other micro-optics features described earlier.

The invention provides for synthetically varying the aperture size in the image formation algorithms. This is useful for providing synthetic imaging with different depths of field. For example, as seen in FIGS. 9a-9d, more distant scene elements require more sensor resolution to discern the incoming light field than near scene elements. In an exemplary embodiment, far-field scene element synthetic image formation use individual sensors elements (such as 3601). A somewhat closer scene element may use a linear combination of measurements from four individual sensors elements (such as suggested by 3602) in synthetic image formation. Similarly, a yet closer scene element may use a linear combination of measurements from nine individual sensors elements (such as suggested by 3603) in synthetic image formation, a yet closer closer scene element may use a linear combination of measurements from sixteen individual sensors elements (such as suggested by 3604) in synthetic image formation, etc. It is noted that such linear combinations of measurements from a plurality of individual sensors elements can be implemented in such a way to permit overlap, as suggested by the overlap of the envelopes 3605 and 3606.

An LED in the array, when in light detecting mode, will respond to incoming light from any variety of sources, including reflected light that provided by neighboring emitting-mode LEDs.

The invention also provides for adaptations of the arrangement described thus far so as to permit illumination from neighboring illuminating-mode LEDs to be omitted or attenuated. This may be accomplished by modulating the illumination signals in some fashion (for example amplitude modulation via a distinctive signal with high enough frequency content so as to be not visually perceptual, phase or frequency modulation of an amplitude modulated signal, etc.) A light-detection signal obtained by the LEDs operating in light detection mode can be analyzed in real-time for the presence of this carrier and the light-detection signal can then have this corresponding component removed algebraically, by means of various filters, or other methods. In some embodiments, the modulation technique may be chosen so that only simple filtering is required to remove this component with no need for real-time signal analysis. This can result in removal of the effects of illumination by the screen, for example if the screen image comprises colors or patterns the reflections from the screen can be attenuated or removed. In yet other embodiments, multiplexing of image detection and image emission may be arranged so the scene viewed is not illuminated by light emitted from another part of the LED display.

In another modality, the invention also provides for adaptations of the arrangement described thus far so to permit neighboring illuminating-mode LEDs to be used or adapted to provide somewhat color-corrected near-field lighting. In one embodiment this is done by providing a known-base illumination level of all emitted colors to produce uniform white light for a brief time interval and perform all detection operations only during this white light emission interval. In another embodiment this is done by modulating the intensity of a known added base level of continuously emitted white light with a modulation signal that can be recognized and filtered from the measurements directed to image formation, said modulation, detection, and filtering as described in the preceding paragraph.

Although the present invention has been described in connection with particular preferred embodiments and examples, it is to be understood that many modifications and variations can be made in hardware, software, operation, uses, protocols and data formats without departing from the scope to which the inventions disclosed herein are entitled. Accordingly, the present invention is to be considered as including all apparatus and methods encompassed by the appended claims.

What is claimed is:

1. A method for numerical image formation and for refinement from overlapping measurement vignettes captured by an image sensor array with associated micro-optical arrangements, the image sensor creating a plurality of light detection signals responsive to a plurality optically vignetted portions of an incoming light field associated with an observed scene, the method comprising:

using a multiplexing arrangement for gathering said light detection signals into a stream of measurement values;

using a numerical image formation algorithm comprises at least linear mathematical transformations on the measurements values;

using a processor for receiving the stream of measurement values, the processor executing the numerical image formation algorithm on the stream of measurement values to produce at least one synthesized digital image; and producing an output for transferring said at least one synthesized digital image to an external system, wherein the numerical image formation algorithm comprises linear mathematical transformations performed on the measurements values to produce a visual image that is responsive to the incoming light field that is associated with an observed scene and further provides synthetically variation of the aperture size used in the image formation algorithms.

2. The method of claim 1 wherein the stream of measurement values provides image data represented as a two dimensional array.

3. The method of claim 1 wherein the stream of measurement values provides image data represented as a vector.

4. The method of claim 1 wherein the numerical image formation algorithm comprises at least a computed inverse transformation.

5. The method of claim 4 wherein the computed inverse transformation is represented by a 4-dimensional array.

6. The method of claim 1 wherein the numerical image formation algorithm comprises at least a Morse-Penrose generalized inverse operation.

7. The method of claim 1 wherein said linear mathematical transformations comprise at least a Morse-Penrose generalized inverse operation.

8. The method of claim 1 wherein the numerical image formation algorithm comprises at least one deconvolution operation.

9. The method of claim 1 wherein the linear mathematical transformations employ linear combinations of measurements from a plurality of measurement values.

10. The method of claim 9 wherein the envelopes of at least two apertures overlap.

11. The method of claim 1 wherein the light detection signals are further processed by a nonlinear "gamma correction" operation.

12. The method of claim 1 wherein the image sensor array produces color light-field detection signals.

13. The method of claim 12 wherein the color light-field detection signals are further processed by a nonlinear "gamma correction" operations applied separately for each color detection signal.

14. The method of claim 12 wherein the light detection signals are further processed by a nonlinear "gamma correction" operation applied to the plurality of color light-field detection signals detection signals, the plurality of color light-field detection signals treated as a vector of color detection signals.

15. The method of claim 1 wherein the numerical image formation algorithm is adjustable, the adjustment responsive to configuration commands.

16. The method of claim 1 wherein the numerical image formation algorithm is adjustable, the adjustment responsive to control signals.

17. The method of claim 1 additionally comprising subsequent image processing operations.

18. The method of claim 17 wherein the subsequent image processing operations are adjustable, the adjustment responsive to configuration commands.

19. The method of claim 17 wherein the subsequent image processing operations are adjustable, the adjustment responsive to control signals.

20. The method of claim 1, wherein the plurality of light detection signals are responsive to the plurality of optically vignetted portions of the incoming light field;

wherein each of the plurality of optically vignetted portions is produced by individual ones of the micro-optical arrangements.

* * * * *